(12) United States Patent (10) Patent No.: US 8,108,914 B2
Hernoud et al. (45) Date of Patent: Jan. 31, 2012

(54) CONVERGED LOGICAL AND PHYSICAL SECURITY

(75) Inventors: Melani S. Hernoud, Dacono, CO (US);
Elizabeth J. Pierce, Dacono, CO (US);
Gregory Reith, Dacono, CO (US)

(73) Assignee: Vetrix, LLC, Dacono, CO (US)

( * ) Notice: Subject to any disclaimer, the term of this patent is extended or adjusted under 35 U.S.C. 154(b) by 1058 days.

(21) Appl. No.: 11/740,063

(22) Filed: Apr. 25, 2007

(65) Prior Publication Data
US 2008/0109883 A1 May 8, 2008

Related U.S. Application Data

(60) Provisional application No. 60/794,529, filed on Apr. 25, 2006.

(51) Int. Cl.
*G06F 7/04* (2006.01)
*G06F 15/16* (2006.01)
*G06F 17/30* (2006.01)
*H04L 29/06* (2006.01)

(52) U.S. Cl. ............ 726/5; 726/9; 726/18; 726/19; 726/20; 713/185

(58) Field of Classification Search .............. 713/172, 713/185; 726/5, 9, 18–20; 705/55, 325
See application file for complete search history.

(56) References Cited

U.S. PATENT DOCUMENTS

| | | |
|---|---|---|
| 5,596,652 A | 1/1997 | Piatek et al. |
| 5,793,882 A | 8/1998 | Piatek et al. |
| 6,761,312 B2 | 7/2004 | Piatek et al. |
| 6,983,202 B2 | 1/2006 | Sanqunetti |
| 7,191,934 B2 | 3/2007 | Miller et al. |
| 7,327,258 B2 | 2/2008 | Fast et al. |
| 7,486,185 B2 | 2/2009 | Culpepper et al. |
| 7,719,425 B2* | 5/2010 | Colby ................... 340/572.8 |
| 2003/0105725 A1 | 6/2003 | Hoffman |
| 2005/0038741 A1 | 2/2005 | Bonalle et al. |
| 2005/0075116 A1* | 4/2005 | Laird et al. ............ 455/456.3 |
| 2005/0138380 A1* | 6/2005 | Fedronic et al. ........... 713/172 |

(Continued)

OTHER PUBLICATIONS

Feb. 25, 2011, "Personal Identity Verficiation (PIV) of Federal Employees and Contractors", Federal Information Processing Standards, FIPS PUB 201, pp. ii-77.*

(Continued)

*Primary Examiner* — Jeffrey D Popham
*Assistant Examiner* — Daniel Potratz
(74) *Attorney, Agent, or Firm* — Jason H. Vick; Sheridan Ross PC

(57) ABSTRACT

A security management system that includes a hierarchical security platform, converged IT and physical security management, unified credentialing, credential issuance and incident(s) management. An exemplary aspect of the invention also relates to physical and logical security management and information technology/network security management, with a credential issuance and integrity checking system as well as associated readers and printers of the credential. Still further aspects of the invention relate to obtaining, assembling and analyzing one or more of data, video information, image information, biometric information, sensor information, terrorist information, profile information, and/or other types of information to provide a comprehensive platform for all aspects of security management. A toolkit is also provided that allows complete management, integration, scalability, interoperability and centralized control of all aspects of security including personnel credentialing, personnel management, personnel tracking, task management, security system integration, security information exchange and scalability.

52 Claims, 39 Drawing Sheets
(33 of 39 Drawing Sheet(s) Filed in Color)

U.S. PATENT DOCUMENTS

| | | | | |
|---|---|---|---|---|
| 2005/0171787 | A1* | 8/2005 | Zagami | 705/1 |
| 2005/0219044 | A1* | 10/2005 | Douglass et al. | 340/506 |
| 2005/0273774 | A1 | 12/2005 | Heinz | |
| 2007/0074041 | A1* | 3/2007 | Aull et al. | 713/186 |
| 2007/0186106 | A1* | 8/2007 | Ting et al. | 713/168 |
| 2007/0244633 | A1 | 10/2007 | Phillips et al. | |
| 2008/0086497 | A1 | 4/2008 | Wallace et al. | |

OTHER PUBLICATIONS

D'Agostino et al, "The Roles of Authentication, Authorization, & Cryptography in Expanding Security Industry Technology", Dec. 2005, Security Industry Association (SIA) Quarterly Technical Update, Entire Document.*

Written Opinion for International (PCT) Application No. PCT/US07/67404, mailed Feb. 29, 2008.

International Search Report for International (PCT) Application No. PCT/US07/67404, mailed Feb. 29, 2008.

Hernoud, "The Mountains That Won't Talk—Silos of Security Disciplines" GSLC V1.0, Sans Institute 2003, As part of GIAC Practical Repository, 4 pages.

Examination Report for New Zealand Patent Application No. 572230, dated Apr. 21, 2010.

International Preliminary Report on Patentability for International (PCT) Application No. PCT/US07/67404, issued Oct. 28, 2008.

Notification of Acceptance for South Africa Patent Application No. 2008/08976 dated Nov. 2, 2009.

Official Action for Australian Application No. 2007290309, mailed Sep. 15, 2010.

U.S. Appl. No. 13/143,431, filed Aug. 19, 2011, Hernoud et al.

U.S. Appl. No. 13/254,898, filed Sep. 6, 2011, Hernoud et al.

Official Action for Philippine Patent Application No. 1-2008-502291, dated Sep. 26, 2011.

International Search Report for International (PCT) Patent Application No. PCT/US10/20244, mailed Mar. 29, 2010.

Written Opinion for International (PCT) Patent Application No. PCT/US10/20244, mailed Mar. 29, 2010.

International Preliminary Report on Patentability for International (PCT) Patent Application No. PCT/US10/20244, mailed Jul. 21, 2011.

International Search Report for International (PCT) Application No. PCT/US2010/026316, mailed May 11, 2010.

Written Opinion for International (PCT) Application No. PCT/US2010/026316, mailed May 11, 2010.

International Preliminary Report on Patentability for International (PCT) Application No. PCT/US2010/026316, mailed Sep. 15, 2011.

Examination Report for New Zealand Patent Application No. 595899, dated Oct. 26, 2011.

\* cited by examiner

CONVERGED LOGICAL AND PHYSICAL SECURITY

RELATED APPLICATION DATA

This application claims the benefit of and priority under 35 U.S.C. §119(e) to U.S. Patent Application No. 60/794,529, filed Apr. 25, 2006, entitled "Emergency Responder Security System," which is incorporated herein by reference in its entirety.

BACKGROUND

Field of the Invention

Exemplary aspects of this invention relate to security. More specific aspects of the invention relate to security management, a hierarchical security platform, converged IT and physical security management, unified credentialing, credential issuance and incident(s)/event management.

SUMMARY

The exemplary systems discussed herein are in general directed toward security and security management. An exemplary aspect of the invention relates to physical security management and information technology/network security management. Additional aspects of the invention relate to a credential issuance and integrity checking systems as well as associated readers and printers of the credential certificate and electronic personalization. Still further aspects of the invention relate to obtaining, assembling and analyzing one or more of data, video information, image information, biometric information, sensor information, alarm information, perimeter information, terrorist information, profile information, and/or other types of information to provide a comprehensive platform for all aspects of security management. Still further aspects of the invention relate to providing a scalable toolkit that allows complete management, integration, interoperability and centralized control and monitoring of all aspects of security including personnel credentialing, personnel management, personnel tracking, task management, equipment management, personnel tracking, security system integration and security information exchange.

The exemplary IT/network and physical security management system can be architected for open standards and its operability designed for modularity and scalability, and can be extendable across a spectrum of security needs, and adaptable to both legacy and upcoming technologies. The exemplary IT/network and physical security management system can also be networked with other IT/network and physical security management system(s) to allow for widespread security management, for example, during one or more non-collocated incidents, that may be one or more of international, federal, tribal, state, city or local in nature.

Supporting multi-function contact and contactless smart card/token/smart chip/embedded/implanted chip user validation, the exemplary system works with existing collocated and distributed facility environments, and optionally supports various technologies including fingerprint recognition, facial recognition, iris scanning, biometrics, geographic information system information feeds, and the like. Blending, for example, video surveillance and hazardous environmental sensors, the exemplary system can be adapted to interface with building control systems, alarm systems, existing card readers, annunciators, cameras and video cameras, enterprise IT security systems, enterprise hardwired or wireless security systems, alarm systems, and general any security system. The exemplary system allows integration into even the most complex mission-critical enterprise IT security infrastructures through, for example, standard protocols, resulting in improved situational awareness, ability to correlate events and control responses in real-time, reduced administration overhead an improved audit and forensic capabilities.

The IT/network and physical security management system cooperates with the Incident Management Parameter Access Control and Tracking (IMPACT) family of solutions which provide access control and identity management for deployment by, for example, one or more of Federal, State, local and tribal governments. The IMPACT family of solutions can cooperate with IT/network and physical security management systems to allow control of physical and IT access using, for example, a unified credential. The system enables, for example, incident command to have a reliable, real-time emergency management hub that brings together all the assets and resources into a field environment, including, for example, personnel management and tracking, video surveillance and hazardous environment sensors, wireless communications and backend communications to Federal, State and/or regional resources. Various card issuance and reading systems are also supported as well as manufacturers of multi-technology smart cards, such as contact or contact-less smart cards, smart chips and embedded/implanted chips. The IMPACT family of solutions can be configured, for example, based on the type of incident or environment into which it is deployed. For example, the critical infrastructure elements discussed herein can each have a specific IMPACT solution that includes specific modules, interfaces, templates, workflows and processes or sub-processes pre-configured for deployment.

The exemplary system supports both a multi-function contact and contactless smart card/token/smart chip/embedded chip/implanted chip, user validation, and also works with a variety of incident scenarios and climatic environments.

The exemplary system supports both a multi-function contact and contactless smart chip user validation, and also works with a variety of incident scenarios and climatic environments.

The exemplary system supports both a multi-function contact and contactless embedded/implanted chip user validation, and also works with a variety of incident scenarios and climatic environments.

As examples, the systems described herein can be used for HSPD compliance, such as HSPD 5, HSPD 7 and HSPD 12. There is a number of critical infrastructure and key resource (CI/KR) sectors in which the systems described herein can be used, or defined to address any of the areas covered under these guidelines.

Exemplary non-limiting environments include: chemical, drinking water and wastewater treatment systems, energy (power facilities, electrical grid, oil & gas), dams, commercial nuclear reactors, water sectors, process manufacturing, emergency services, public health and healthcare, continuity of government, government facilities, defense facilities, defense industrial base, information technology, telecommunications, converged facilities, national monuments and icons, postal and shipping, banking and finance, commercial facilities, materials and waste, transportation systems, port security, aviation security, cargo, cruise ships, trains, mass transit, Intermodal, food and agriculture, military, first responders, police, fire and OSHA Compliance (Authentication & tracking of machine use). However, in general the systems disclosed herein can be implemented in any environment(s).

As an example, in a national/city based incident, an ID is used to derive access to all City/National Resources, and can include all HSPD 7, and more. For example, access can be provided to water, power, facilities, transportation, city buildings and the like. In this example, the 4th factor of authentication which is Location Based in time/Global/ZULU/GMT can be supported. Additionally, a GUM and/or a UUID which is a universal or Global unique Identifier can also use certificates including but not limited to PKI, PKCS #, etc. GUIDs, UUIDs and Certificates can be used in varying ways as any one item can define identity. Use can be cumulative, stand alone or a process can select the preferred method for identity processes. Chip/card/Implant has sectors that only allow Authorized Writer/Readers/Users to allow for Multi-use and Multi-Administrators. Built in Fail-safe options include a running agent that identified debuggers, heap readers, disassemblers and other reverse engineering processes on the fly. Applications can then be shut down into its stored encrypted state. In case of additional tampering, after a certain threshold of code has been tampered with, Artificial Intelligence (M) processes rewrite the code back to the original code base (last known good configuration) and/or after so much loss can seal in encrypted container so only, for example, an authorized factory representative can reopen and/or or it is destroyed. In addition, the software and hardware case can be configured to scramble drive contents upon compromise. This is useful in cases where classified data may sit on a device.

Optional configurations include BOOT Choice on start-up to include but not limited to evacuation conditions and/or Bomb scenario and/or Ingress/egress of any area, an Artificial Intelligent system, a self healing network and systems component, Attendance and HR, the embedded Chip could be in Body and/or hand and have multiple administrators for use in a single ID, multi-use and multi-administrators, (i.e., where a chip/card has sectors that only allow authorized writers/readers/users to allow multi-use and multi-administrators to access or update specific partitions/sectors) HSPD 7 and other applications and all critical infrastructures, and any and all additions now and in the future, sensors in the ceiling and/or roof area in cooperation with GPS and other backend systems can track live movement of an individual and/or asset thru space and time, perimeter technologies can include but not limited to, line of sight, satellite, fiber drop wire, radar, microwave, seismic sensor, beams, etc. . . . Perimeter technologies can be applied in a variety of environments to support very specific perimeter control requirements. All data and confidential information can be encrypted at rest and/or in transit—one exemplary way of encrypting the reader to the security system is by using encrypt and/or decrypt chips as an I/O board attached to the reader and/or the security system.

Cooperation between the exemplary IMPACT family of solutions and the IT/network and physical security management system allows interface designs to be built as modules that can be used as a checklist to compile to produce any security product to address all Critical Infrastructures and/or any other security systems, force protection, border control and/or need. These, as discussed, at least include the following modules: sensor modules—including but not limited to chemical, hazardous, environmental, temperature, HVAC, physical Security Modules—including but not limited to glass break, motion detection, physical access control, magnetic stripe, fire Suppression, etc. Converged physical and IT security access control is built into one or more of the described systems can include communications module—including but not limited to, 900 mhz, 2.4 mhz, satellite, microwave, 800 MHz, HAM radio, 802.11, Fiber Optic, VOIP, CDMA, GPRS, etc. They also include the identity management aspects of the invention and the mapping module including—static, internet based, real-time imagery, data based and others, the cameras module, the behavioral analysis modules, the audio and audio analysis modules, the EMS modules and the alerting and logging modules.

The security system is an application that converges logical and physical security into a unified process for access control of physical entities and network or other logical entities.

Exemplary Components that allow this converged design are:
1. Client software provides an interface to an Active Directory structure or an identity management structure (also includes Federated Identity Management schema), LDAP (Light Directory Access Protocol), and other schemas for identity information including InfoCard, the physical access control structure and allows for configurations of security zones, access permissions, camera operations, alerting, logging and other processes that support physical and logical access control.
2. Remote controller is the domain controller containing the primary active directory structure and the controlling operating system.
3. Physical access controllers are devices that provide reader control for physical access.
4. Cameras.
5. Logical control readers that allow for network or system authentication.
6. SQL relational database or object-oriented, or object-relational repository that stores access information, user information, physical information, zone maps and other information related to logical and physical access control.

The security system uses active directory, SQL and controller based data structures to control physical and logical access. The elements are tied together through processes that integrate active directory, a relational database backend and physical controller data structures. Clients that provide for disconnected Access control may also use ADAM (a clientized version of active directory) that may synchronize to a master active directory structure.

Access control is based on defining identities or grouping identities based on Roles and then assigning them to security zones, networked based or system based objects. An object can be a file or other element stored in a file system, database etc. . . . An identity is defined by creating a new identity and setting different configuration options that relate to networks, systems and or physical access control to include hours of access, security zones, accessible domains etc. . . . Logical attributes are stored within the active directory structure while physical attributes are stored within the controller data structure and other attributes that bridge both are stored in the relational data structure. Services tie all three together in a transactional process that guarantees identity update parameters (adding or provisioning, modifying privileges, and termination or revocation). Identities are tracked through the use of GUIDs, UUIDs and or certificates. This structure allows for the best data integrity and reliability as well as maintaining separation of duties between physical controllers and logical controllers.

When the security system is installed the device identifies the controlling aspects of the logical networks and takes the role as the master controller. Identity updates will occur to the device through active directory and active directory extensions. The other controller then act as authentication controllers for the network. CRITSEC also conducts a search and discovers physical control devices, systems and logical network elements and takes control of those as well. Updates that are applied to an identity are transacted through a service that acts as a broker between active directory, the physical controller and the relational database.

The relational structure is implemented in a way that provides for data mapping as opposed to hard defined data structures. This allows user of the CRITSEC system to use a variety of data backends to use CRITSEC with to include MS SQL, Oracle, MySQL and other.

Supervisory Control And Data Acquisition (SCADA) is a remote control process that controls infrastructure such as water or power etc. . . . There's a client that communicates with a control device that controls some aspect of a process. The exemplary compontentry associated with the SCADA embodiment includes: Client software that provides an interface to a variety of controllers. SCADA software secures SCADA operational processes through an enhanced SCADA interface. Controllers and remote terminal units are, for example, devices that monitor and open or shut valves or perform some other function that is required to maintain certain process attributes. A controlled device is, for example, a valve or other device that has impact over a controlled process. The security system integrates logical and physical access control to SCADA networks. SCADA has been over the years inherently weak when it comes to access controls and security. SCADA security addresses this by integrating the SCADA network with the security system for controlling physical and logical access to SCADA networks. SCADA security also provides for a more secure interface while allowing SCADA operators to continually monitor processes through a locked for input but functional, visible open to monitoring screen. Physical and logical access controls are similar to the other applications and processes described herein. The client software secures the SCADA management process by creating a transparent screen that SCADA operators can use to monitor SCADA processes. Though users can see processes in real-time, they can't interact with the process until authentication takes place through the security management system. Once authentication takes place then the transparent screen moves to a background process while the SCADA client application takes the foreground process and allows for operator interaction. Alerting takes place through a colored border that flashes at the edge of the border of the screen, still allowing the operator to monitor real-time actions through the transparent screen.

These and other features and advantages of this invention are described in, or are apparent from, the following detailed description of the exemplary embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The exemplary embodiments of the invention will be described in detail, with reference to the following figures wherein.

DETAILED DESCRIPTION

Figure 1:
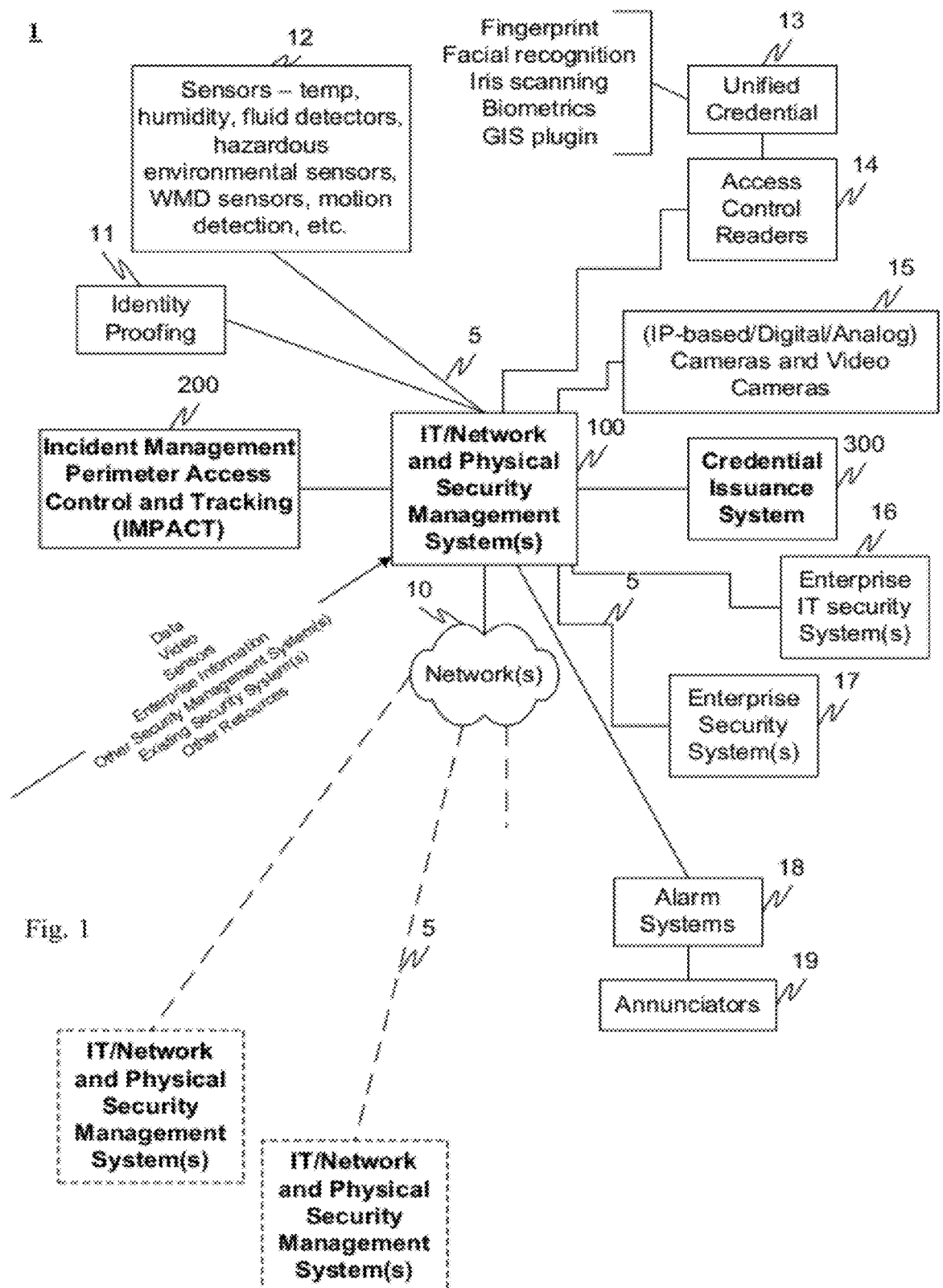
FIG. 1 is an overview of the exemplary security system according to this invention.

The exemplary embodiments of this invention will be described in relation to security management. However, it should be appreciated, that in general, the systems and methods of this invention will work equally well for any type of communication system in any environment.

The exemplary systems and methods of this invention will also be described in relation to security management and the components, sensors, hardware, software and data feeds associated therewith. However, to avoid unnecessarily obscuring the present invention, the following description omits well-known structures and devices that may be shown in block diagram form or otherwise summarized.

For purposes of explanation, numerous details are set forth in order to provide a thorough understanding of the present invention. It should be appreciated however that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a telecommunications network and/or the Internet, or within a dedicated secure, unsecured and/or encrypted system. Thus, it should be appreciated that the components of the system can be combined into one or more devices, or collocated on a particular node of a distributed network, such as a telecommunications network. As will be appreciated from the following description, and for reasons of computational efficiency, the components of the system can be arranged at any location within a distributed network without affecting the operation of the system. For example, the various components and functions associated therewith can be divided between one or more of the described systems, can be load balanced between one or more security systems and can be networked between on or more security systems, devices, or some combination thereof. Similarly, one or more functional portions of the system could be distributed between a plurality of geographically separate systems.

Furthermore, it should be appreciated that the various links, including any communications channels connecting the elements can be wired or wireless links, (including satellite based link(s) or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique. It should also be appreciated that various levels of redundancy and portability can be included with the system, as well as a shock mount case for emergency drops to remote locations, such as battery back-up, multi-national power supplies, recharging capabilities, and a plurality of communication options.

FIG. 1 illustrates an exemplary security system 1. The security system includes an IT/Network and Physical Security management System 100, an Incident Management Perimeter Access Control and Tracking module 200 and a credential issuance system 300. The IT/Network and Physical Security management System 100 can be connected, via one or more of network 10 and links 5, to one or more additional IT/Network and Physical Security Management Systems as well as an identity proofing module 11, one or more sensors 12, a unified credential 13, one or more access control readers 14 (which can govern physical as well as network/computer access), one or more cameras and/or video cameras or feeds 15, existing enterprise IT security system(s) 16, existing enterprise security systems 17, such as building access systems and alarm systems 18 and associated annunciators 19 and devices.

Figure 2:
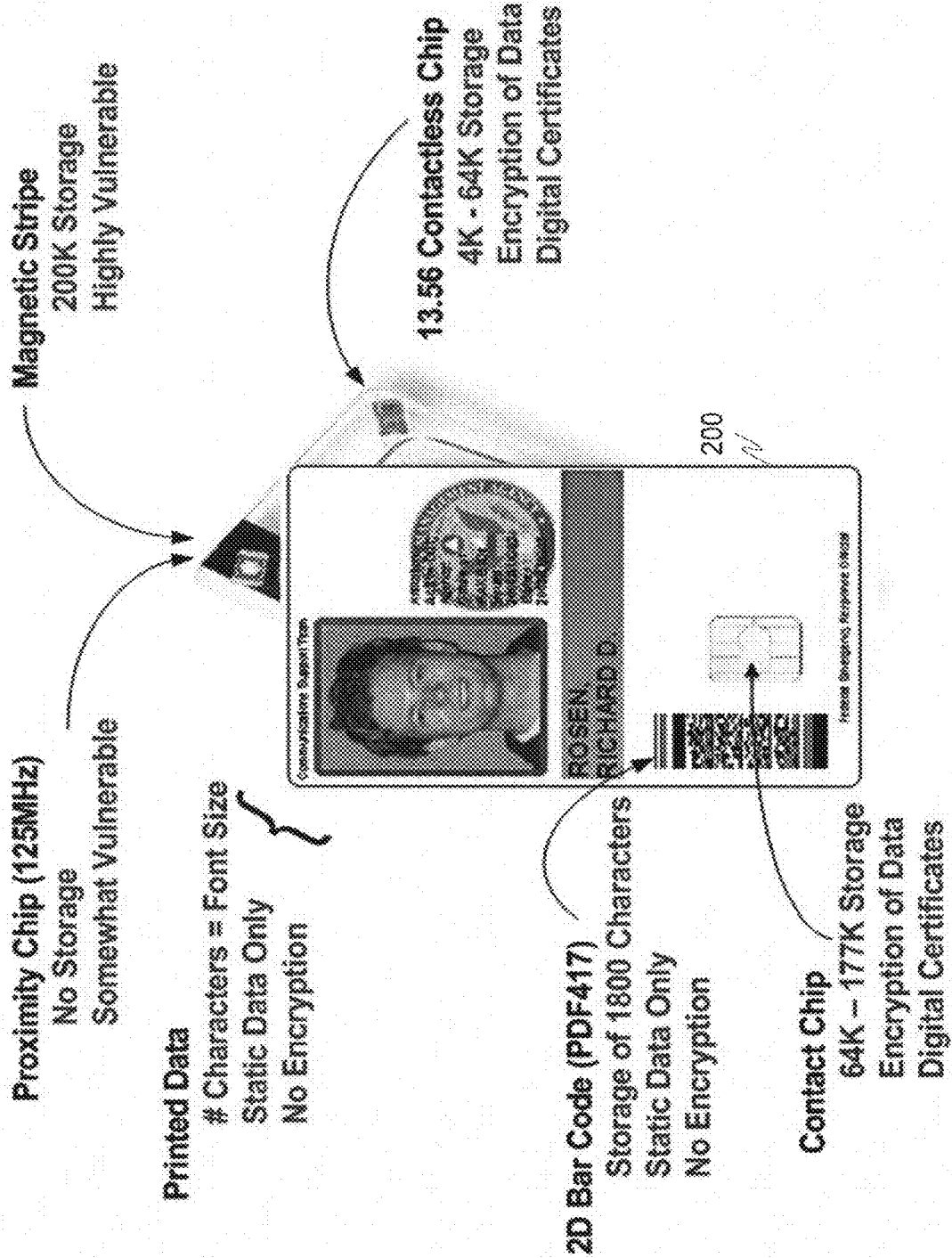
FIG. 2 illustrates exemplary components that can be associated with a credential according to this invention.

FIG. 2 illustrates an exemplary credential 200, and some of the types of information and information carrying devices associated therewith. For example, the credential can include one or more of a contact-based chip, embedded chip(s), implanted chip(s), bar code(s), printed data, picture(s), a proximity chip, a magnetic stripe and a contactless chip. Each of the information carrying devices have certain associated advantages and disadvantages and can be chosen, for example, based on the expected operating environment, environmental conditions, data to be stored thereon, security requirements and the like. The credential can be any one or more of a smart card, smart chip and embedded chip. The security system can automatically recognize the card type, issuing agency, format, etc., as well as what authorized information can be read. This allows for multi-administrators, multi-use, multi-readers and multi-sections (with each section have different access permissions), i.e., an e-passport.

While certain embodiments are described in relation to the exemplary credential, other options are also available. For example, although a uniform visual card design is desirable, experience indicates that while the flash-pass capabilities are important, more crucial is the uniformity of the information programmed into the smart card/smart chip/embedded/implanted chip. The credential issuance system can abstract the desired data into containers or sectors of the credential that are programmed into the smart card chip, some with varying degrees of protection for very sensitive data like biometric templates. These credentials/certificates are thus immediately usable at the incident site(s), not within some delayed time period, such as 24 hours. Revocation can also be immediate. Interoperability with other standards-based cards can be a key architecture principle.

While a standard template can be defined, other templates may be added. For example, while one jurisdiction may choose to store encrypted fingerprint, iris scan, hand geometry or facial recognition, including any biometric, in an encrypted card container, another jurisdiction may utilize the same space on the card for emergency medical treatment information. The ability of the credential issuance system to discern the differences between the two card types described is a unique feature that can be enabled as required. Thus, different entities can have different permissions to access different portions of one or more containers or sectors of the same card. Highlights of an exemplary credential include:

Data Capture and Issuance

Optional Version for Contact Chip
Works with the Credential Issuance System for Printing/Lamination -

Enables 'One Button'
Print/Program
Works with IMPACT and the IT/Network and Physical Security Management System for Contactless 13.56 MHz Chip and other embedded/implanted chips
Authorization & Tracking Unique Identifier by Individual Global Unique Identifier (GUID) or Optional Cardholder Unique Identifier (CHUID)
Digital Certificate Follows PKCS11 Standard - and all future standards, technologies or certificates as them become available
Lifecycle Operations Secure Identity Management System (IdMS)
Secure Containers for Data on Chip
Works with IMPACT and the IT/Network and Physical Security Management System
Reprogram or Update Data in Field or Centrally
Real-time Validation of Digital Certificate Verification through, for example, a third-party
Rapid Provisioning and Termination of Privileges - NOT 24 hours
Maintain High 'Level of Trust'
Manage Data on Card, in IdMS or both • Portable and Fixed Base • Modular • Secure
Pre-Issue Multi-function Credential or Onsite Verify Identity
Verify Authorizations
Ensure 'Level of Trust'
Create Photo ID or Smart Card Badge for this Incident
Update Smart Card Chip if 2nd Incident
Visual Grouping by Skill or Responsibility
Utilize for Physical and Logical Access Stored X.509 or PKCS11 Certificates - and all future certificates as they become available
Match-on-Card Biometrics
Smart Card/Smart Chip/Embedded Chip and use of SQL and the and active directory
Registrar Functionality Sponsors Submit Applicant's Background Check Info
Registrar Collects Identity Information In-Person
Fingerprints and I-9 Documents
System Tracks Status of Application
Notification When NACI Complete
ID Management System
Active Directory Link
Revalidation Dates, Moves, Adds, Changes, Terminations
Distribution of Applications
PIN Resets
Robust Member Search and Auditing Capability
SQL or SQL Link
File/Data transfers Write IMPACT is an application that allows for the reading and writing of contact and contactless smart cards.

Exemplary Components:
1. Client software that allows for writing and reading data, acquiring biometric data and specifying certifications.
2. Data backend for storing data in either a connected or disconnected state.
3. Interfacing for smartcards. Write Impact has the capability to write and read contact/contactless smartcards that meet a variety of standards to include HSPD-12, Mifare, Desfire, Smart MX and others.

Due to card storage size and end user requirements, a matrixing solution has been developed that allows users to add a large amount of data into limited space on the smartcard chip. The matrix allows for defining a mapping solution from the application to the card's database and vice-versa. This allows agencies to define their own data and enter it into the chip of a card while not using the space required to enter that data. An example would be: Denver Sheriff Department wants to track certain certifications that they have developed. The exemplary certification is broken down to a 3 or 4 (or in general any) digit number or lettering scheme that designates that the certification is local, that the certification is related to law enforcement, that the certification is for SWAT and that the final certification is for level. There is also a 1 digit number that specifies if the user is current, not current, in retraining, or that currency doesn't apply. This schema allows for the storage of much more data on a chip that can be directly referenced through the back end. Other agencies may then map their data in their own way and agency data may be correlated together through a mapping structure so outside agencies have visibility of certifications.

Figure 40:
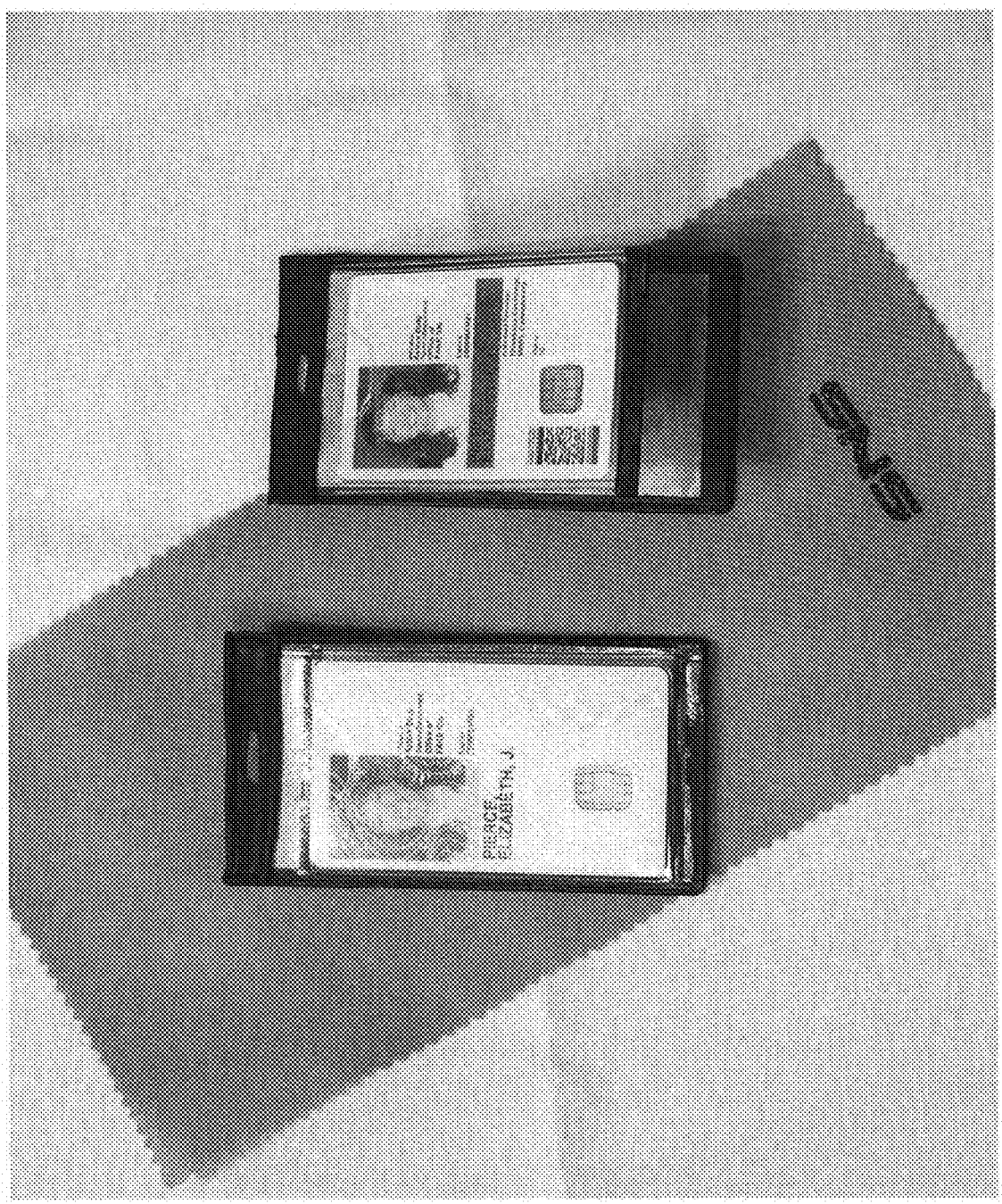
FIG. 40 illustrates an exemplary credential shield according to this invention.

For protecting the credential, as illustrated in FIG. 40, a shielding credential holder device leverages a magnet to hold a clear cover to a shielding back, and can be flipped out with one hand when one needs to enable the contactless signal when presented to a reader to, for example, open a door. Credential holders that shield contactless emanation from unwanted and/or unauthorized reading are current state-of-the-art, however convenient usage by an individual when entering a secured facility is somewhat lacking. The illustrated units are designed to feature a clear pocket for the credential that magnetically adheres to a shielding backing. Thus, a user is able to confidently display the front of the credential on a lanyard or clipped to clothing knowing that it cannot be read contactlessly in this mode, yet easily separate the clear pocket from the backing with one hand to expose the contactless signal when required, and allow reading thereof.

Figure 3:
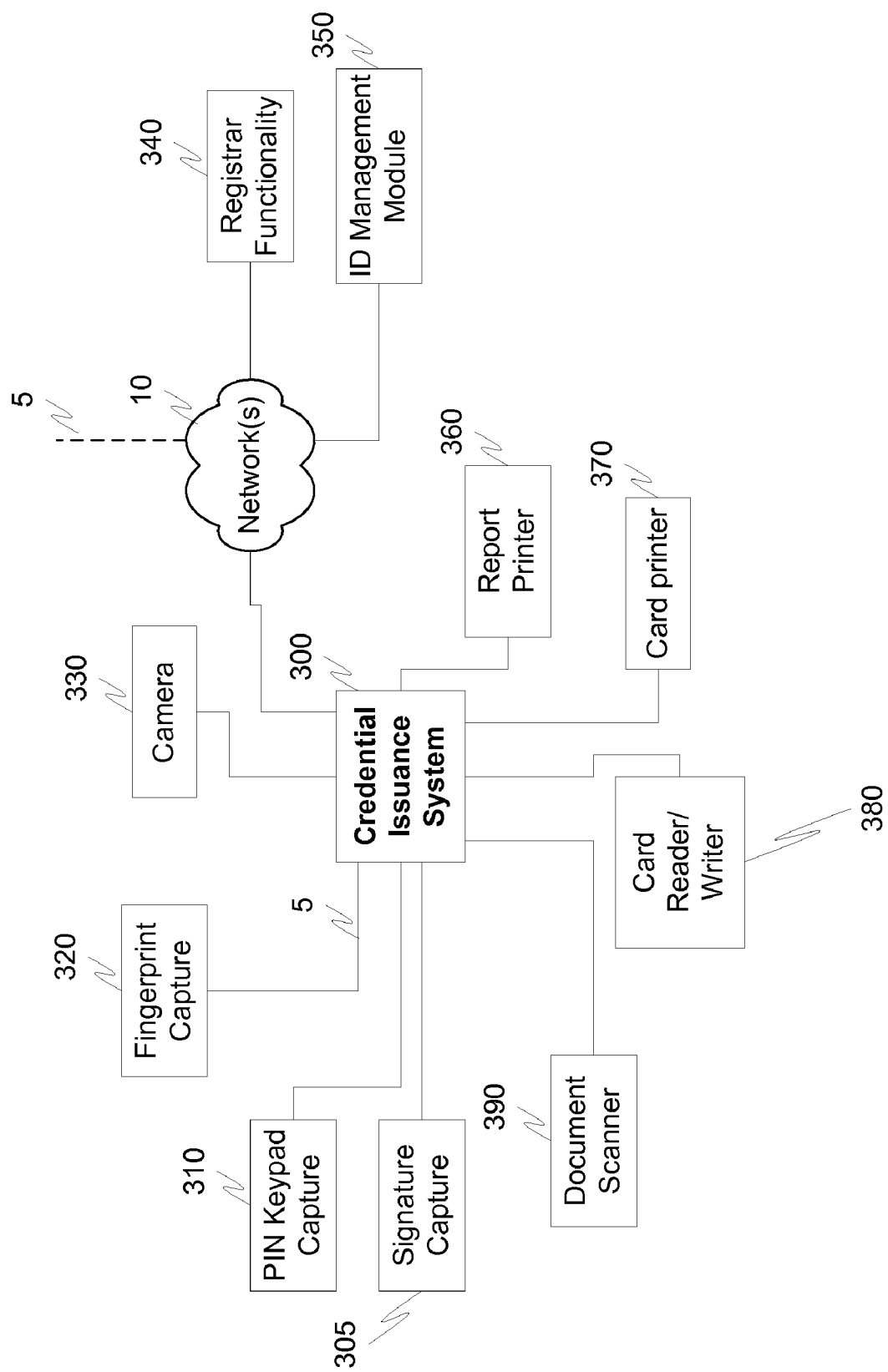
FIG. 3 illustrates an exemplary credential issuance system according to this invention.

FIG. 3 illustrates an exemplary credential issuance system 300. The credential issuance system 300 comprises a signature capturer 305, a PIN keypad capturer 310, a fingerprint capturer 320, a camera 330, a module for registrar functionality 340, an ID management module 350, a report printer 360, a card printer 370, a card reader/writer 380, and a document scanner 390, all interconnected via one or more links and networks. One or more pieces of data can be secured via the appropriate capturer and associated with a credential. The data can be associated, in cooperation with the card reader/writer 380, by storing information on the card or printing information on the card. This information, or a portion thereof, can also be encrypted as needed.

The credential issuance system 300 also can cooperate with a module for registrar functionality. Registrar functionality can include a background check, fingerprinting and I-9 documentation, system tracking of the application process and notification of when the NACI is complete. The ID Management module can include an active directory link, revalidation functions, date and tracking, moves, adds, changes, terminations, and the like, for an issued credential. The ID management module 350 can also handle the distribution of applications, PIN Resets, robust member searching functionality and auditing.

Figure 4:
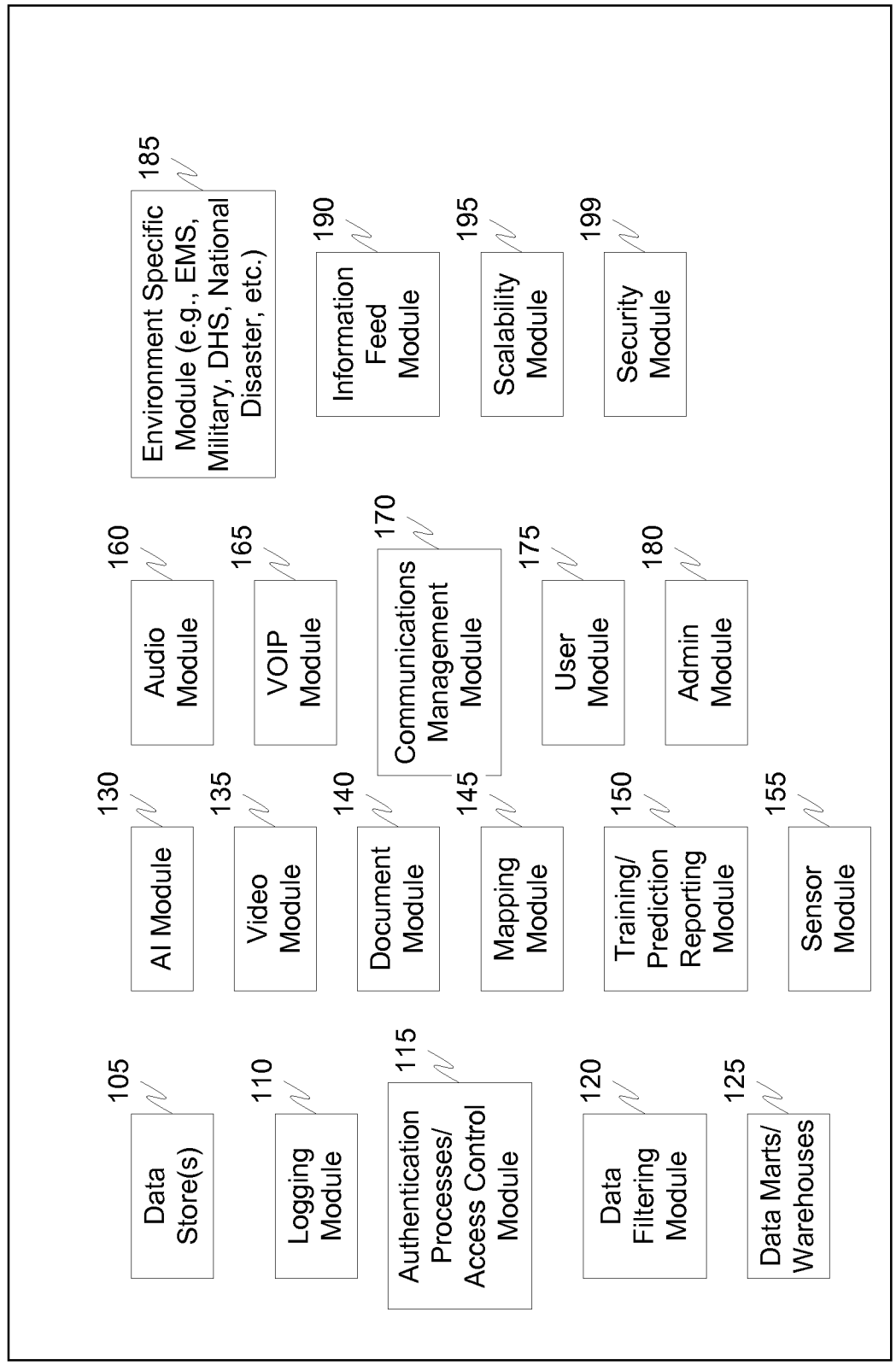
FIG. 4 illustrates in greater detail the components of the IT/Network and Physical Security Management system according to this invention.

FIG. 4 illustrates the IT/Network and Physical Security Management System 100 in greater detail. In particular, the IT/Network and Physical Security management System 100 comprises one or more of a data store 105, logging module 110, authentication processes/access control module 115, data filtering module 120, data marts/warehouses 125, Artificial Intelligence modules 130, video module 135, document module 140, mapping module 145, training/prediction reporting module 150, sensor module 155, audio module 160, VOIP module 165, communications management module 170, user module 175, admin module 180, environment specific module 185, information feed module 190, scalability and interconnection module 195 and security module 199, all intercommoned via the appropriate link(s) and/or network(s) as required (not shown).

Figure 5:
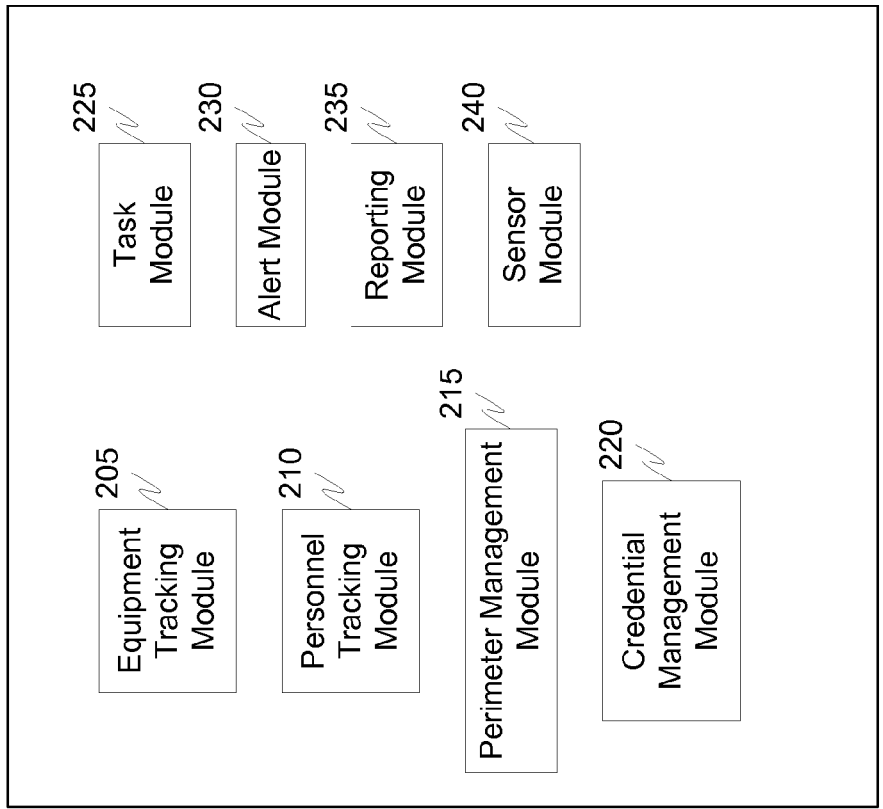
FIG. 5 illustrates in greater detail the IMPACT system according to this invention.

FIG. 5 illustrates in greater detail an exemplary member of the IMPACT family of solutions 200. In particular, the IMPACT system comprises one or more of an equipment tracking module 205, a personnel tracking module 210, a perimeter management module 215, a credential management module 220, a task module 225, an alert module 230, a reporting module 235 and a sensor module 240, all intercommoned via the appropriate link(s) and/or network(s) as required (not shown).

In operation, an administrator initializes the system by adding the personnel, equipment, credentials, or in general any tangible or intangible, that are to be managed. The addition of the managed information can be streamlined through the use of one or more templates designed for specific incidents and/or environments. For example, when booting the security system, the system can query the user as to the type of deployment, incident or environment. Based on the user's selection, specific GUI's, templates and prompts for connections to various types of data feeds can be generated. Once all relevant information pertaining to the managed information is established, various pre-defined rule sets can be invoked or one or more custom rules created that allow actions to be triggered based on satisfaction of one or more rules. For example, if the incident is a fire and the security system is connected to the existing building fire system, a pre-defined "building fire" rule set could be selected that allows the security system to monitor heat sensors, movement of emergency responders in the building, fire sensors, video feeds, etc.

In addition, the security system can monitor the presence of emergency responders into and out of the incident scene. This not only allows to the system to account for the presence and location of personnel, but also more routine tasks such as billing management. In the event of an injured emergency responder, the system could also automatically forward medical information based on the emergency responder's credential to a hospital to assist with treatment.

The IMPACT family of solutions can also be preconfigured with connectivity escalation routines that allow the security system to contact one or more additional security system based on, for example, the meeting of one or metrics monitored by the system. For example, if explosives or an explosion is detected, the security system and forward information related thereto to the federal authorities. Additionally, the security system may connect to other security systems to assist in the analysis of trend data in the event of, for example, widespread terrorist activity.

In another exemplary embodiment, the system is not actually deployed to an incident, but is used as a full-time security monitor for one or more of a facility/network/computer system. The system can also interface with existing structures, such as a school, utilizing the appropriate modules, allowing control over and monitoring of, for example, a schools security system. For example, the security system can be connected wired or wirelessly by an emergency response team to the school and control all aspects of security including cameras, locks, access, etc.

Figure 6:
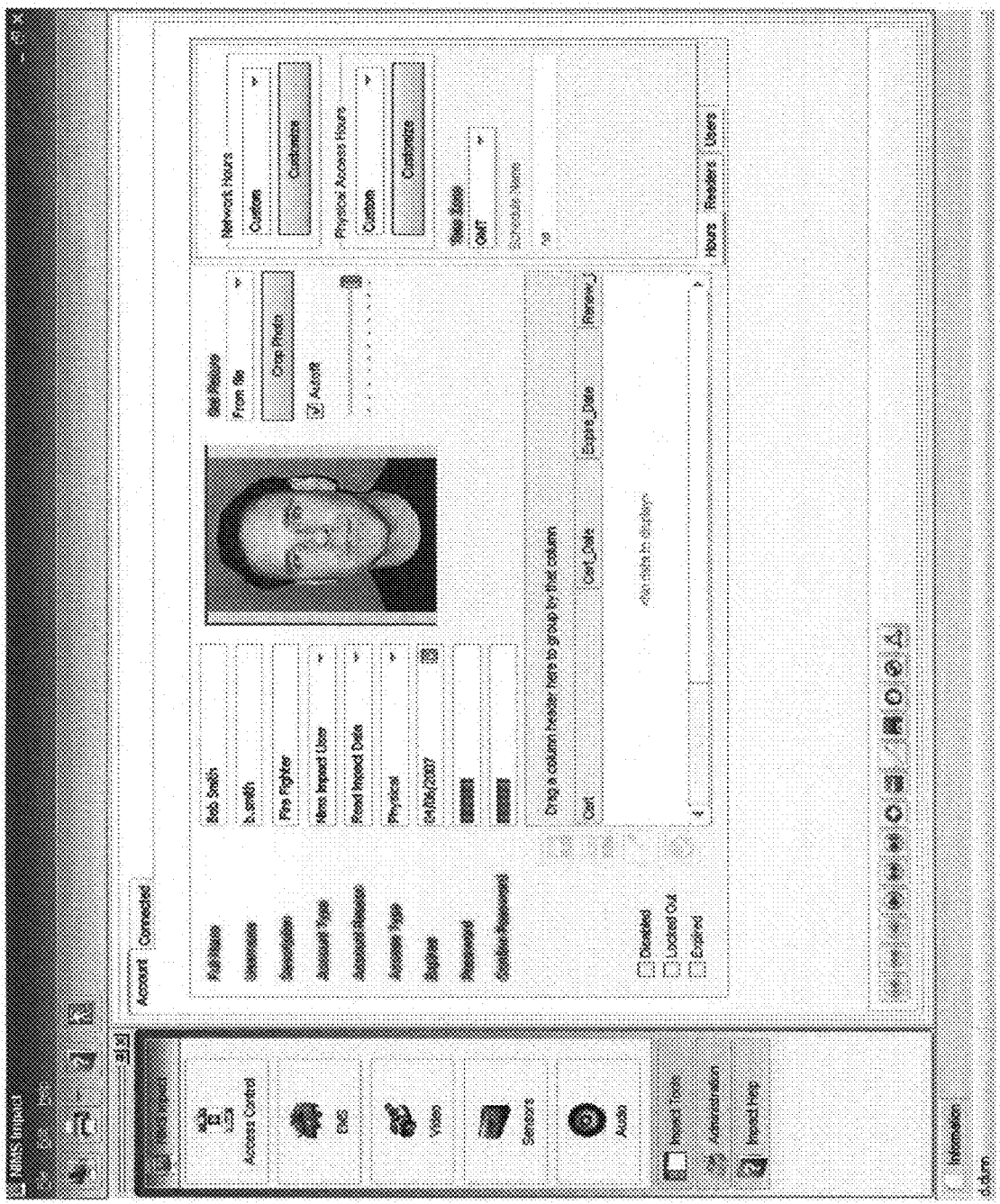
FIGS. 6-37 illustrate exemplary graphical user interfaces associated with this invention.

FIGS. 6-37 illustrate exemplary GUI's associated with the security system. With all the exemplary GUI's different skins can be selected that are suitable for different lighting environments, thus allowing the application to be easily seen inside or outside, while it is bright or dark, in red, blue, green, yellow, white light, etc. In particular, FIG. 6 illustrates an exemplary access control GUI where a user would go to add other users, permit what they can do have access to (i.e., logical and/or physical), and the hours and zones they have access to these resources. Other things can be controlled here such as the person's certifications and username and password. The Connected Tab (located above the Full Name) shows a list of all the different users that are currently connected to the system.

The Reader button (located bellow the Time Zone) will group the card readers into logical groups that will be considered one of many zones. The Users button gives you a list of all the users that have been added into the Access Control for quick navigation to a specific user.

Figure 7:
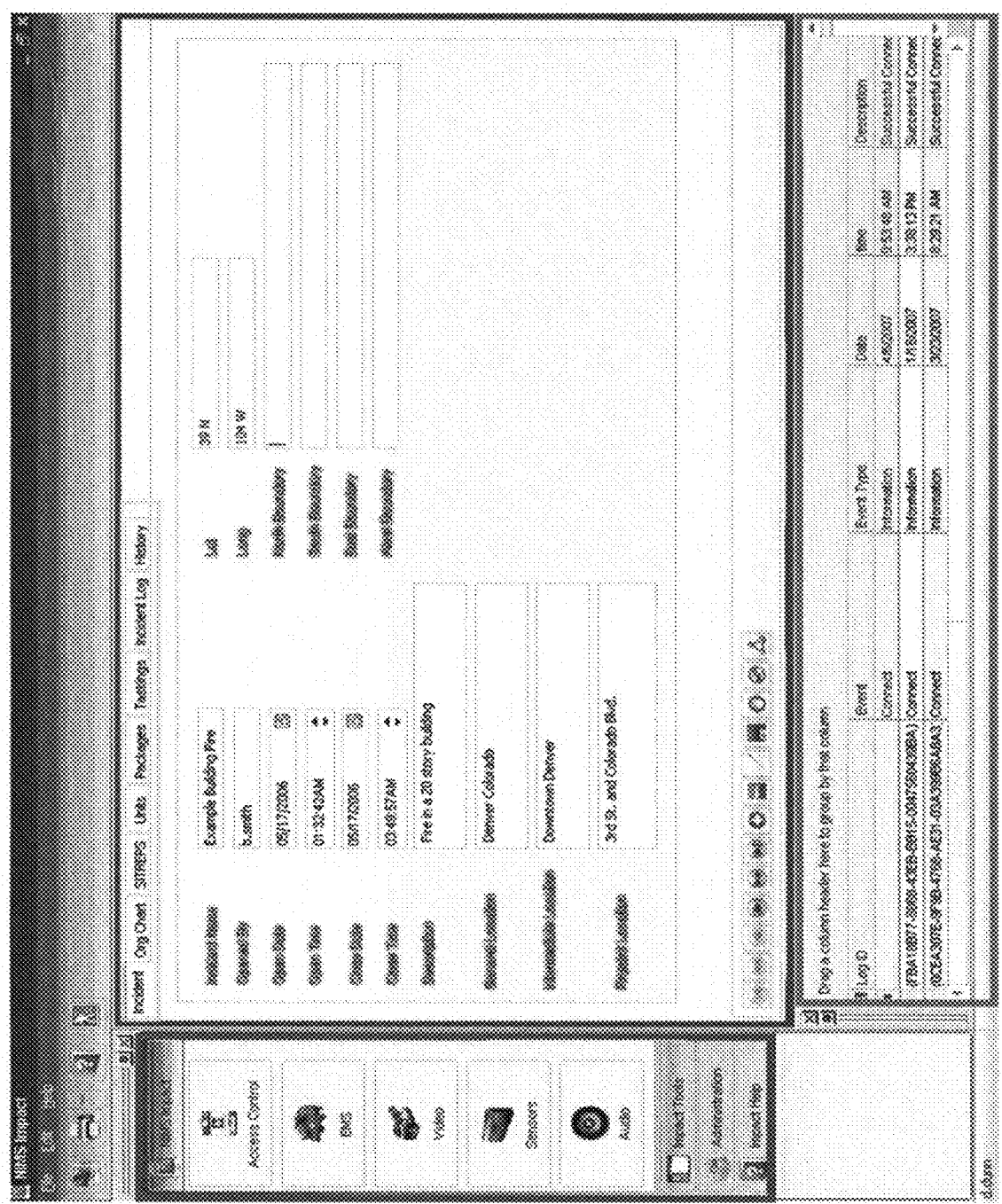

FIG. 7 illustrates an exemplary main navigation menu. The main navigation menu allows a user to move through the application. It can be moved as well as set to auto hide in case you need more screen space for the content area. The main area in the content area. All the tools selected from the main menu can be illustrated in this main portion. Tabs or buttons are also provided in this interface to access other features of the system. In this example, the tabs are "org chart," "packages," etc. The lower portion of the GUI is the log. The log illustrates all the events that have happened such as a connection to the server. Like the main menu, this can be moved, resized, or set to auto hide, and each event in the log can be selected for additional information.

Figure 8:
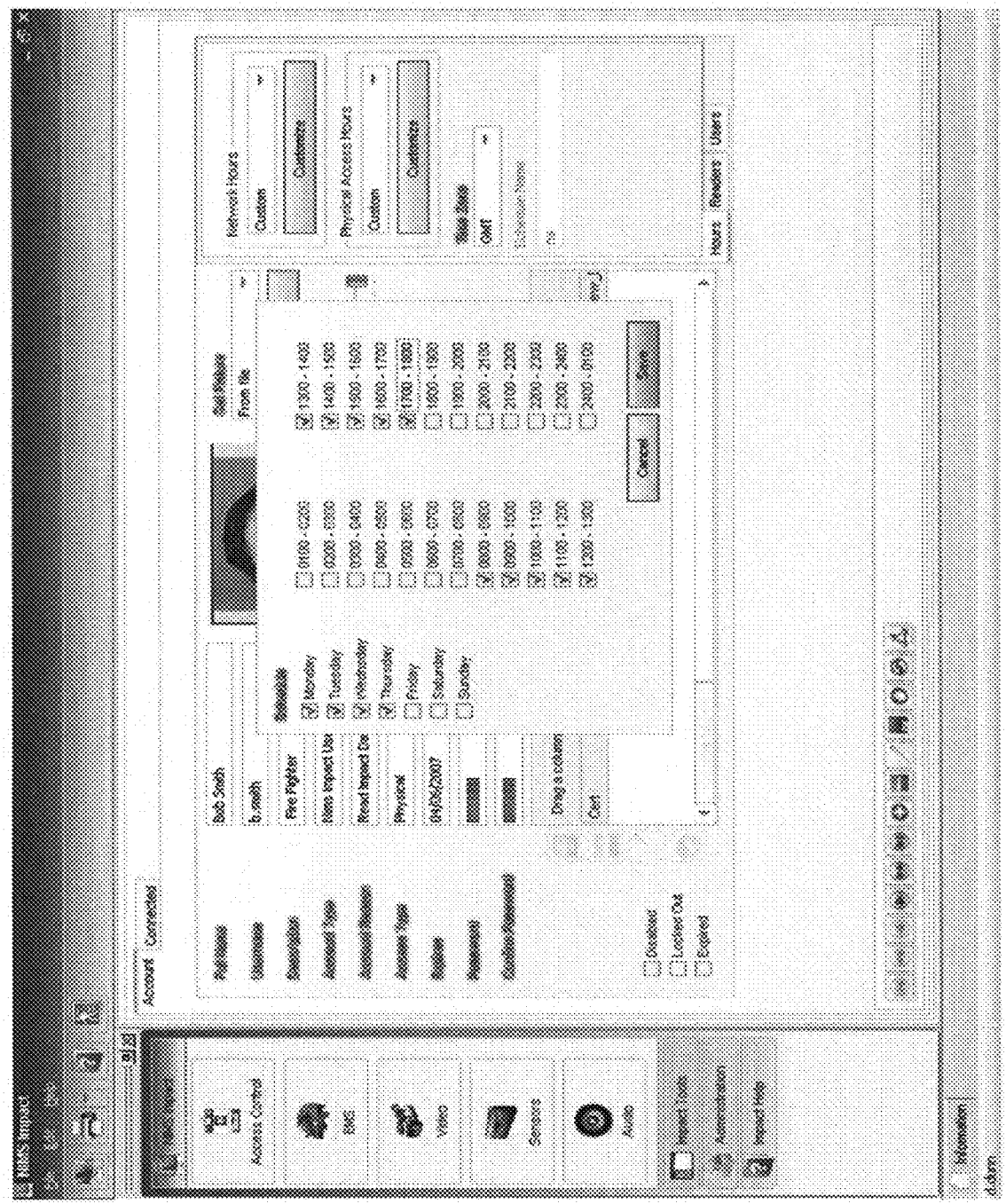

FIG. 8 illustrates an exemplary custom time view GUI where a user can create custom times that a user is allowed into either physical or the network. Times can be set from any day of the week and can be controlled down to the hour.

Figure 9:
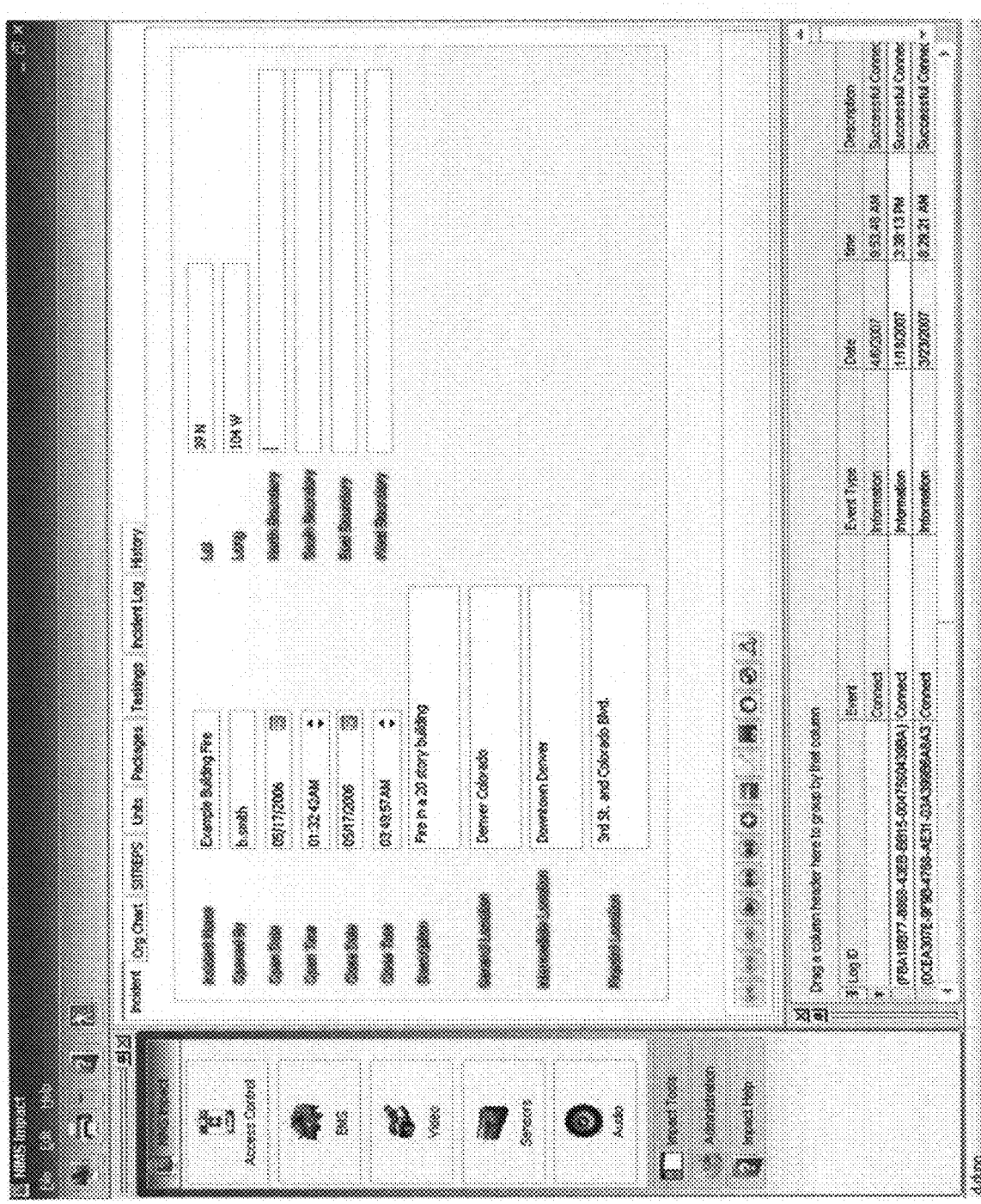

FIG. 9 illustrates an exemplary incident GUI. The Incident screen gives a quick overview of the scene that includes who opened it, the date it was opened and closed, and location. Additionally, historical data can be shown so lessons learned from one event can assist in the decision making process.

Figure 10:
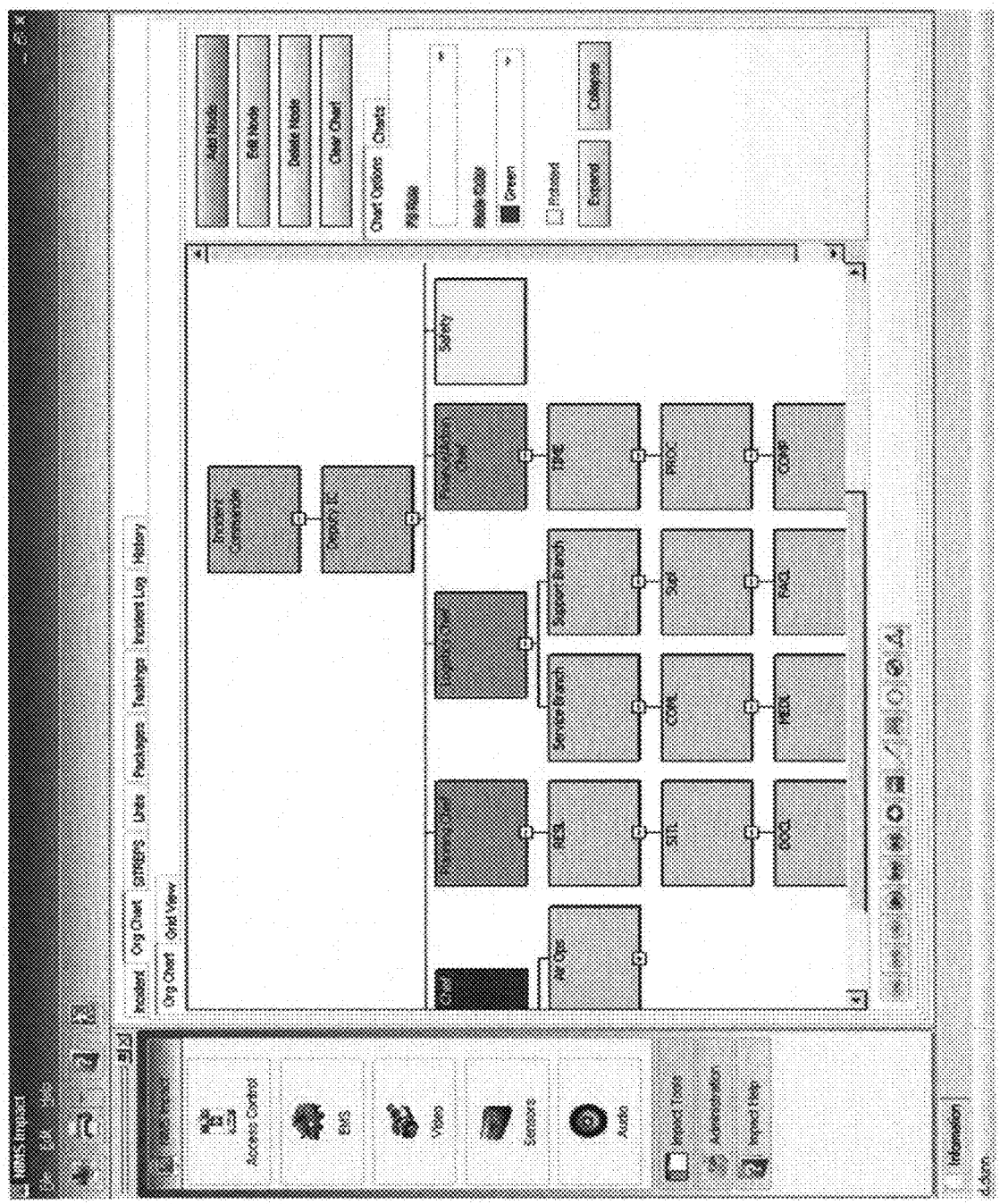

FIG. 10 illustrates an exemplary Org Chart (Organization Chart) that can be used to see a graphical representation of the incident command structure under, for example, a HSPD. By simply dragging and dropping, a single person or an entire group can be placed under a different commander. A user can add or remove any of the nodes for situations that require different specialists. A user can also fill the role of the positions with people that have been added to the Access Control area.

Expand and Collapse button controls all the boxes and expands all of them, or collapses all of them.

Figure 11:

FIG. 11 illustrates in greater detail some of the Org Chart information.

Figure 12:
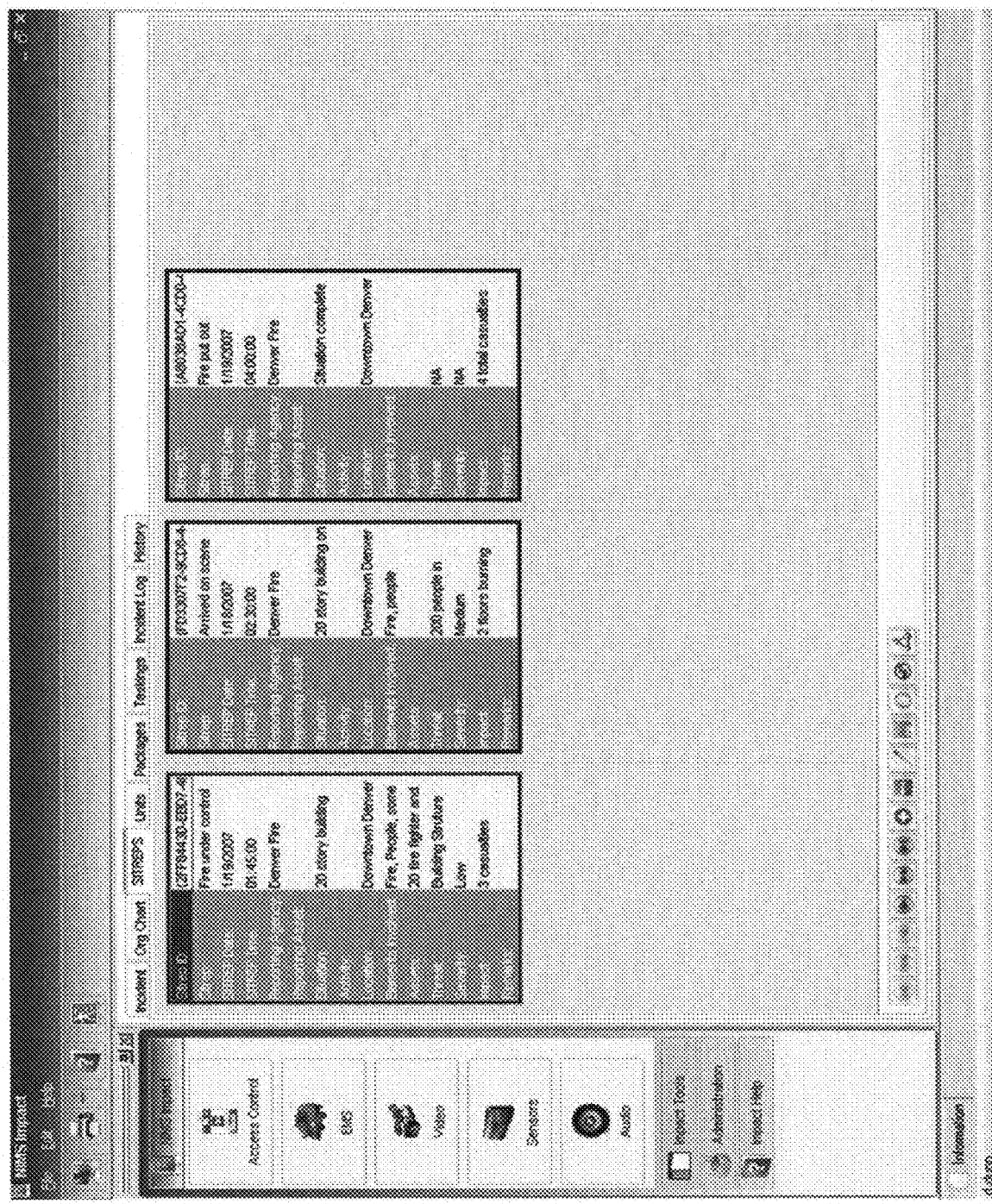

FIG. 12 illustrates an exemplary SITREPS (Situation Reports) GUI. The situation reports can be updated every time something is changed in, for example, an emergency scene, event or exercise.

Figure 13:
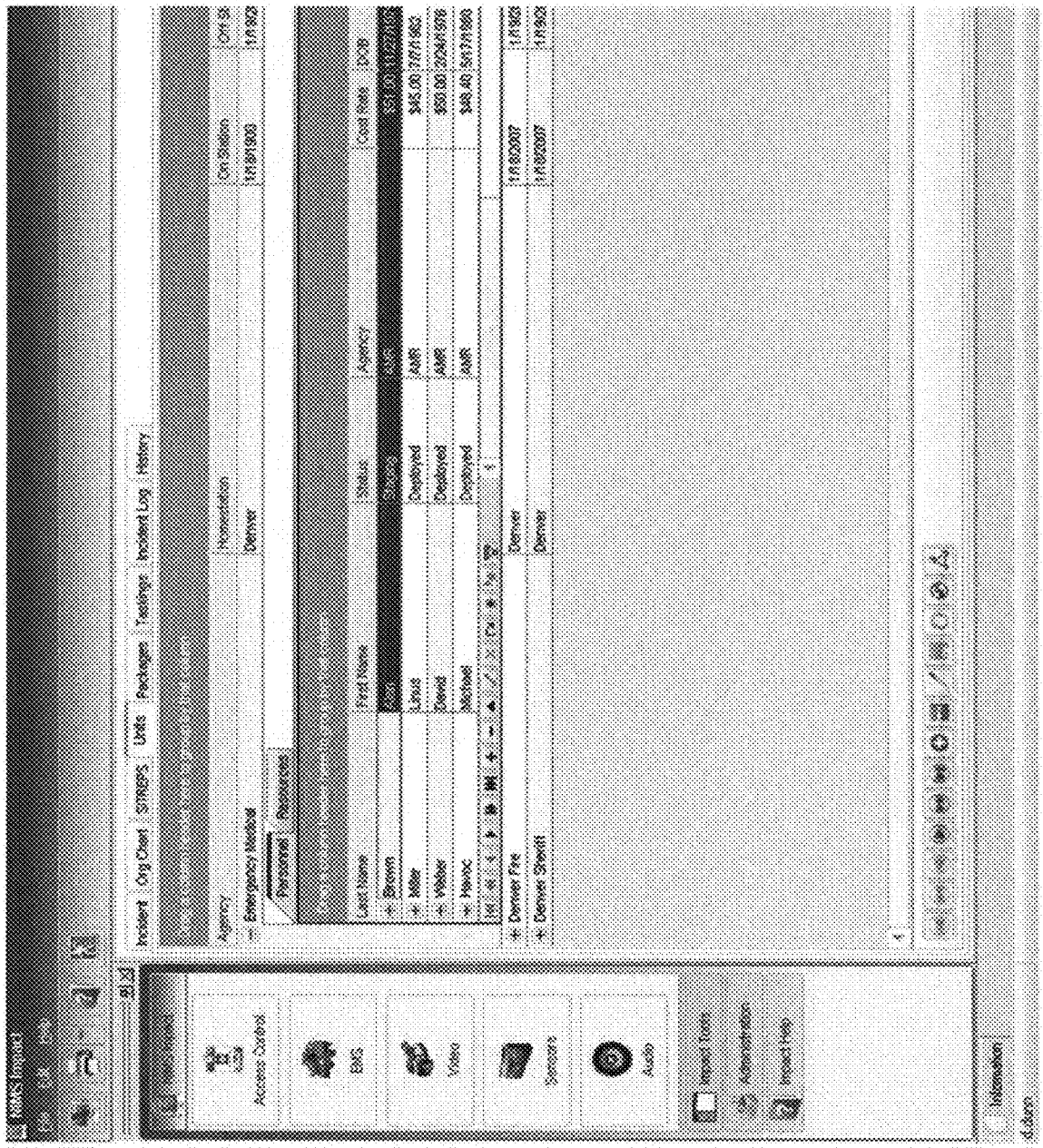
Figure 14:
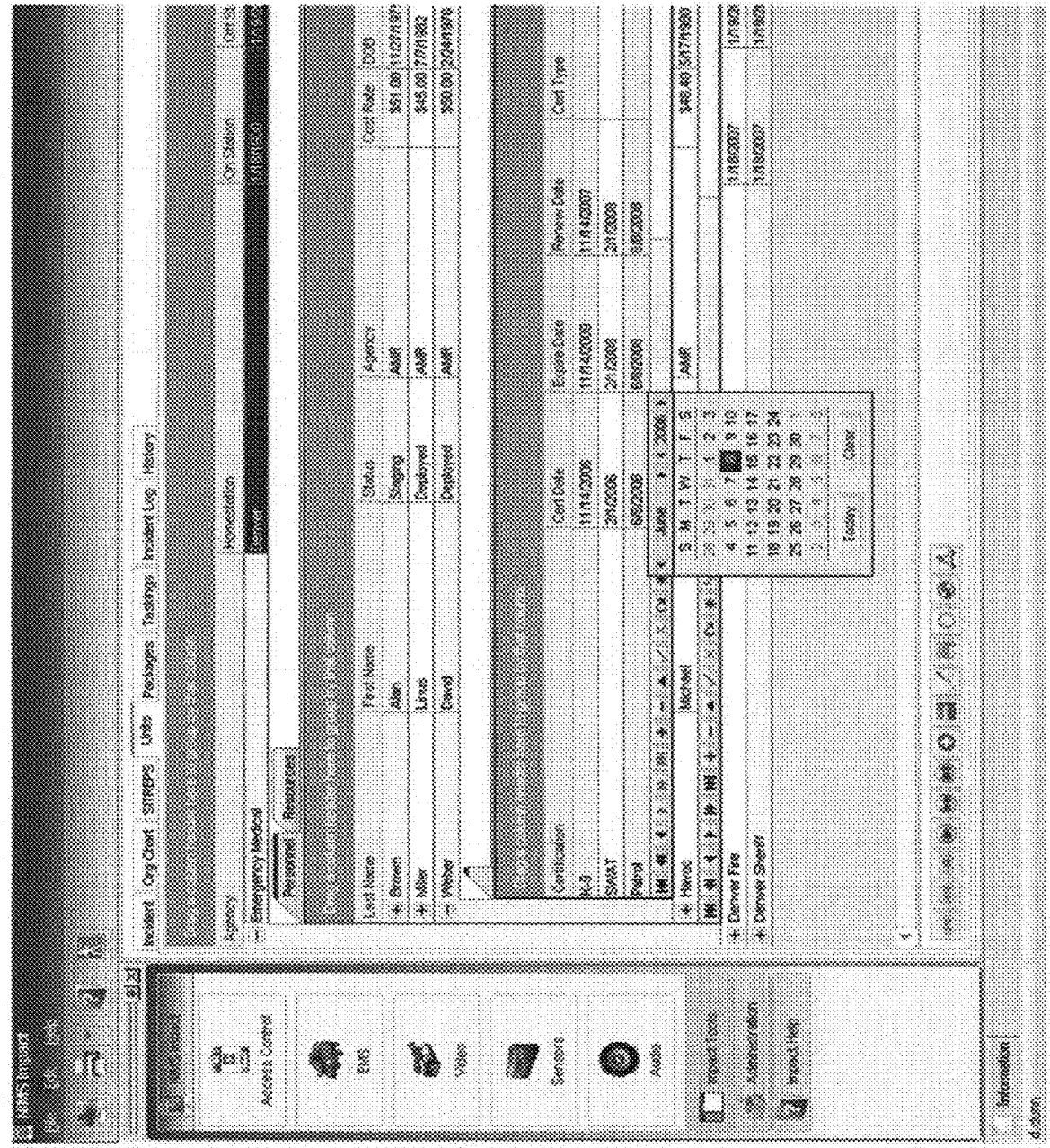

FIGS. 13 and 14 illustrate lists all of the different agencies that are at the scene. Within each agency is a list of all the employees. Each employee has information about them such as status (deployed, staging, etc.), blood type, and cost rate. Then each employee will have a list of certifications that they carry. Information held here pertains to when did the individual receive the certification, when does it expire, when is he expected to have it renewed, and if the person has insurance.

Figure 15:
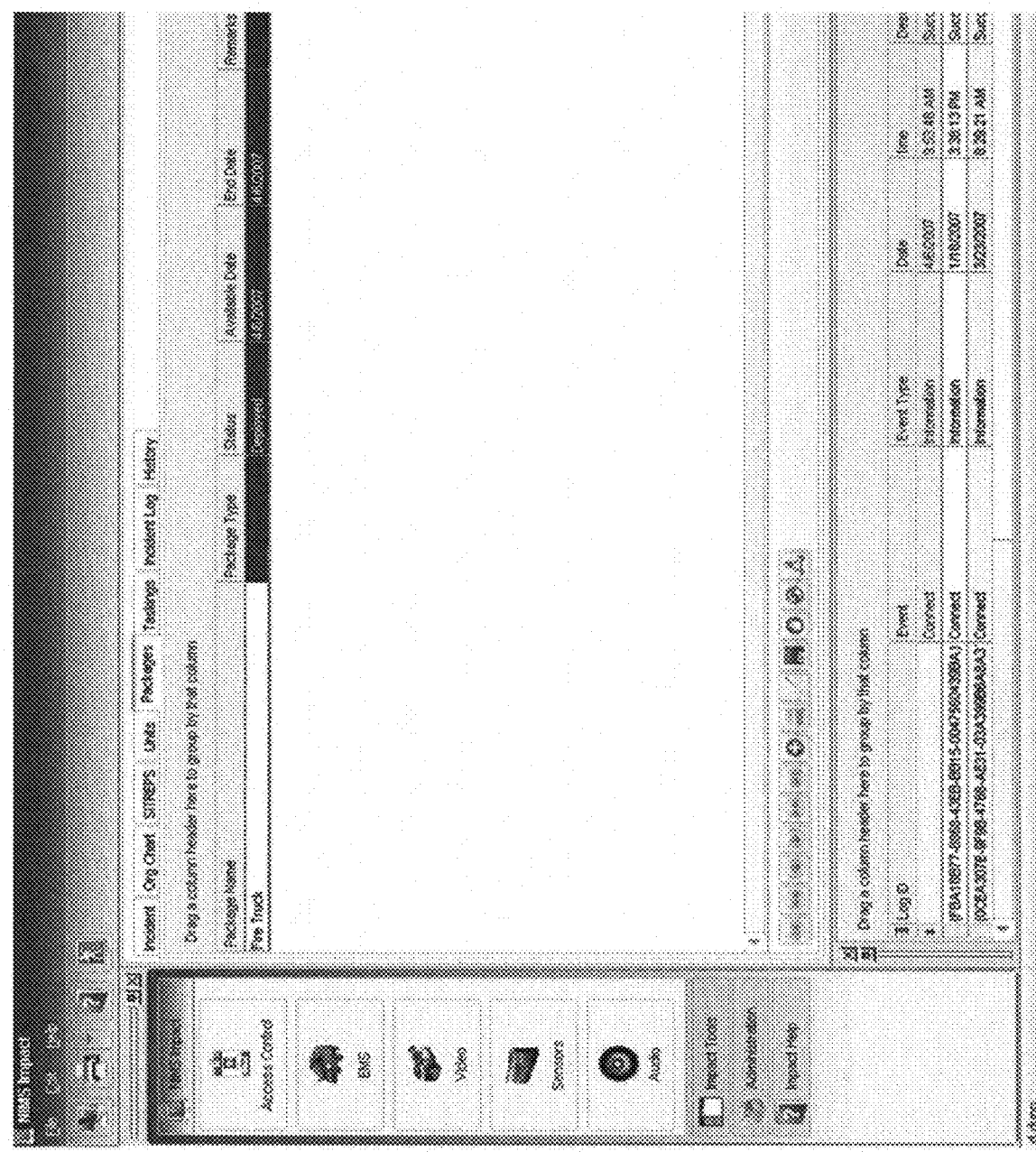

FIG. 15 illustrates the different packages and their status, including when they arrived at the emergency scene.

Figure 16:
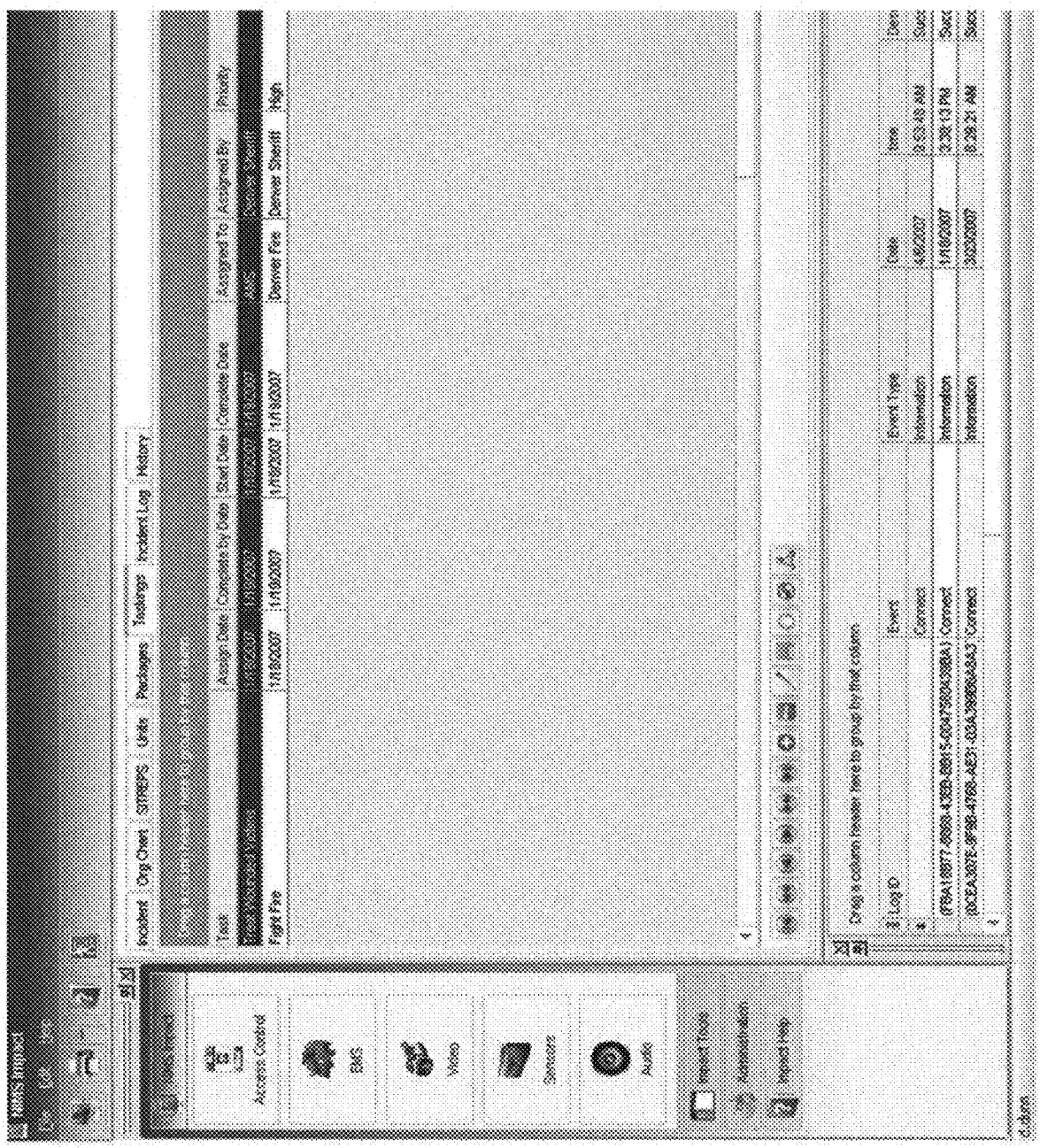

FIG. 16 illustrates an exemplary tasking screen, a user can assign various tasks that can include a description, when it was assigned, when it needs to be completed by, who it is assigned to, priority, and it's sensitivity. Tasks can be assigned to an individual or to a group/agency.

Figure 17:
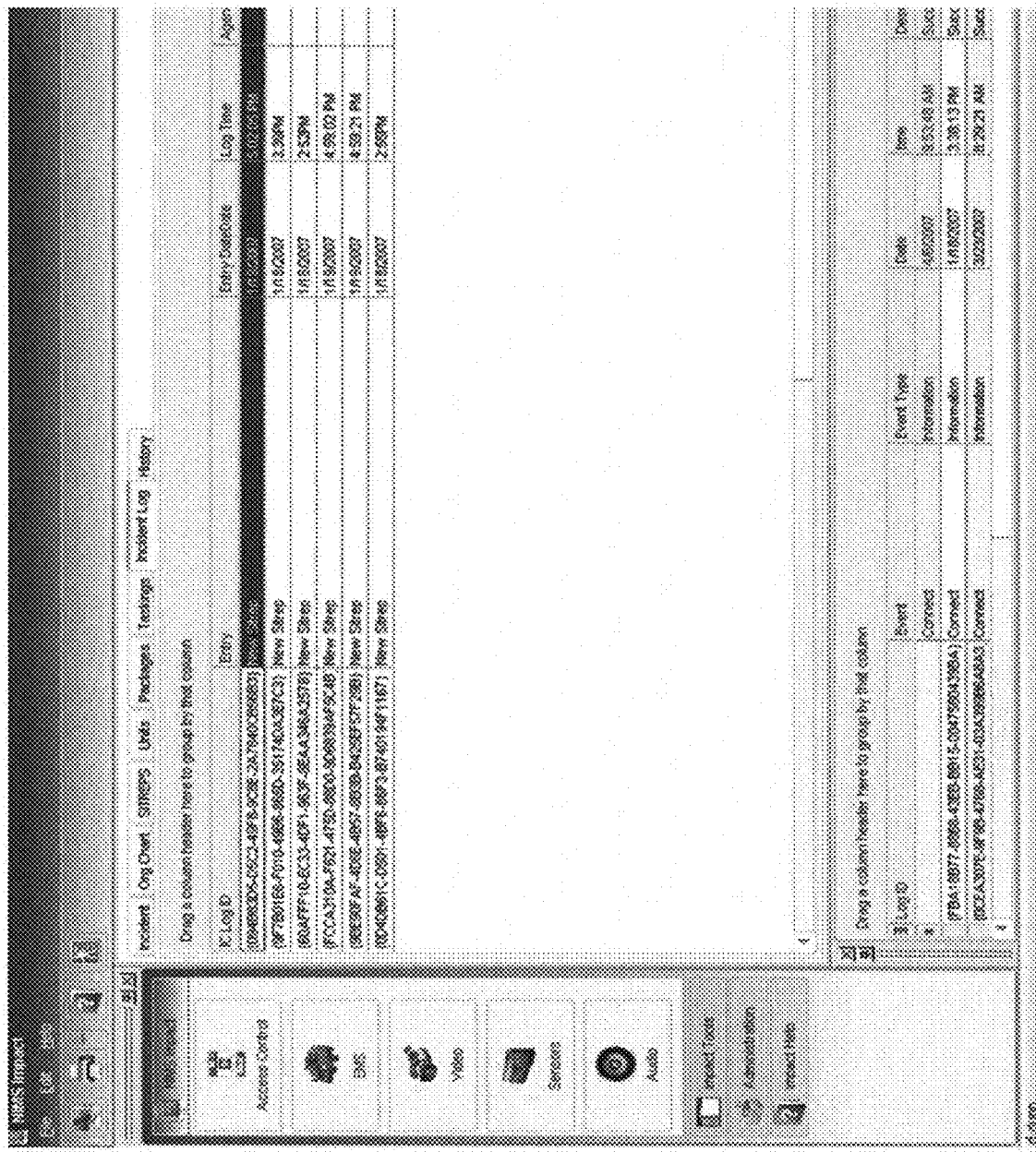

FIG. 17 illustrates an auto populated log that provides a brief overview of everything that has occurred within this incident including when a new Incident Commander comes in, when new SITREPS are created, and when packages arrive.

Figure 18:
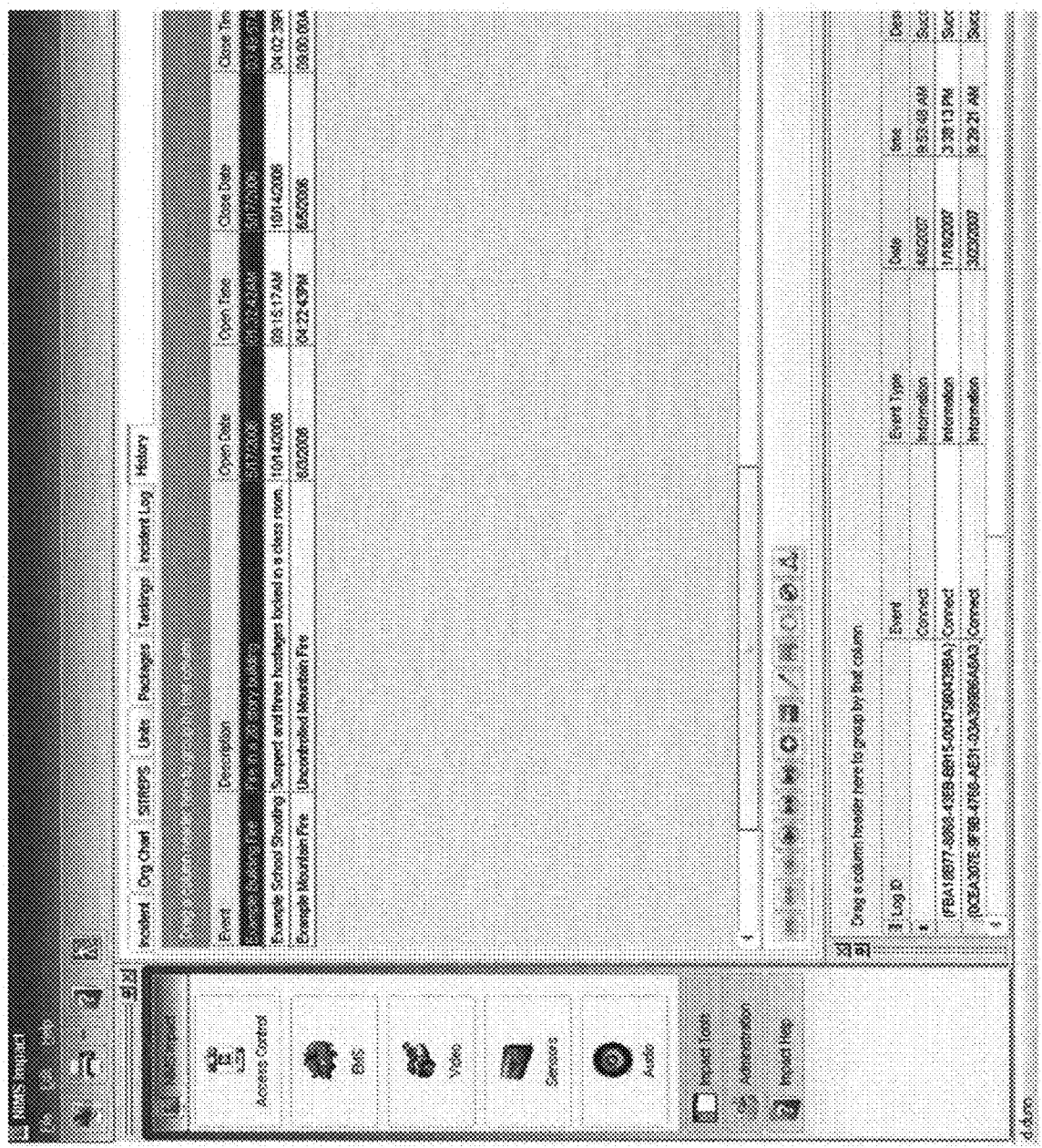

FIG. 18 illustrates the History Tab showing a brief overview of all the incidents for quick reference. When a user selects one of the incidents, that incidents information is seen through the rest of the EMS tabs. This is used for not only review, but if an incident is happening that is similar to a past scene, it can provide for a quick way of seeing some of the possibilities that could happen.

Figure 19:
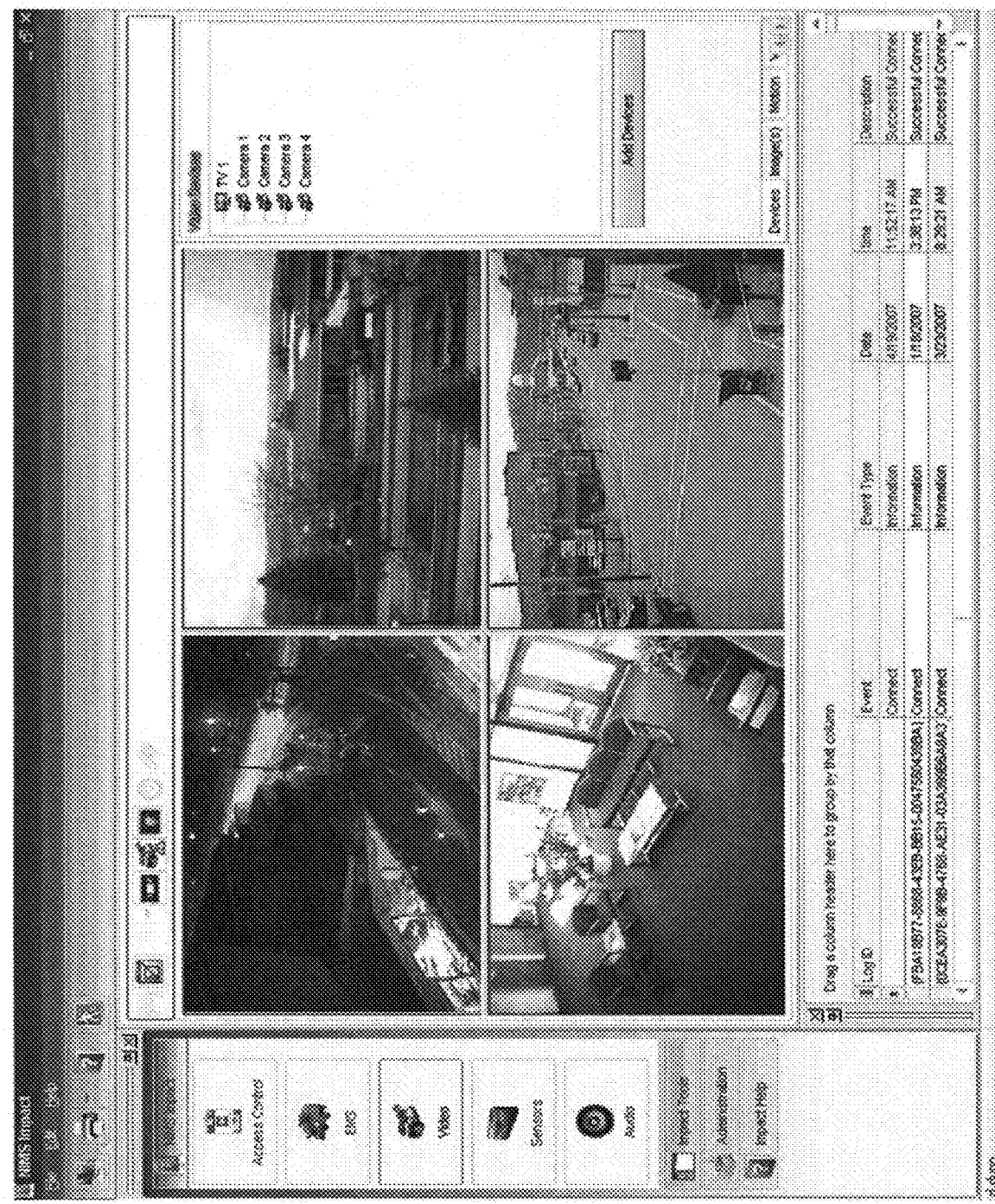

FIG. 19 illustrates an exemplary video GUI. The video GUI at least supports IP, USB, and CCTV and wireless cameras with support for audio. The video GUI can auto adjust if more than four cameras are added and the ability to manually resize each box. Snapshots and recording can be automated through rules, so if someone tries to swipe a card that is invalid, you can automatically take a snapshot capturing the persons face. Motion detection can be used for the entire camera view or you can set up grids so that it will only record if there is motion within that area. Frame rate can also be controlled from here.

Figure 20:
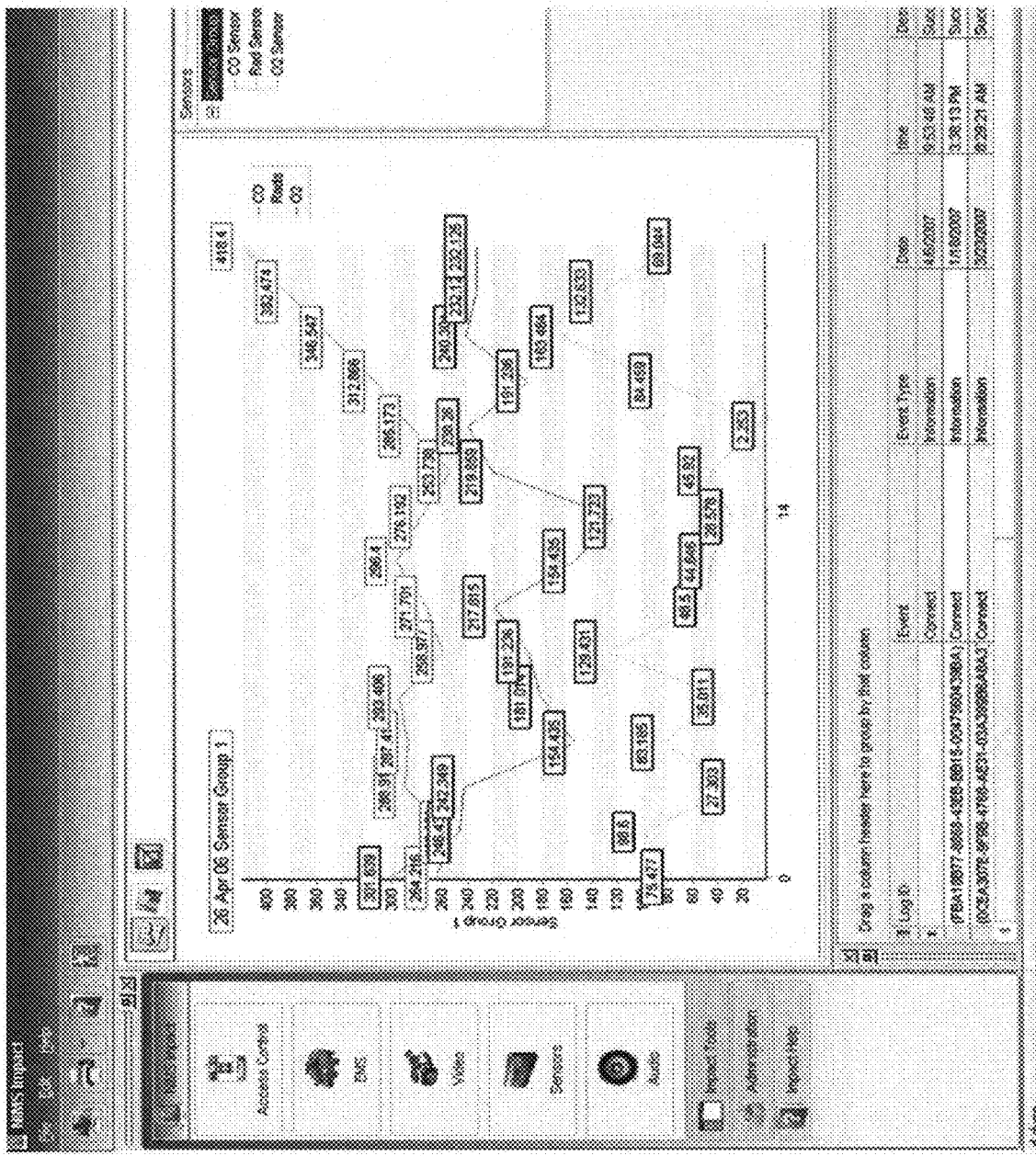

FIG. 20 illustrates an exemplary sensor GUI. The sensor GUI displays data from a sensor that can be captured and displayed as a 2D/3D graph or mapped into a GIS. A user is also able to turn on and off the various bars as well as the markers. A user can also change a bars color, width, as well as the amount of time that they are viewing in the recorded data.

Figure 22:
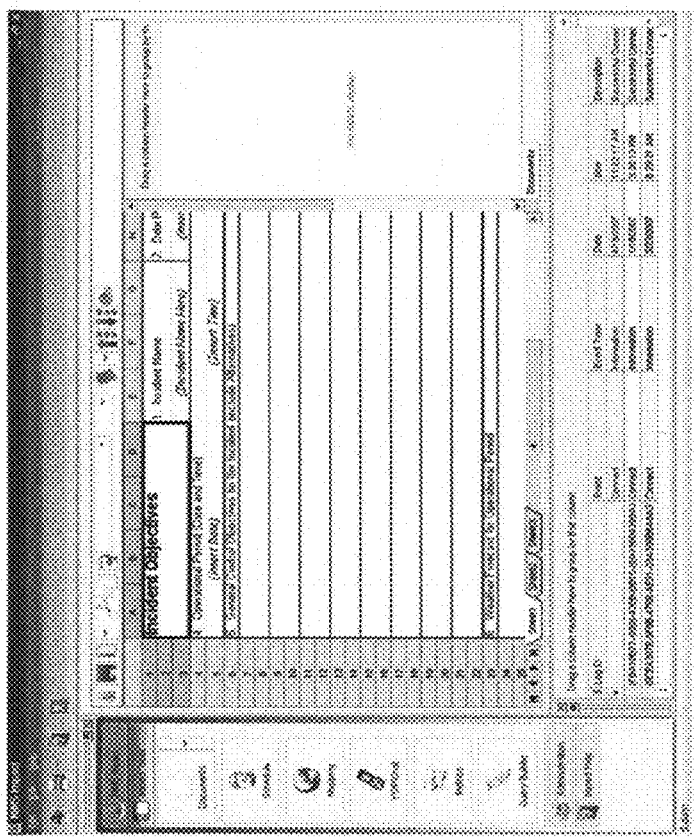
Figure 21:
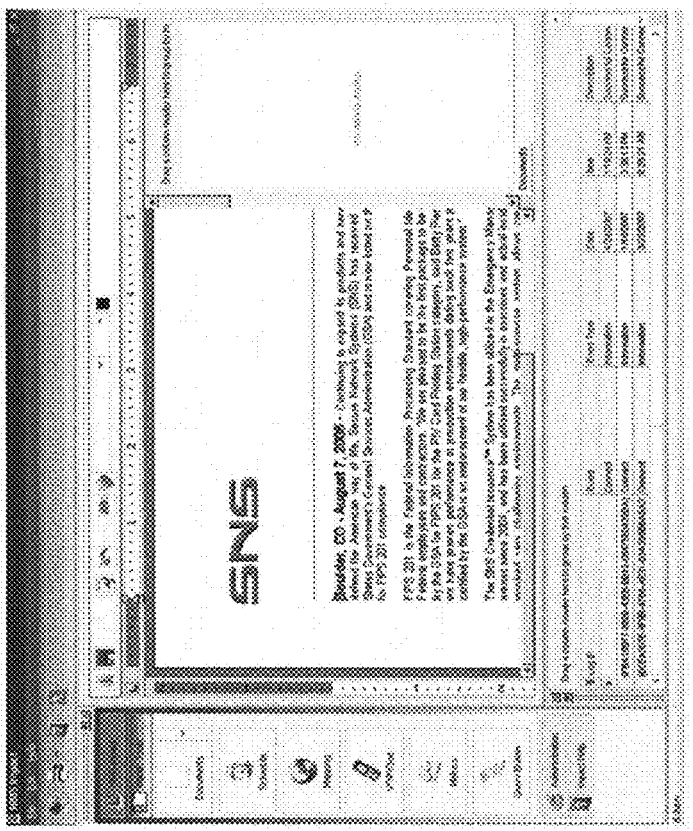

FIGS. 21 and 22 illustrate the ability to open a wide variety of various documents, including the ability to utilize a built in spell checker and thesaurus. Also supported is a built in capability to open various spreadsheets. This is where a user can come to open template-type forms that can be blank or prepopulated with data from the incident.

Figure 23:
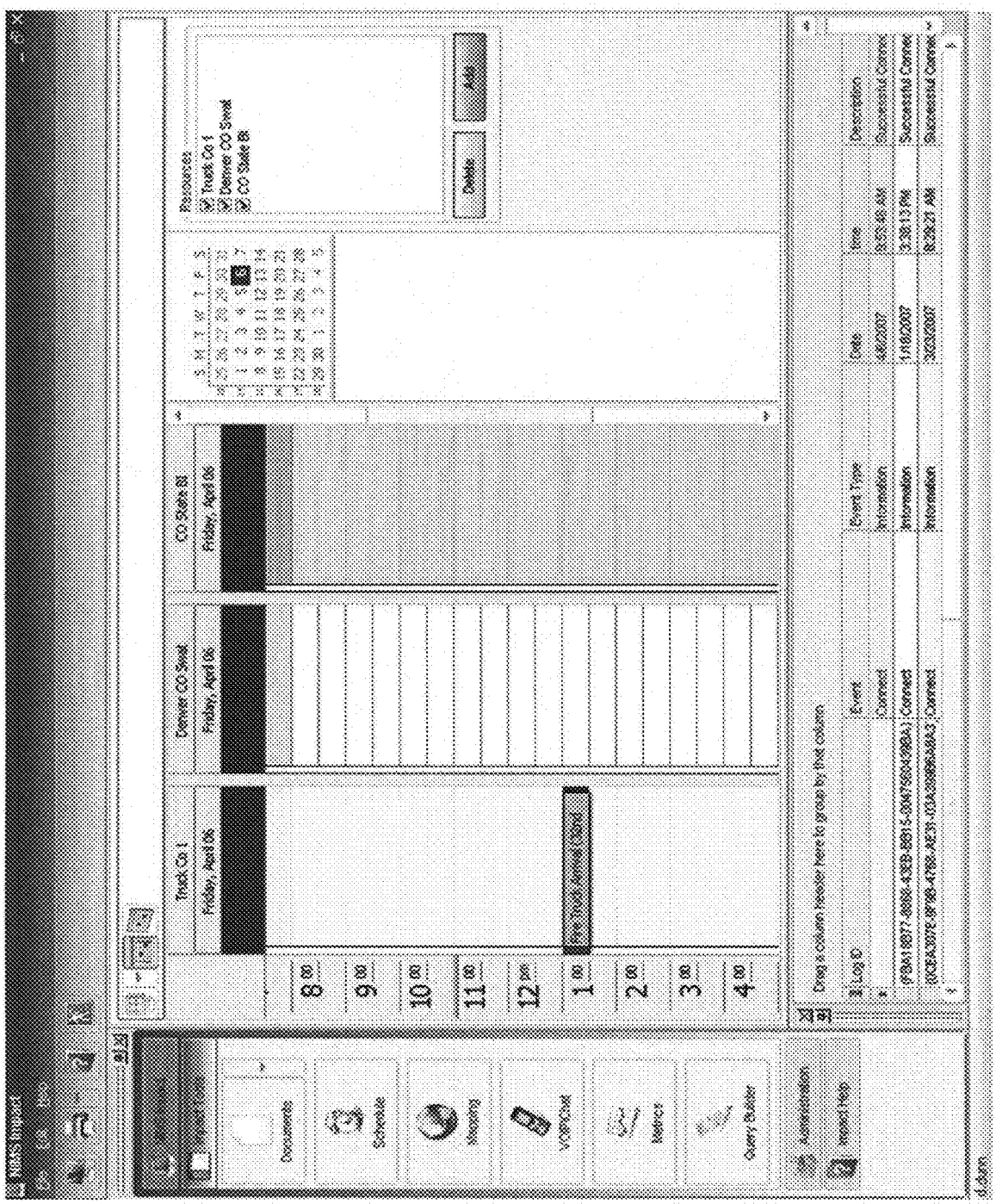
Figure 24:
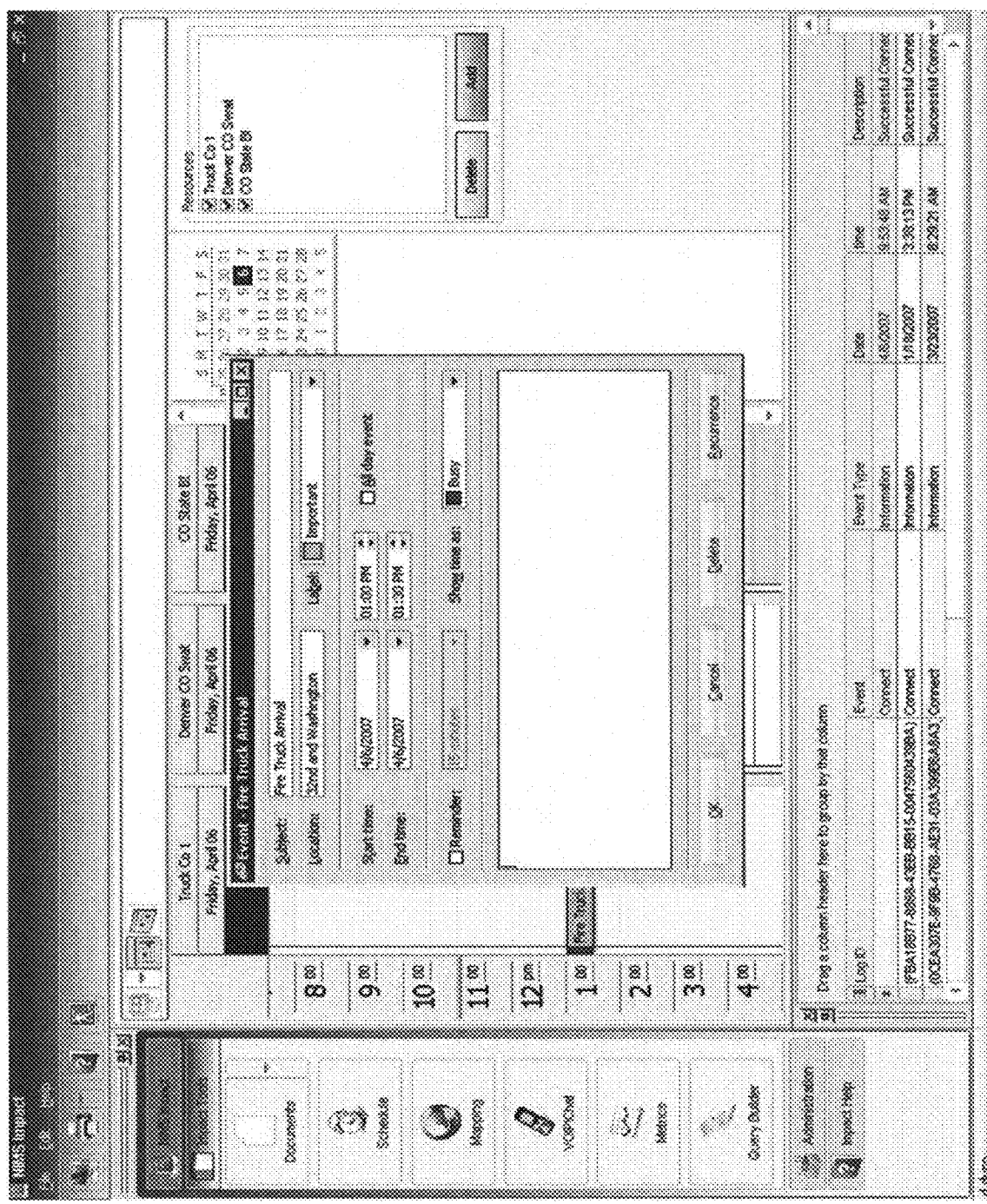
Figure 25:
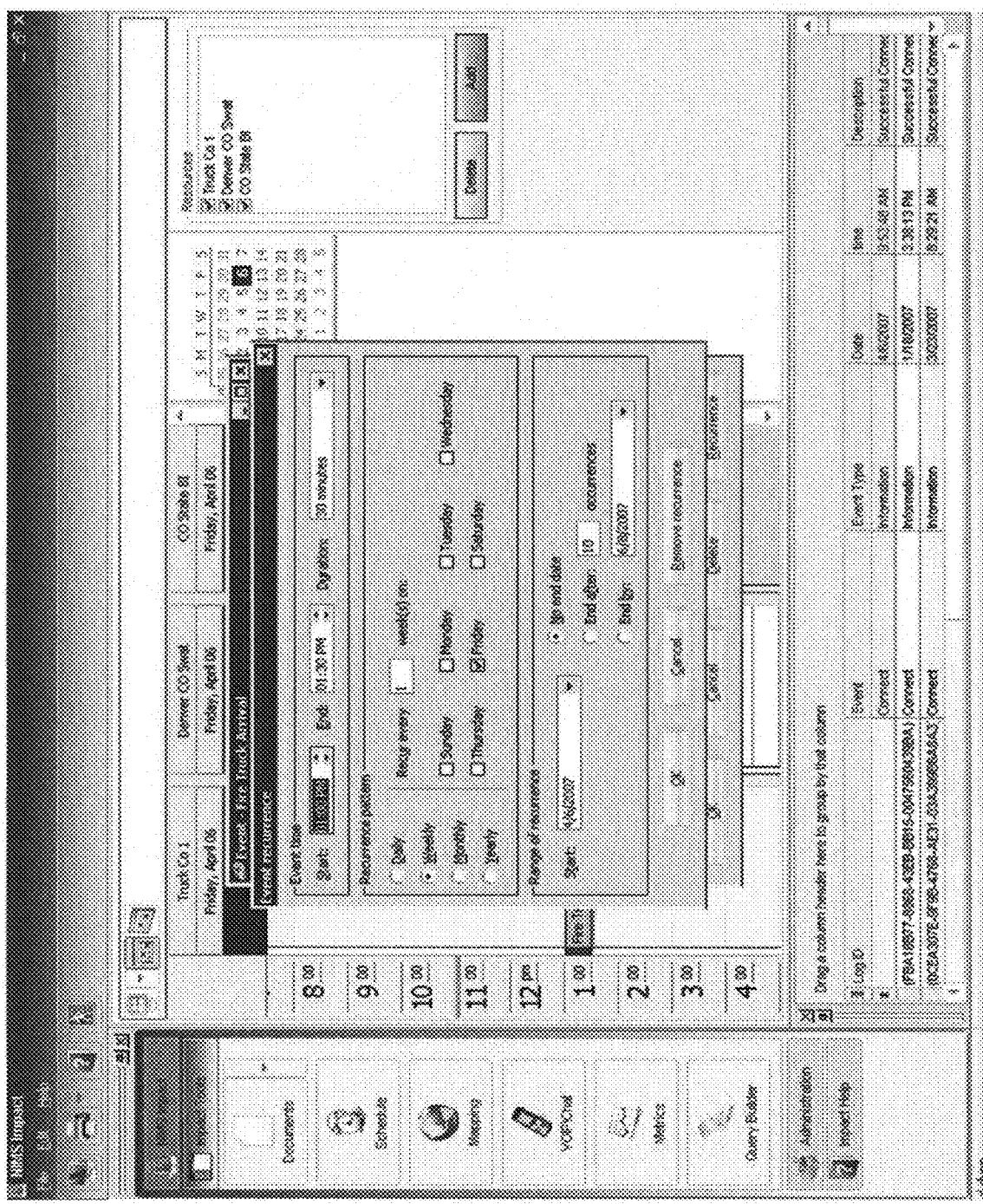

FIGS. 23-25 illustrate various scheduling interfaces. Here a user can see a daily over view of different tasks that have been scheduled. A user can delete/add new columns by clicking Delete/Add buttons on the right. A user can add a new task into a timeslot by double clicking the time that you want it to start. When a user adds an event to the time slot, it can be titled, given a location, mark what type of an event it is, show its status at that time (i.e. busy), and set a duration. A user can also set up a reassurance so this event is automatically there daily, weekly, biweekly, monthly, annually.

Figure 26:
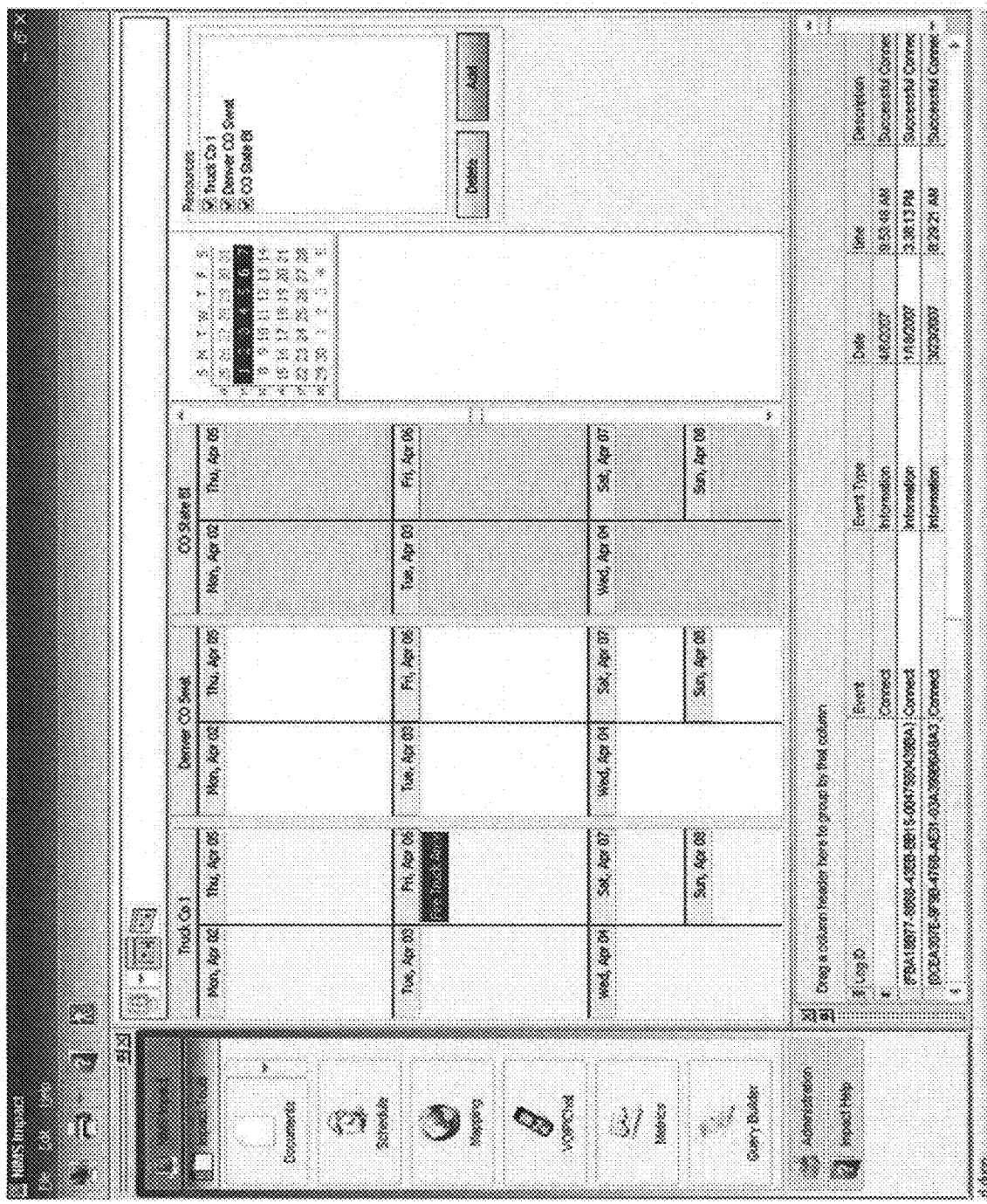
Figure 27:
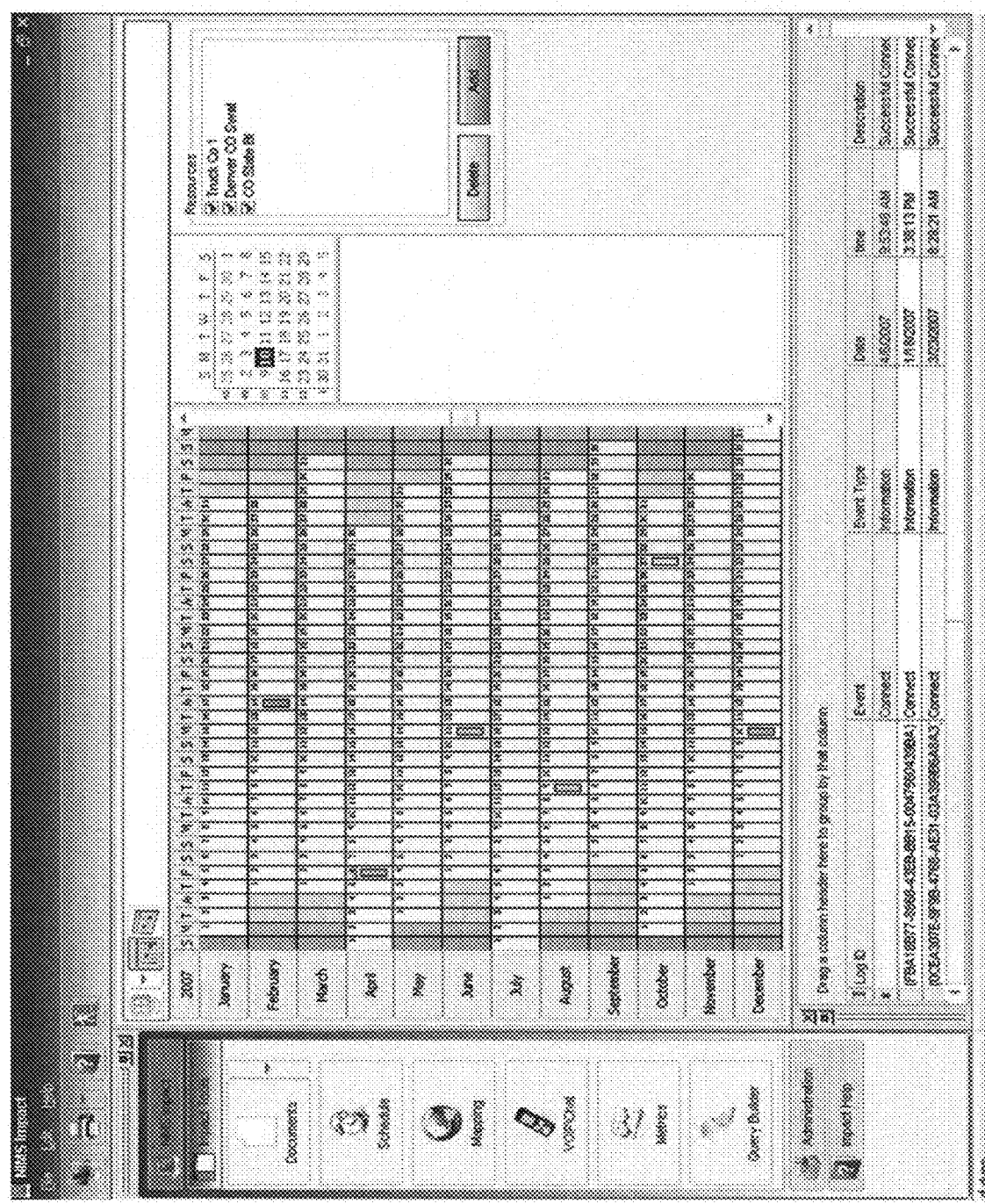
Figure 28:
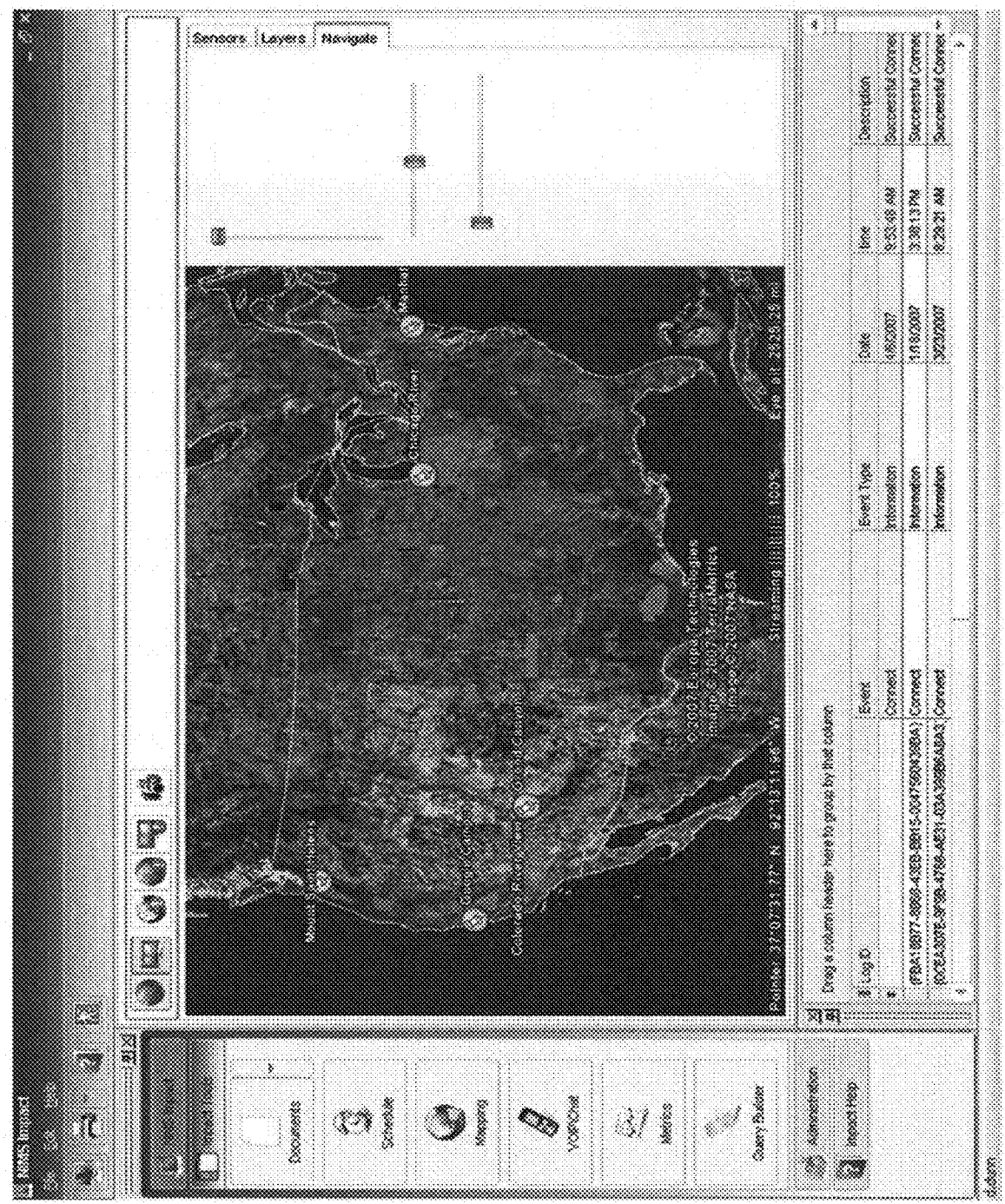
Figure 29:
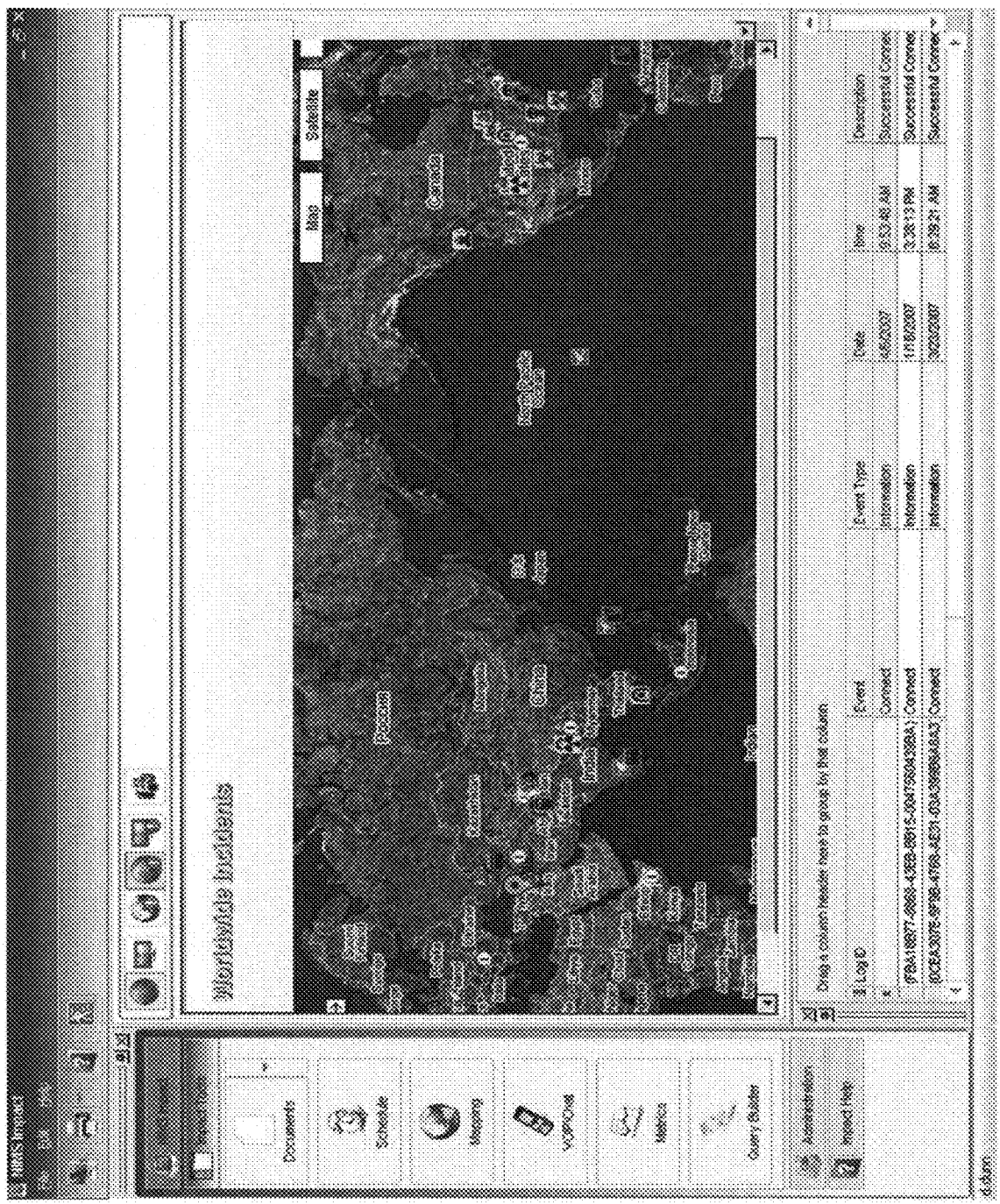
Figure 30:
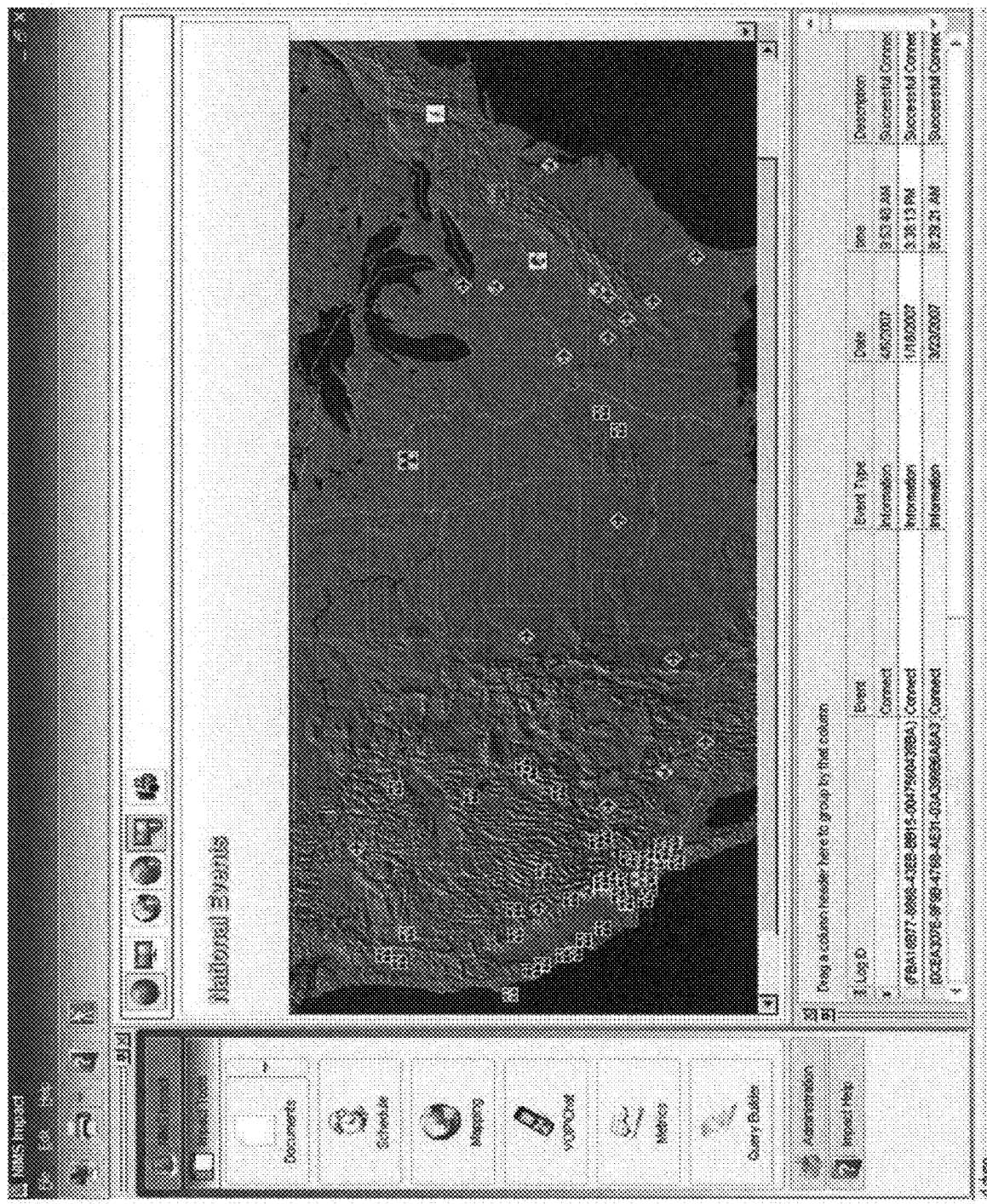
Figure 31:
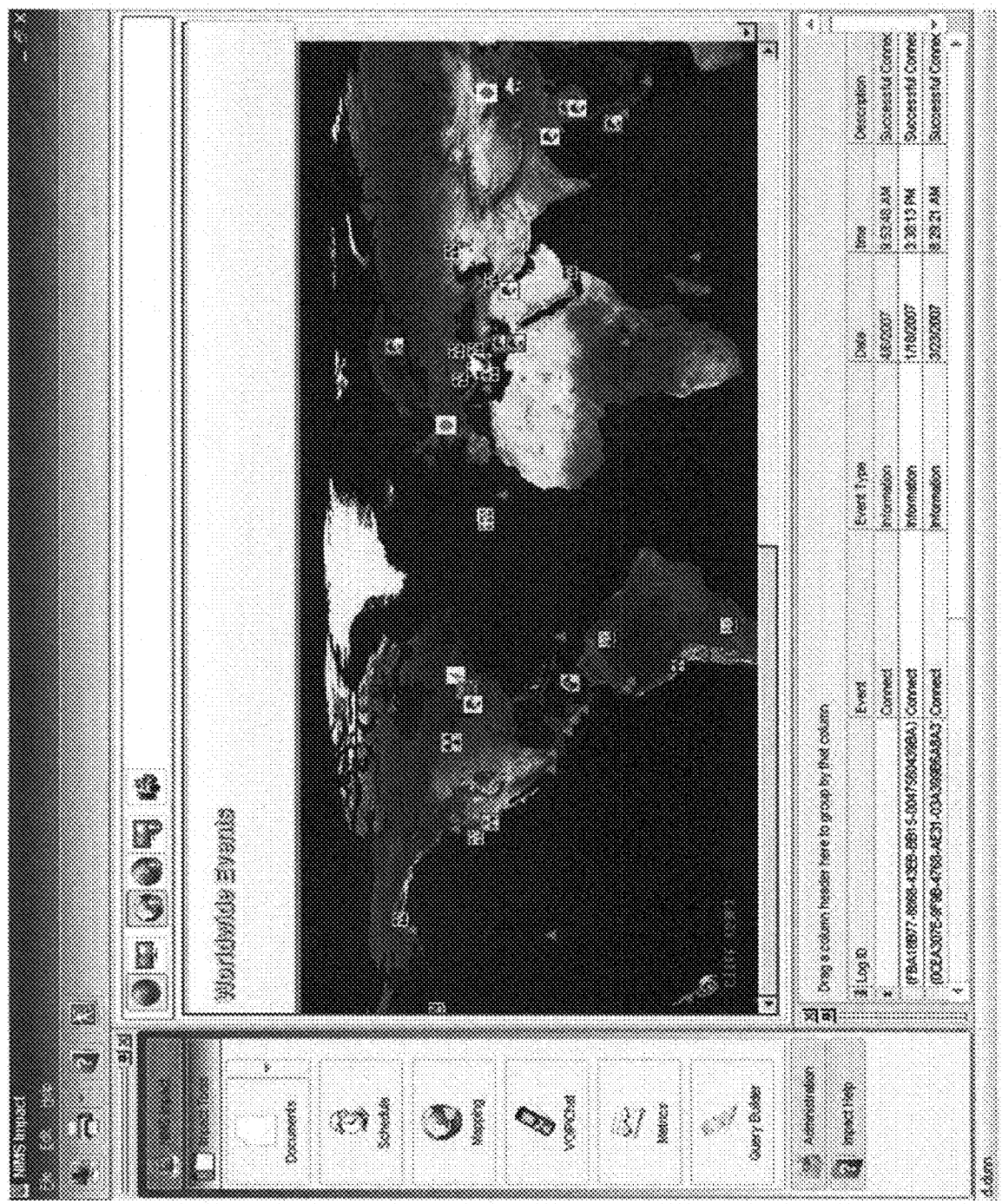

FIGS. 26-27 illustrate alternative scheduling GUI's. By changing the view to a weekly view, a monthly view, or an annual view, a user can easily see all of the appointments or scheduled events and historical data.

FIGS. 28-31 illustrate exemplary mapping GUIs. A user can use both static mapping or Internet mapping and can tilt, rotate, and zoom in through the tools on the right. A user can also bring in various layers, even to the Internet mapping that can provide different information. Terrorist alerts/maps, disasters maps and GIS data, as well as existing terra maps and GIS systems can also be obtained by the system.

Figure 32:
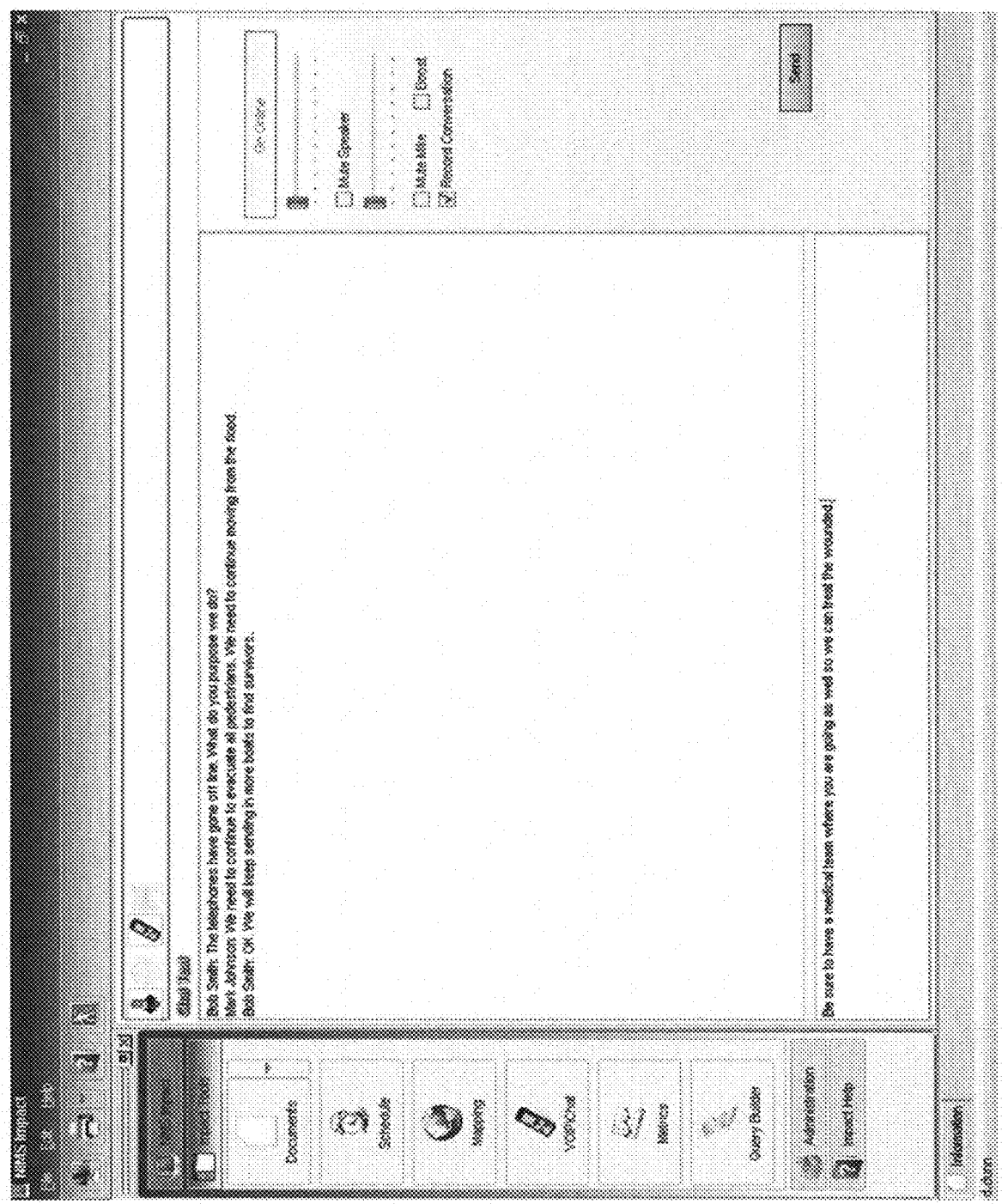

FIG. 32 illustrates a built in VOIP GUI and chat support that allows for communications as long as there is power. A user can also record VOW conversations in this GUI.

Figure 33:
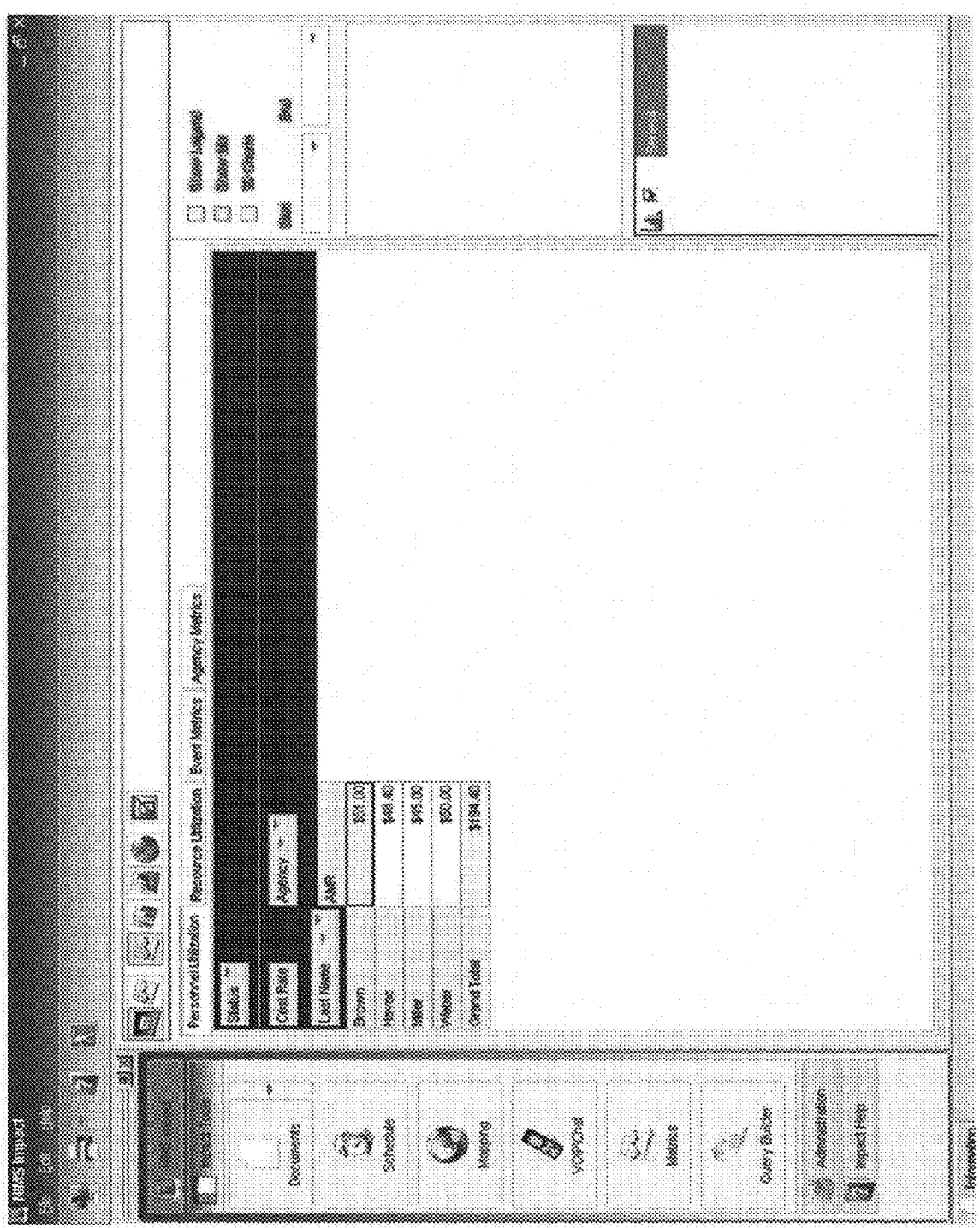
Figure 34:
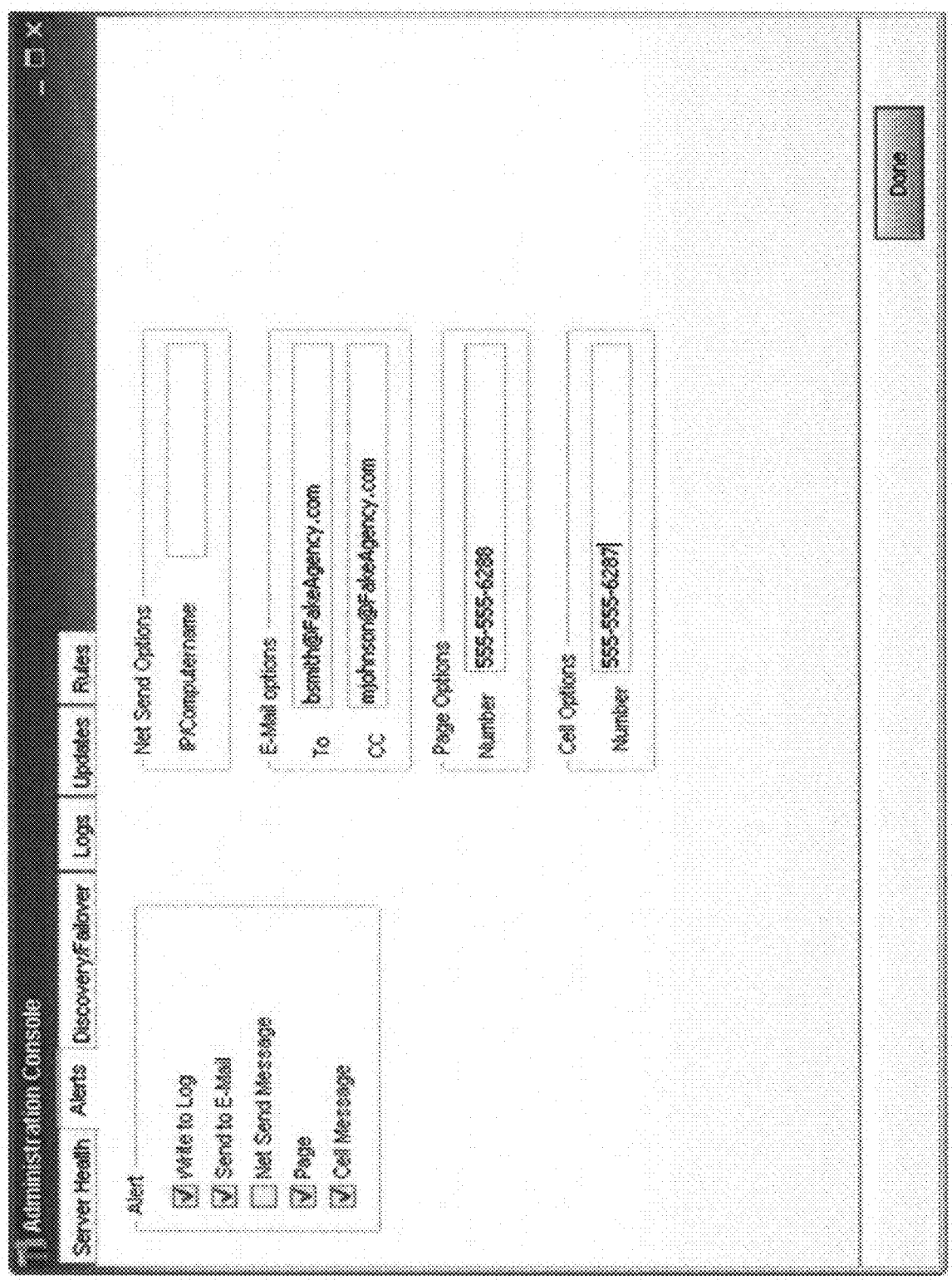
Figure 35:
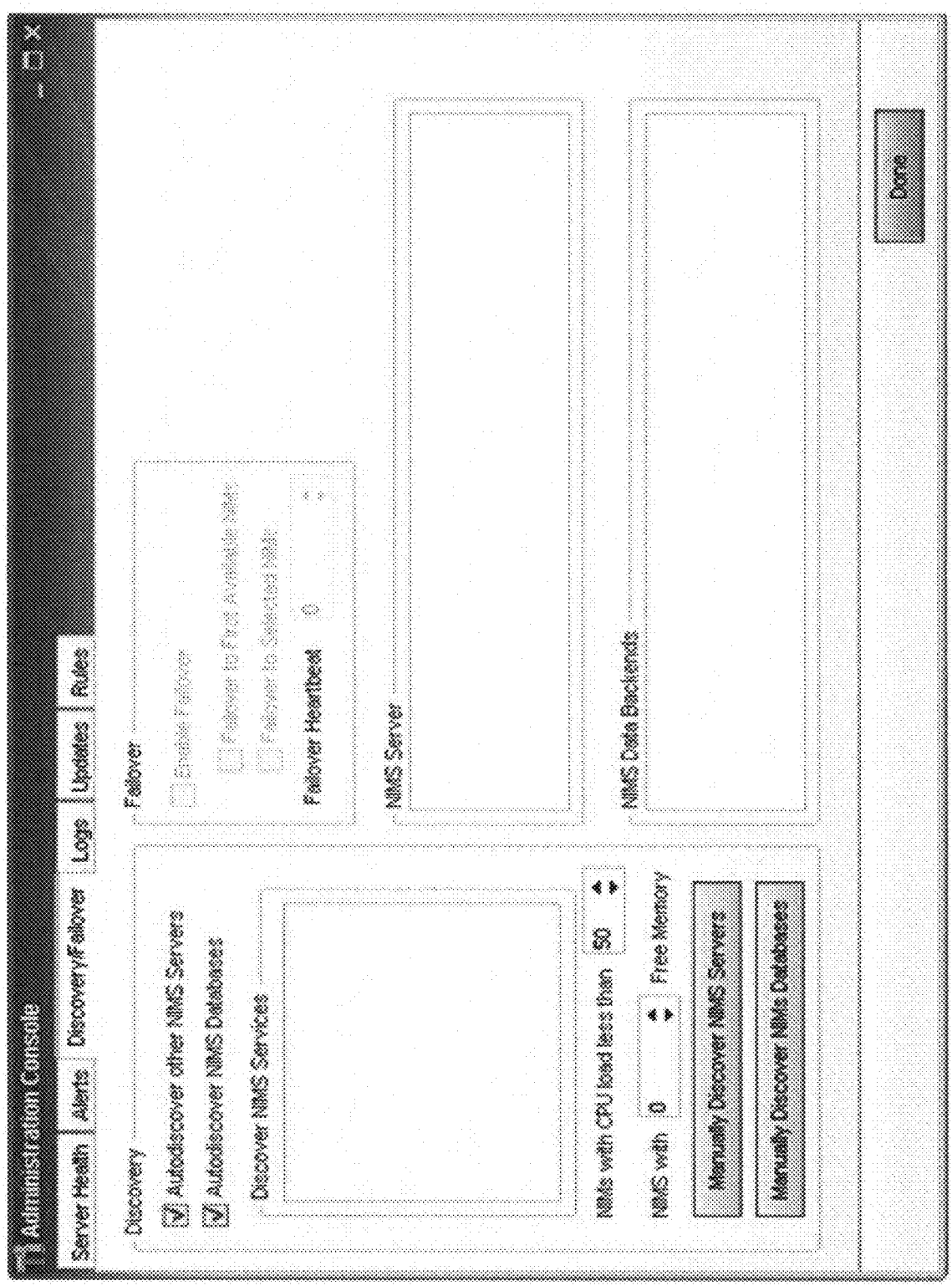
Figure 36:
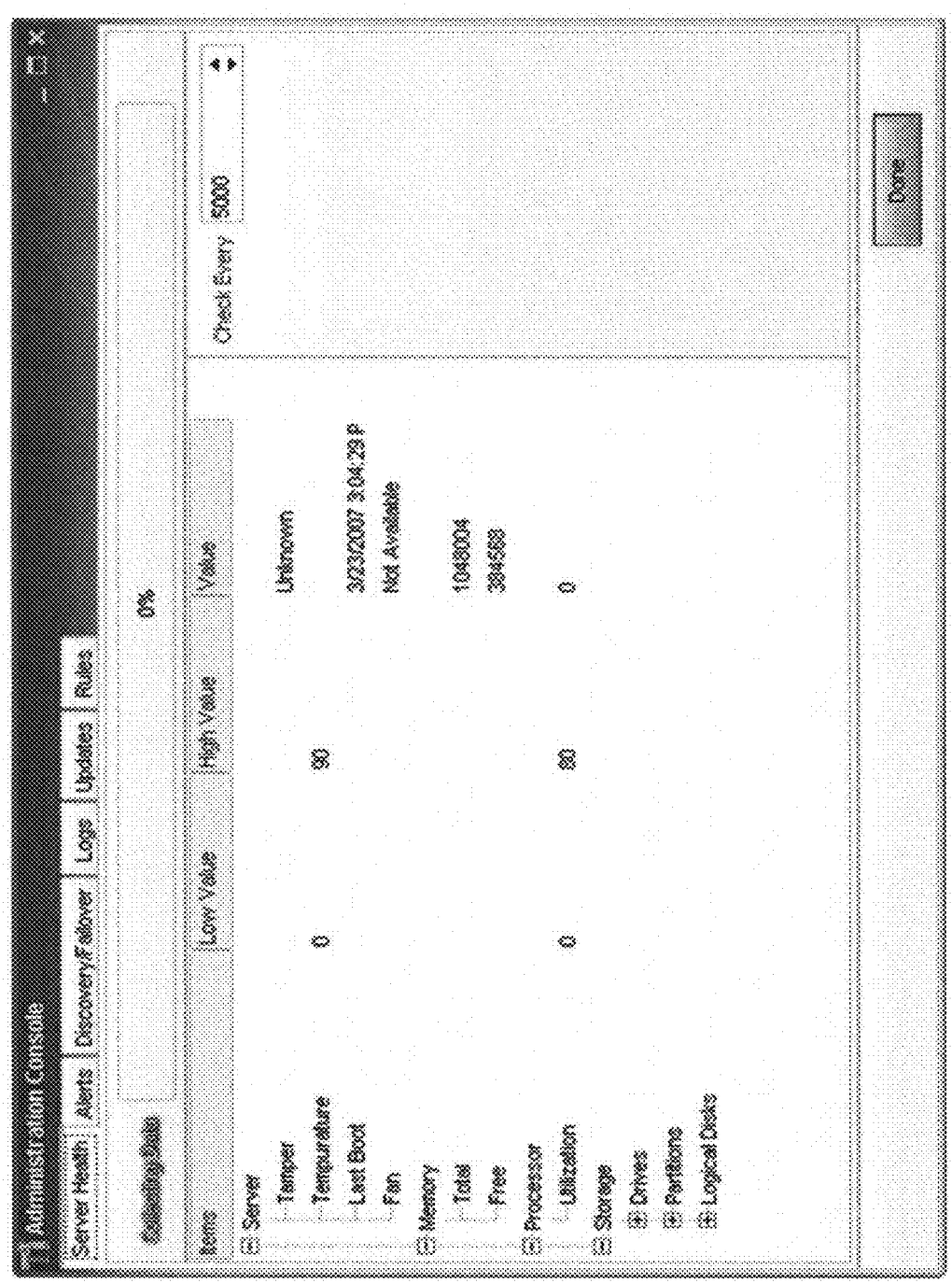
Figure 37:
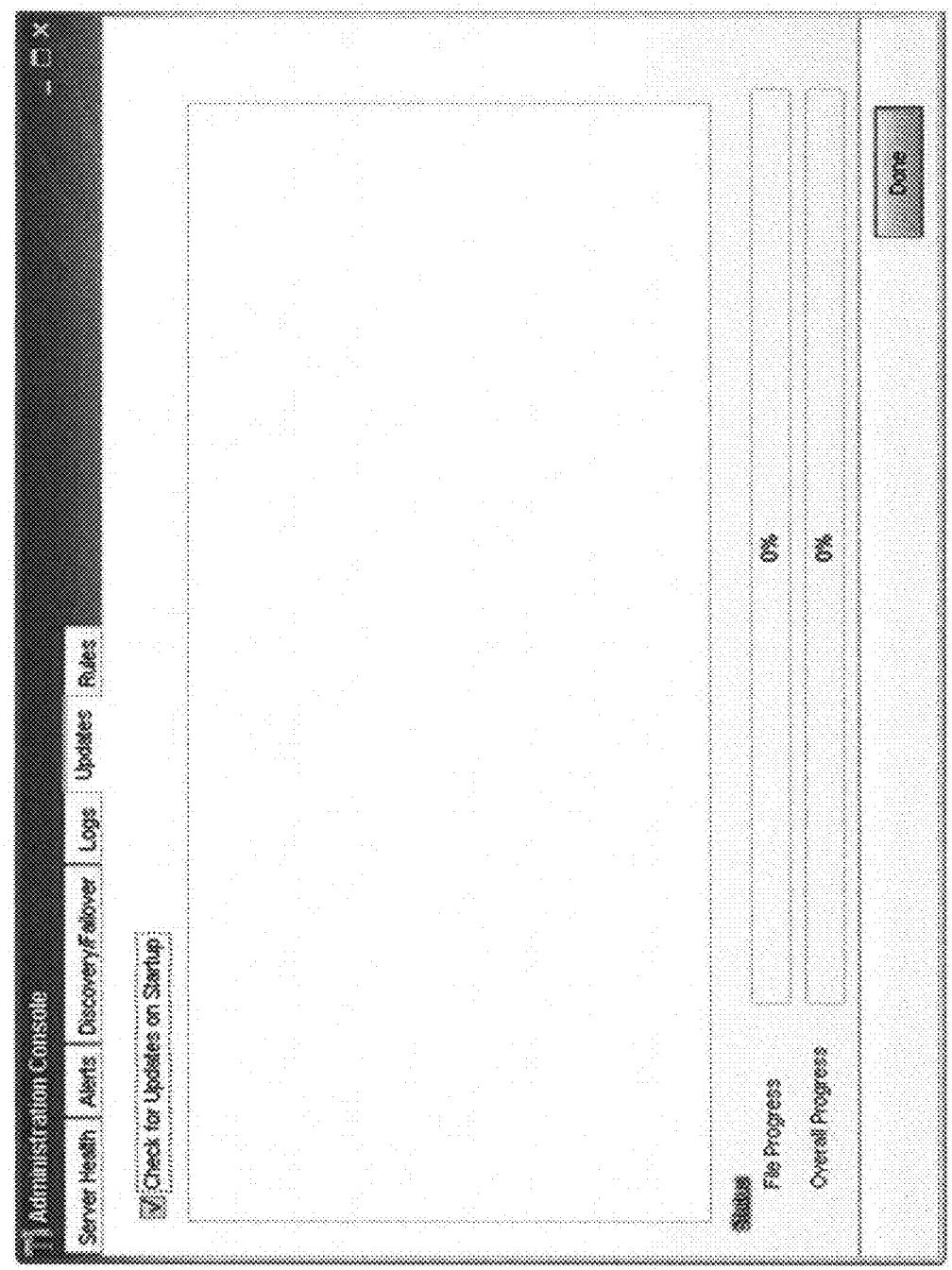

FIG. 33 illustrates an exemplary metrics GUI. Here a user can total a utilization cost, as an agency, and even by there status. This can be done, for example, for Agencies and Resources. This allows, for example, states/counties to call for federal assistance as soon as it is available or limits are reached.

FIGS. 34-37 illustrate various exemplary admin GUIs. Within the Admin Console, a user can check out the server's health status, have it automatically send alerts to E-Mail, a phone, a computer, or just write a log. Within the console, a user can set up automatic discovery and/or failover with other security systems, or the systems can be manually discovered. The software can also be configured to automatically check for updates from this console.

Figure 38:
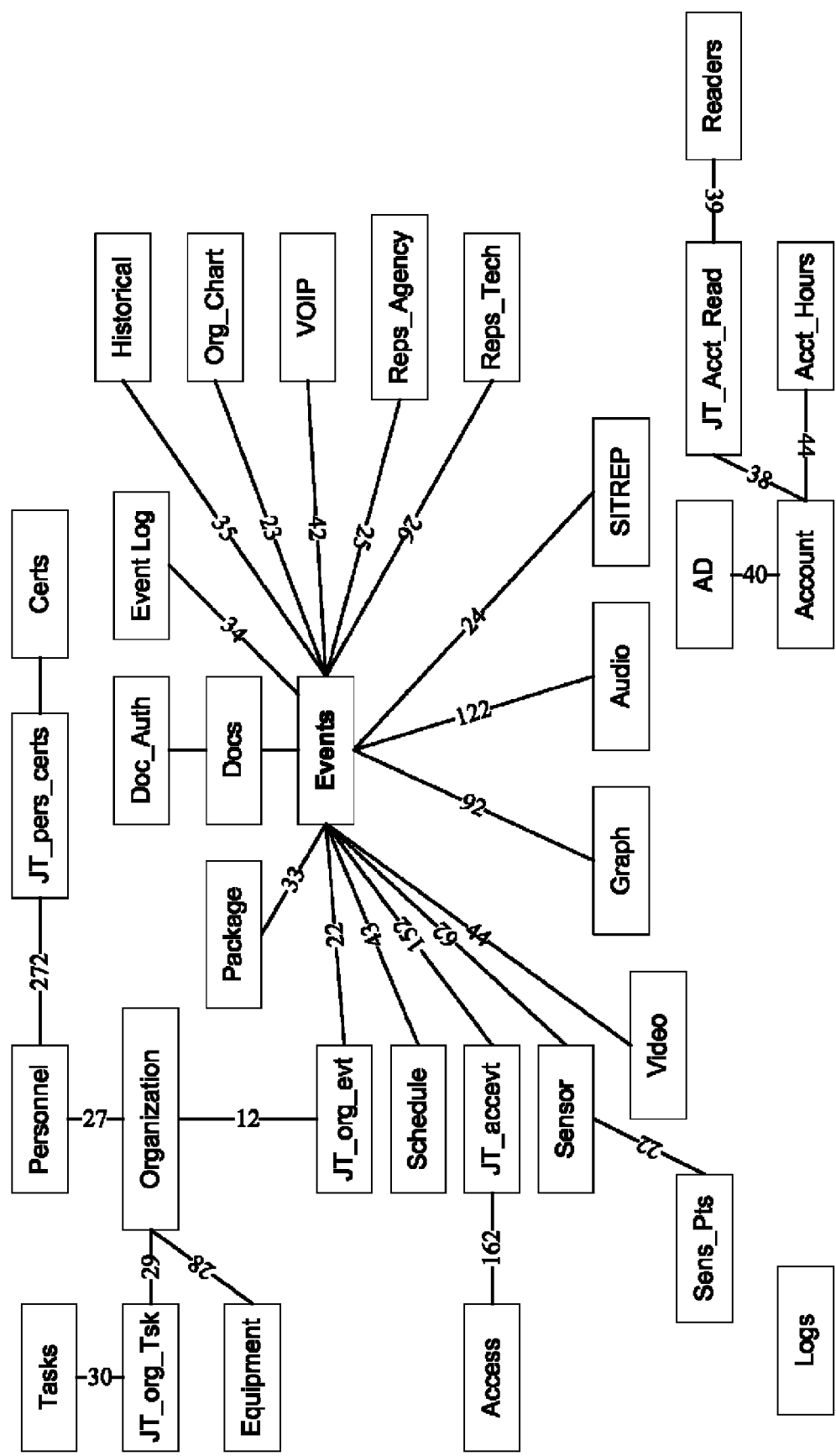
FIG. 38 illustrates an exemplary relational database structure according to this invention.

FIG. 38 illustrates a high-level architecture of a relational database that can be used in conjunction with the embodiments described herein. The attached Appendix provides more detailed specifics regarding the architecture and the relationships therebetween, with the numbers in the connecting lines corresponding to the relationships detailed in the Appendix. In general however, any relational database, object-oriented or object-relational database structure will work well with the systems and methods of this invention provided a mapping between associated elements can be determined. This exemplary architecture represents the relationships between, for example, video, graph, audio, VOIP, documents, equipment, personnel, tasks, etc. . . .

Figure 39:
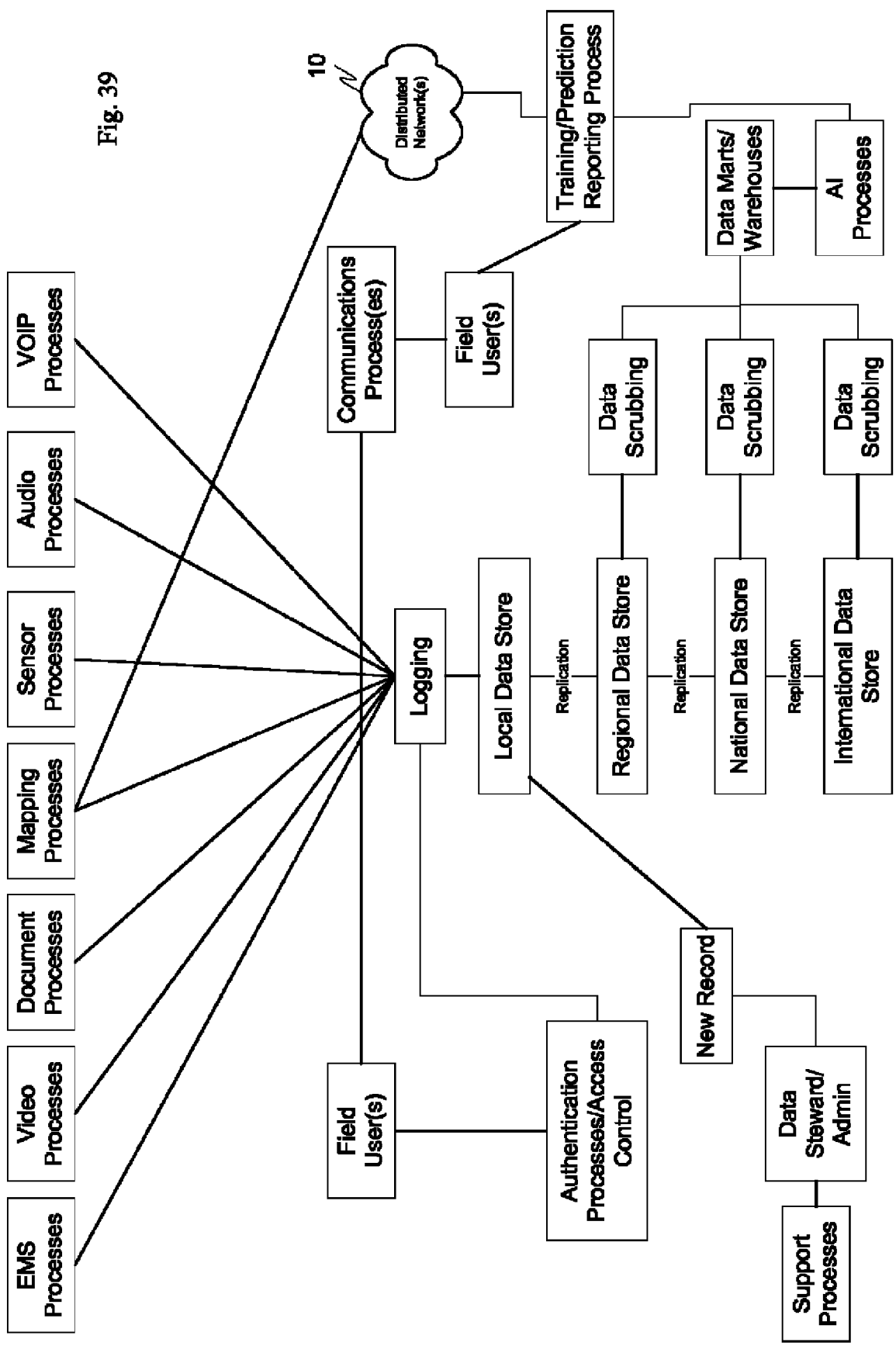
FIG. 39 illustrates exemplary data flow processes according to this invention.

FIG. 39 illustrates an exemplary data flow and process tree according to an embodiment of this invention. The exemplary processes depicted within the figure illustrate connectivity and process flow. These flow diagrams can be consistent throughout all various modules. For example, both the IMPACT family of solutions and the IT/Network and Physical Security Management System can include the same processes for cameras, video, access control, etc., as well as a Supervisory Control And Data Acquisition (SCADA) type system using the functionality described herein, with all of the systems capable of including the same processes as other modules and process applied to data operations, etc. The scope of all modules can be configured into a self-healing networked structure where if a piece, segment or network were to fail, a self-healing process could instantiate itself and rebuild critical parts of any portion of the system(s) and/or network. The systems/networks can also support a failsafe mechanism that allows for the destruction of a device if, for example, tampering is detected.

The exemplary processes that can b performed by one or more of the modules discussed herein (or by one or more modules connected to the security management system) are: New Record, Replication Process, Video Processes, EMS Processes, Mapping Processes, Authentication Processes/Access Control, Document Processes, Logging Processes, Sensor Processes, Support Processes, Audio Processes, VOIP Processes, AI Processes, Data Scrubbing, Data Scrubbing, Trending/Prediction Reporting Process and Communications Processes.

The New Record process allows the creation of a new record. This new record can relate to personnel, equipment, monitors, sensors, credentials, or in general any aspect of security management including both tangible objects/personnel and intangibles.

The Replication Process allows both upstream and downstream replication of information. This replication can include filtering to allow for a hierarchy of data flow with, for example, permissions established such that data stores with lesser permissions have access only to certain portions of data.

The Video Processes, as with the other types of "data" feeds, such as audio, VOIP, etc., are logged in a logging module and preserved in a local data store as well as monitored by the Authentication Processes/Access Control Process. Video can be also be streamed from different devices using different transmission protocols to include IP based, BNC, Web and others.

The EMS Processes is one of several exemplary processes that reflect the various operating environment(s) into which the systems and methods described herein may be placed. It should be appreciated however that these specific operating environment type processes can be combined with other operating environment type processes as needed and may be dynamically added at any time. For example, during boot of the IT/Network and Physical Security Management System, the environment can be configured through selection of the specific event type(s). EMS processes cover all aspects of an incident to at least include personnel, equipment, org charts, situation reports, lessons learned, scheduling, mapping, and other related items specific to an event.

The Mapping Processes allows the integration and display of map(s) into the Network and Physical Security Management System. The Mapping Processes at least includes one or more of GIS, real-time mapping, static mapping, overlaying mapping with various sets of data either retrieved, input or correlated through AI Processes onto maps that can be made available to a user(s).

The Authentication Processes/Access Control Authentication includes logical and physical authentication through, for example, various chip processes to include contact and contactless chips as well as biometrics that may be attached, imbedded embedded and/or implanted anywhere in the body including the hand and head. Authentication mechanisms also provide for the tracking of incrementing and decrementing values as well as storage of finite values within the authentication medium if a non-biogenic authentication template, e.g., smartcard, is used. Identities can be tracked and authenticated through, for example, GUID, UUID, certificate based processes, or in general any mechanism, locally, regionally, nationally and internationally. The authentication medium will also allow for in some cases multi-user/multi-administration capabilities. Authentication at both physical and logical layers can include encryption using standard approved methodologies as well as future encryption strategies utilizing, for example, nano-technologies or quantum technologies not only from the controller to the controlling device (door reader for example), but also from the controlling device to the controller and/or other operating system that may act as an intermediary or controller itself. The Authentication Processes allow for multi-factored authentication mechanisms to include, for example, what someone knows, what someone has, who someone is, where a person is, through space and time, through behavioral analysis as well as other mechanisms. This will allow for authentication of identities, groups, processes, etc., as well as physical devices and information sources.

The Document Processes allows for the creation, viewing and modification of secured documents through a data labeling process, as well as the management and classification of documents. For example, an AI process classifies documents on the fly based on, for example, certain keywords, origin information, creator information, content, or phrasings as well as by the classification authority or creator. Documents identified as secure can be stored in an encrypted format within the database.

The Logging Processes support event correlation through a triage AI process for each entry added to the log. Logsets can be multi-record structures where event correlation takes place against a set of log entries that may or may not be similar in nature. Logs can be archived, for example, at the event level and can be fine tuned to, for example, periods of time.

The Sensor Processes not only include sensors for environmental characteristics but also include tracking through thermal, biologic, pressure and other methods provided through a sensor interface.

The Support Processes include failover support, self-discovery and other system configurations. Support processes also include all processes that provide for systems administration, configuration, healing, alerting, balancing or other processes supporting any of the described processes or modules.

The Audio Processes allow for the modeling of various audio characteristics. This can include sound that is audible to the human range or outside the scope of human range.

The VOIP Processes allow VOIP communications over one or more networks to one or more other IMPACT and/or IT/Network and Physical Security Management System(s). VOIP and Conferencing services allow for internal conferencing capabilities. The only requirement is connectivity through any available means. Conferences can be recorded stored and verified in the future.

The AI Processes include rule set, fact set, fuzzy and neural processes to predict and trend. Intelligent processes include inferencing technology, neural processes as well as other multi-generation intelligence processes. In terms of intelligent processing there are three layers.
1. Triage (Real-time)—this is accomplished as raw data is entered through a process. This basic yes/no type rule set logic and can be applied to an individual record very quickly.
2. Near real-time—This can be accomplished across multiple records as data sits in an active local data store. The correlation of this data can be more complex than simple rule sets and can include complex nested rule sets as well as facts applied.
3. Historical—This takes place against a data mart/warehouse and/or a regional, national and/or international level data source. These AI Processes can include not only rule set and facts, but fuzzy logic through inferencing and in some cases neural networking, as appropriate.

AI Processes allow for human and non-human intervention, alerting and other modifications to configurations, data or other items designated as modifiable on-the-fly. Expert Systems can attempt to emulate the decision making abilities of a human expert using knowledge (facts) and inference procedures (rules). In some cases other intelligent processes may be used such as neural networking, data clumping, associative discovery etc. . . . AI processes are designed to find events, trends and predict where the data to support that data doesn't appear to exist.

The Data Scrubbing process allows for sanitizing of data by any means, such as rule based sanitizing.

The Trending/Prediction Reporting Process can cooperate with the AI Processes to generate trending and/or prediction reporting and alerts based on one or more of incident information, information feeds, activity, data trends or in general any information received by the IT/Network and Physical Security Management System.

The Communications Processes include any method for communications to include satellite, cellular, wireless, networked, encrypted, hardened, packet or circuit-switched, or any other communications process or protocol.

The Data Stores house data that can be shared with one or more other data stores. The data stores can store any information relevant to the IMPACT and the IT/Network and Physical Security Management Systems, as well as credential issuance system, and in general any information associated with the systems described herein.

In addition to the above higher-level processes, sub-process operate within the security system. A description of the exemplary sub-processes are discussed below.

The Record Management process allows entities identified with "administrator" privileges to administer records. These records include identity records and administrators can at least add, delete or modify identities as well as levels of permission, access control, etc., and in general any feature associated with a record including the creation, modification or deletion of a record.

The Identity Configurations process includes all aspects of an identity account. These includes basic personal information such as name, DOB, position, access control parameters—to include access points and hours, biometric data etc. . . . An identity is directly correlated to a certificate and a GUID/UUID or other unique identifier. These items are used to correlate identities to other sets of information through lookups.

The Permissions Process provides and regulates permissions to information and/or objects.

The Access Control process provide for both logical and physical access control solutions to one or more physical areas and/or computer, computer network or IT-based systems.

The Authentication Process determines whether or not an entity has the authority to access and manage records.

The Record Management Process includes the ability to add records, delete records, modify records as well as provides record navigation and searching functionality.

The Active Directory Process provides standard active directory structures and extended active directory structures. For example, in an emergency response scenario, the security system 1 is a self-contained network whereas in other incident management solutions active directory can be integrated into an existing network structure. In cases where an incident management solution must control access logically, the security system can act as the master controller and only make updates to the active directory databases while, for example, dedicated, incident specific incident management controllers will act as authenticating mechanisms thereby reducing the overall load on the IMPACT system.

The Physical Access Control Process controls, for example, disconnected hand-held or other types of credential reading devices that can be updated, for example, on-the-fly through wireless, wired or by removable media. The devices can first authenticate to one another prior to data updating. In other IMPACT scenario solutions, physical reader controllers can be embedded into the IMPACT solution and control physical access by a direct or wireless connection to the terminal reader.

The Motion Detection Process allows for the configuration of the sensitivity of the detection grid in one or more connected video cameras or feeds as well as other options related to motion detection. The motion detection processes can be defined to slew a camera to a certain position if motion enabled cameras are used.

The Snapshot Process allows snapshotting by extracting a single frame from a video stream. Snapshotted graphics can be stored in an encrypted format and checksummed for evidentiary use.

The Streaming Process allows video to be streamed to a user interface within the security system and can be saved in, for example, a compressed and encrypted format to the data store. Video can also be checksummed for evidentiary use.

The Video Interface Process allows a user to manipulate and view video data. This interface allows also acts as the record management interface that allows user to add, delete, modify and navigate video records, for example, with the use of meta-data, keywords, etc.

The Docs Mods Process allows video data stills and in some cases streamed video data to be included into documents that are stored within the data store.

The Camera Control Processes allow camera controlling through motion detection as well as user remote control of any of the cameras associated with the security system.

The Logging Process can support event correlation through the triage of artificial intelligence processes for each entry added to the log. Log sets can be multi-record structures where event correlation takes place against a set of log entries that may or may not be similar in nature. Logs can be archived off at the event level and/or system level and be fine tuned to periods of time.

The Event Data Process allows management of event data, comprising basic information pertaining to an event, to include, for example, incident commander, location, perimeters, zones and event descriptions.

The Situation Reporting Process allows situations taking place during an event to be identified, flagged and tracked.

The Org Charting Process provides the ability to create and manage an organizational chart of the incident staffing. Personnel can be selected to fill slots within the organizational structure. Also when an individual is selected to fill a role, the role can be cross-referenced with certifications data that is tied to personnel. If, for example, the individual is not certified to fill a role, then, for example, based on an active rule set, the incident commander can be informed. An incident commander can also be authorized to override the flag. There can be more than one organizational chart per event.

The Personnel/Equipment/Certs Process allows one or more of personnel, equipment and personnel certifications to be tracked through an event to include, for example, cost rates, use, renewal information and other items.

The Package definition Process allows packages to be defined by standard definitions, non-standard definitions as well as task force definitions. Packages can be requested, offered for deployment and in special circumstances be defined on-the-fly during and at an incident. Packages are normally defined and then pushed to, for example, a regional and national data store for deployment. Packages can also be requested by various agencies to take part in an event.

The Historics Process allows for the management and creation of "lessons learned documents" as well as documents generated through an artificial intelligence process that correlates useful information for specific requirements during an incident. This gives event managers access to data and data mining capabilities that may uncover information relevant to the incident(s) such as trending information. Documents can be correlated from local, regional, national and/or international sources.

The Graphic Layering process allows graphic overlay(s) to be added to or taken off of a mapping structure. Layers can represent different sets of interpolated data.

The Internet Based Mapping Wrapper Process allows for including access to interne based maps. This provides, for example, an instant mapping interface that doesn't require any static map files to be carried with the security system. Layers can be added to internet based mapping to represent different sets of data.

The Data Interpolation Process allows taking data from different sources, turning that data into coordinate data and then placing it into a graphic layer to be presented through a mapping interface. Data can represent sensor locations, boundary locations, personnel locations, equipment locations, or in general data the security system has access to.

The GIS Processing Process allows real-time GPS related navigation, as well as other GIS related mapping processes. For Example, responders can use GPS enabled tracking devices that can be represented in a mapping structure. This is useful for deploying, tracking and recalling responders that may be in hot, warm, cold or all zones, etc.

The Graphical Interface Process allows one or more graphic interfaces to be used to manage records as well as provide for option selections and a viewing interface for the mapping modifications.

The Doc Generation Process allows user to create spreadsheets, word processing documents, flowchart documents, graphic documents as well as other document types. These documents can be labeled with a security classification and then encrypted into the data stores where other users with the proper classification can then view the documents. This provides for a secured document access control system that provides security, integrity, reliability as well as the capability to control document dissemination.

The Classification Process allows classification labels to be added to any information within the system and can add a mandatory layer of security to document control that does not exist in discretionary operating systems that provide for shared access control. Each document can be labeled with a classification and clearance requirement that is tied directly to the data object.

The Sensor Data Parsing Process allows data entering the security system from any information feed, such as a sensor feed, to be parsed into data that can be represented in a graph series. Parsing can be unique to the sensor type and manufacture. To effectively parse data the manufacturer's data schema can be processed and stored into a retrievable data structure that can be identified on-the-fly to the sensor.

The Sensor Chart Generation Process allows the representation of sensor data through a graph series. Each graph can hold multiple series and update in real-time based, for example, on parsed data.

The Sensor GUI Interface Process allows a sensor GUI to act as the record management facility as well as the interface for sensor graphs that can depict real-time sensor feeds for a variety of sensor types.

The Logging/Alerting Services Process are specific to application processes and specific server processes. To configure logging and alerting, administrators can select an event type and then apply a rule to the event. Then, based, for example, on the relationship between a metric and the event, alarms triggered, actions activated, alerts sent to one or more individuals, entities or groups thereof, or the like.

The Identify Facts and Factsets Process allows processing of facts and fact sets that are known or defined facts about an expert domain.

The Build Rules and Rulesets Process allows for inferencing processes to take place.

The Apply Fuzzy Definitions Process allows for the application of intelligence to address non-linear problems.

The Define Training Requirements Process allows for the training of one or more neural networks.

The Stream Analysis Process allows for the capability to determine direction and distance of sounds as well as the sound type. Audio streams can be used as alerting features and can be saved in an encrypted format into a data store and checksummed to prove authenticity in the future.

The Audio GUI Process allows an audio GUI(s) to act as the record management facility as well as the graphic interface that allows users to configure and process audio data. Audio data can be collected from different sources.

The VOIP/Video Conference process allows audio and/or video communications between connected security systems. A specific security system can itself act as a collector for conversations from other end points. The security system can then trunk the communications into a stream of data that can be sent out to one or more participants.

The Reporting Process allows generation of different types of reports.

Ad Hoc—Ad Hoc reports show the user exactly what is on screen in the same state as the data container. For example, if a data grid is grouped and/or filtered then the report view will be of the grouped and filtered set of data. These reports are designed for on the fly real-time type reports.

Formatted—These reports are pre-defined and have a more professional look than ad hoc reports. These are the reports that are sent to others as a more formal document.

Metric based—These reports correlate data into a pivot grid like report structure. These reports are good for tracking certain sets of data over time.

Charts—These are charts may be formatted as histograms, pie charts, bare charts etc. . . .

The reporting interface allows the user to define the report type and data to collect as well as save the report to internal or export reports to other data formats.

The Data Request Process builds the sql (or other) statement that requests data from a backend. Queries may be simple, complex, nested, multi dimensional, etc., and will take into account future data extraction technologies.

The exemplary Transaction Process allows adding, deleting and modifying identities and other records and follows a straight forward transaction process. The process provides for the guarantee of the integrity and reliability of data and meets federal standards under HSPD-12 for identity verification in a government environment.

Exemplary Components include:
1. Transaction tracking mechanism (GUID, UUID, or any certificate).
2. Authentication medium (smartcards, chips, and any other data storage medium whether its embedded, imbedded, attached, not attached etc. . . . )
3. Authentication factor (something a person has, something a person knows, who a person is, time, space etc. . . . )
4. Storage mediums (relational data structures, active directory, chips and other mediums).
Integrity and reliability of identity information can be done through transaction and data tracking through storage devices and authentication mediums through the use of
1. GUID—globally unique identifiers
2. UUIDs—universally unique identifiers
3. Certificates (any type)
4. Other unique markers as they are developed.
GUIDs, UUIDs, or any certificate(s) and other markers can be used to uniquely identify an identity across local, regional, national and international structures whether they are storage structure or authentications mediums. An identity can be uniquely correlated through connected or disconnected space and time through any of the above markers. Considering the fact that certain attributes of personal or private data can't be transmitted in some cases, the unique marker/identifier provides a means to validate an identity without the loss or compromise of sensitive data. If sensitive data needs to be accessed the unique marker/identifier can be used as a lookup structure to a storage medium or to an authentication medium for additional sensitive data.

By using these markers and identifiers it is possible to replicate identities across multiple remote data stores locally, regionally, nationally or internationally without losing integrity. This also allows for near real-time updates for immediate identity visibility.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments, but rather the steps can be performed by one or more of the elements described. Additionally, the exemplary techniques illustrated herein are not limited to the specifically illustrated embodiments but can also be utilized with the other exemplary embodiments and each described feature is individually and separately claimable.

The above-described system can be implemented on one or more secured, hardened and/or unsecured computer systems and related components, and may be connected to other systems, data feeds, network(s), etc., via a secure or unsecured or encrypted wired and/or wireless wide/local area network system, a satellite communication system, a modem, or the like, or on a separate programmed general purpose computer having a communications device.

Additionally, the systems, methods and protocols of this invention can be implemented on a special purpose computer(s), a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, any comparable means, or the like. In general, any device capable of implementing a state machine that is in turn capable of implementing the methodology illustrated herein can be used to implement the various systems and techniques described in relation to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The systems, methods and protocols illustrated herein can be readily implemented in hardware and/or software using any known or later developed systems or structures, devices and/or software by those of ordinary skill in the applicable art from the functional description provided herein and with a general basic knowledge of the computer and logical and physical security arts.

Moreover, the disclosed methods may be readily implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a security system.

It is therefore apparent that there has been provided, in accordance with the present invention, systems and methods for combined IT/Network and physical security management. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

Appendix

Exemplary Relational Database information for use with exemplary security system and relational database figure.

Entity list

| Entity name | Entity type | Primary key | # attributes |
|---|---|---|---|
| Access | independent | Access_ID | 8 |
| Account | independent | Acct_ID | 13 |
| Acct_Hours | dependent | Hrs_ID, Acct_ID | 3 |
| AD | dependent | Acct_ID | 1 |
| Audio | dependent | EVT_ID, Aud_ID | 7 |
| Certs | independent | Cert_ID | 6 |
| Doc_Auth | dependent | Auth_ID, Doc_ID, EVT_ID | 7 |
| Docs | dependent | Doc_ID, EVT_ID | 11 |
| Equipment | dependent | Org_ID, Equip_ID | 9 |
| Events | independent | EVT_ID | 13 |
| Evt_Log | dependent | Log_ID, EVT_ID | 9 |
| Graph | dependent | EVT_ID, Graph_ID | 8 |
| Historical | dependent | Hist_ID, EVT_ID | 8 |
| JT accevt | dependent | EVT_ID, Access_ID | 2 |
| JT org_evt | dependent | Org_ID, EVT_ID | 2 |
| JT pers_certs | dependent | Org_ID, Pers_ID, Cert_ID | 3 |
| JT_Acct_Read | dependent | Acct_ID, Read_ID | 2 |
| JT_Org_Tsk | dependent | Org_ID, Task_ID, Task_Name | 3 |
| Logs | independent | Log_ID | 11 |
| Org_cht | dependent | Cht_mast_ID, EVT_ID | 5 |
| Organization | independent | Org_ID | 7 |
| Package | dependent | Package_ID, EVT_ID | 8 |
| Personnel | dependent | Org_ID, Pers_ID | 10 |
| Readers | independent | Read_ID | 7 |
| Reps_agency | dependent | ARep_ID, EVT_ID | 8 |
| Reps_Tech | dependent | TR_ID, EVT_ID | 8 |
| Schedule | dependent | Sched_ID, EVT_ID | 4 |
| Sens_Pts | dependent | PLID, EVT_ID, Sens_ID | 6 |
| Sensor | dependent | EVT_ID, Sens_ID | 12 |
| SITREP | dependent | Sit_ID, EVT_ID | 16 |
| Tasks | independent | Task_ID, Task_Name | 9 |
| Video | dependent | Vid_ID, EVT_ID | 7 |
| VOIP | dependent | VOIP_ID, EVT_ID | 8 |

Entity 'Access'
General info
Entity type: independent
Attributes

| Key | Attribute/role name | Data type | Not null | Unique |
|---|---|---|---|---|
| PK | Access_ID | UniqueIdentifier | YES | YES |
|  | Access_Date | DateTime | YES | YES |
|  | Access_Time | DateTime | NO | NO |
|  | Identity | UniqueIdentifier | NO | NO |
|  | Access_FName | Char (20) | NO | NO |
|  | Access_LName | Char (20) | NO | NO |
|  | Access_Type | Char (20) | NO | NO |
|  | Access_Point | Char (20) | NO | NO |

Relationships

| Relationship name | Type | Parent entity | Child entity | Card. |
|---|---|---|---|---|
| Relationship162 | Identifying | Access | JT accevt | 1:N |

User-defined variables
Name  Value
Owner
Non clustered primary key  No
Primary key fill factor
Data space for Table
Data space for Primary key
Text Filegroup for Table (TEXTIMAGE_ON)

Appendix-continued

Exemplary Relational Database information for use with exemplary security system and relational database figure.

Entity 'Account'
General info
Entity type: independent
Attributes

| Key | Attribute/role name | Data type | Not null | Unique |
|---|---|---|---|---|
| PK | Acct_ID | UniqueIdentifier | YES | YES |
|  | Acct_FName | Char (20) | NO | NO |
|  | Acct_LName | Char (20) | NO | NO |
|  | Acct_Type | Char (20) | NO | NO |
|  | Acct_Purpose | Char (20) | NO | NO |
|  | Acct_Reason | Char (30) | NO | NO |
|  | Acct_Desc | Text | NO | NO |
|  | Acct_Expires | Char (1) | NO | NO |
|  | Acct_Image | Image | NO | NO |
|  | Acct_NHours | Char (25) | NO | NO |
|  | Acct_PHours | Char (25) | NO | NO |
|  | Acct_Zone | Char (15) | NO | NO |
|  | Acct_Rem | Text | NO | NO |

Relationships

| Relationship name | Type | Parent entity | Child entity | Card. |
|---|---|---|---|---|
| Relationship38 | Identifying | Account | JT_Acct_Read | 1:N |
| Relationship40 | Identifying | Account | AD | 1:N |
| Relationship41 | Identifying | Account | Acct_Hours | 1:N |

User-defined variables

| Name | Value |
|---|---|
| Owner |  |
| Non clustered primary key | No |
| Primary key fill factor |  |
| Data space for Table |  |
| Data space for Primary key |  |
| Text Filegroup for Table (TEXTIMAGE_ON) |  |

Entity 'Acct_Hours'
General info
Entity type: dependent
Attributes

| Key | Attribute/role name | Data type | Not null | Unique |
|---|---|---|---|---|
| PK | Hrs_ID | UniqueIdentifier | YES | YES |
|  | Hrs_Value | Char (1) | NO | NO |
| PFK | Acct_ID | UniqueIdentifier | YES | NO |

Relationships

| Relationship name | Type | Parent entity | Child entity | Card. |
|---|---|---|---|---|
| Relationship41 | Identifying | Account | Acct_Hours | 1:N |

User-defined variables

| Name | Value |
|---|---|
| Owner |  |
| Non clustered primary key | No |
| Primary key fill factor |  |
| Data space for Table |  |
| Data space for Primary key |  |
| Text Filegroup for Table (TEXTIMAGE_ON) |  |

Entity 'AD'
General info
Entity type: dependent
Attributes

| Key | Attribute/role name | Data type | Not null | Unique |
|---|---|---|---|---|
| PFK | Acct_ID | UniqueIdentifier | YES | NO |

Relationships

| Relationship name | Type | Parent entity | Child entity | Card. |
|---|---|---|---|---|
| Relationship40 | Identifying | Account | AD | 1:N |

User-defined variables

| Name | Value |
|---|---|
| Owner |  |
| Non clustered primary key | No |
| Primary key fill factor |  |
| Data space for Table |  |

Appendix-continued

Exemplary Relational Database information for use with exemplary security system and relational database figure.

Data space for Primary key
Text Filegroup for Table (TEXTIMAGE_ON)

Entity 'Audio'
General info
Entity type: dependent
Attributes

| Key | Attribute/role name | Data type | Not null | Unique |
|---|---|---|---|---|
| PFK | EVT_ID | UniqueIdentifier | YES | NO |
| PK | Aud_ID | UniqueIdentifier | YES | YES |
|  | Aud_Name | VarChar (50) | NO | NO |
|  | Aud_Desc | Char (1) | NO | NO |
|  | Aud_Date | DateTime | NO | NO |
|  | Aud_Time | DateTime | NO | NO |
|  | Aud_Sens | Char (15) | NO | NO |

Relationships

| Relationship name | Type | Parent entity | Child entity | Card. |
|---|---|---|---|---|
| Relationship122 | Identifying | Events | Audio | 1:N |

User-defined variables
Name                Value
Owner
Non clustered primary key        No
Primary key fill factor
Data space for Table
Data space for Primary key
Text Filegroup for Table (TEXTIMAGE_ON)

Entity 'Certs'
General info
Entity type: independent
Attributes

| Key | Attribute/role name | Data type | Not null | Unique |
|---|---|---|---|---|
| PK | Cert_ID | UniqueIdentifier | YES | YES |
|  | Cert_Cert | VarChar (50) | NO | NO |
|  | Cert_Date | DateTime | NO | NO |
|  | Cert_Expire | DateTime | NO | NO |
|  | Cert_Type | Char (20) | NO | NO |
|  | Cert_Auth | Char (15) | NO | NO |

Relationships

| Relationship name | Type | Parent entity | Child entity | Card. |
|---|---|---|---|---|
| Relationship282 | Identifying | Certs | JT pers_certs | 1:N |

User-defined variables
Name                Value
Owner
Non clustered primary key        No
Primary key fill factor
Data space for Table
Data space for Primary key
Text Filegroup for Table (TEXTIMAGE_ON)

Entity 'Doc_Auth'
General info
Entity type: dependent
Attributes

| Key | Attribute/role name | Data type | Not null | Unique |
|---|---|---|---|---|
| PK | Auth ID | UniqueIdentifier | YES | YES |
|  | Auth_User | UniqueIdentifier | NO | NO |
|  | Auth_Start_Date | DateTime | NO | NO |
|  | End_Auth_Date | DateTime | NO | NO |
|  | Auth_Type | Char (20) | NO | NO |
| PFK | Doc_ID | UniqueIdentifier | YES | NO |
| PFK | EVT_ID | UniqueIdentifier | YES | NO |

Relationships

| Relationship name | Type | Parent entity | Child entity | Card. |
|---|---|---|---|---|
| Relationship37 | Identifying | Docs | Doc_Auth | 1:N |

User-defined variables
Name                Value
Owner
Non clustered primary key        No Appendix-continued Exemplary Relational Database information for use with exemplary security system and relational database figure.

Primary key fill factor
Data space for Table
Data space for Primary key
Text Filegroup for Table (TEXTIMAGE_ON)

Entity 'Docs'
General info
Entity type: dependent
Attributes

| Key | Attribute/role name | Data type | Not null | Unique |
|---|---|---|---|---|
| PK | Doc_ID | UniqueIdentifier | YES | YES |
| | Doc_Name | VarChar (50) | NO | NO |
| | Doc_Type | Char (20) | NO | NO |
| | Dec_Sens | Char (15) | NO | NO |
| | Doc_Doc | VarBinary (512) | NO | NO |
| | Doc_Img | Image | NO | NO |
| | Doc_Date | DateTime | NO | NO |
| | Doc_Time | DateTime | NO | NO |
| | Doc_Author | VarChar (50) | NO | NO |
| | Doc_Rem | Text | NO | NO |
| PFK | EVT_ID | UniqueIdentifier | YES | NO |

Relationships

| Relationship name | Type | Parent entity | Child entity | Card. |
|---|---|---|---|---|
| Relationship36 | Identifying | Events | Docs | 1:N |
| Relationship37 | Identifying | Docs | Doc_Auth | 1:N |

User-defined variables

| Name | Value |
|---|---|
| Owner | |
| Non clustered primary key | No |

Primary key fill factor
Data space for Table
Data space for Primary key
Text Filegroup for Table (TEXTIMAGE_ON)

Entity 'Equipment'
General info
Entity type: dependent
Attributes

| Key | Attribute/role name | Data type | Not null | Unique |
|---|---|---|---|---|
| PFK | Org_ID | UniqueIdentifier | YES | NO |
| PK | Equip_ID | UniqueIdentifier | YES | YES |
| | Equip_Name | VarChar (50) | NO | NO |
| | Equip_Desc | Text | NO | NO |
| | Equip_Serial | Char (20) | NO | NO |
| | Equip_Model | Char (20) | NO | NO |
| | Equip_Task | VarChar (1) | NO | NO |
| | Special_Req | Text | NO | NO |
| | Equip_Rem | Text | NO | NO |

Relationships

| Relationship name | Type | Parent entity | Child entity | Card. |
|---|---|---|---|---|
| Relationship28 | Identifying | Organization | Equipment | 1:N |

User-defined variables

| Name | Value |
|---|---|
| Owner | |
| Non clustered primary key | No |

Primary key fill factor
Data space for Table
Data space for Primary key
Text Filegroup for Table (TEXTIMAGE_ON)

Entity 'Events'
General info
Entity type: independent
Attributes

| Key | Attribute/role name | Data type | Not null | Unique |
|---|---|---|---|---|
| PK | EVT_ID | UniqueIdentifier | YES | YES |
| | Evt_name | VarChar (50) | NO | NO |
| | Evt_Open_Date | DateTime | NO | NO |
| | EVT_Open_Time | DateTime | NO | NO |
| | Evt_close_Date | DateTime | NO | NO |
| | EVT_Close_Time | DateTime | NO | NO |

Appendix-continued

Exemplary Relational Database information for use with exemplary security system and relational database figure.

|  |  | Evt_Sensitivity | Char (15) | NO | NO |
|---|---|---|---|---|---|
|  |  | Evt_Criticality | Char (15) | NO | NO |
|  |  | EVT_General_Loc | Text | NO | NO |
|  |  | Evt_Inter_Loc | Text | NO | NO |
|  |  | Evt_Pinpoint_Loc | Text | NO | NO |
|  |  | Evt_CMDR | VarChar (50) | NO | NO |
|  |  | Evt_Loc | VarChar (50) | NO | NO |

Relationships

| Relationship name | Type | Parent entity | Child entity | Card. |
|---|---|---|---|---|
| Relationship22 | Identifying | Events | JT org_evt | 1:N |
| Relationship62 | Identifying | Events | Sensor | 1:N |
| Relationship92 | Identifying | Events | Graph | 1:N |
| Relationship122 | Identifying | Events | Audio | 1:N |
| Relationship152 | Identifying | Events | JT accevt | 1:N |
| Relationship23 | Identifying | Events | Org_cht | 1:N |
| Relationship24 | Identifying | Events | SITREP | 1:N |
| Relationship25 | Identifying | Events | Reps_agency | 1:N |
| Relationship26 | Identifying | Events | Reps_Tech | 1:N |
| Relationship33 | Identifying | Events | Package | 1:N |
| Relationship34 | Identifying | Events | Evt_Log | 1:N |
| Relationship35 | Identifying | Events | Historical | 1:N |
| Relationship36 | Identifying | Events | Docs | 1:N |
| Relationship42 | Identifying | Events | VOIP | 1:N |
| Relationship43 | Identifying | Events | Schedule | 1:N |
| Relationship44 | Identifying | Events | Video | 1:N |

User-defined variables
| Name | Value |
|---|---|
| Owner |  |
| Non clustered primary key | No |
| Primary key fill factor |  |
| Data space for Table |  |
| Data space for Primary key |  |
| Text Filegroup for Table (TEXTIMAGE_ON) |  |

Entity 'Evt_Log'
General info
Entity type: dependent
Attributes

| Key | Attribute/role name | Data type | Not null | Unique |
|---|---|---|---|---|
| PK | Log_ID | UniqueIdentifier | YES | YES |
|  | Lg_Entry | VarChar (50) | NO | NO |
|  | Lg_Date | DateTime | NO | NO |
|  | Lg_Time | Char (1) | NO | NO |
|  | Lg_Agency | VarChar (50) | NO | NO |
|  | Lg_Crit | Char (20) | NO | NO |
|  | Lg_Sens | Char (20) | NO | NO |
|  | Lg_Txt | Char (1) | NO | NO |
| PFK | EVT_ID | UniqueIdentifier | YES | NO |

Relationships

| Relationship name | Type | Parent entity | Child entity | Card. |
|---|---|---|---|---|
| Relationship34 | Identifying | Events | Evt_Log | 1:N |

User-defined variables
| Name | Value |
|---|---|
| Owner |  |
| Non clustered primary key | No |
| Primary key fill factor |  |
| Data space for Table |  |
| Data space for Primary key |  |
| Text Filegroup for Table (TEXTIMAGE_ON) |  |

Entity 'Graph'
General info
Entity type: dependent
Attributes

| Key | Attribute/role name | Data type | Not null | Unique |
|---|---|---|---|---|
| PFK | EVT_ID | UniqueIdentifier | YES | NO |
| PK | Graph_ID | UniqueIdentifier | YES | YES |
|  | Graph_Name | VarChar (50) | NO | NO |
|  | Graph_Desc | Text | NO | NO |
|  | Graph_Date_Time | DateTime | NO | NO |
|  | Graph_Sensitivity | Char (15) | NO | NO |

Appendix-continued

Exemplary Relational Database information for use with exemplary security system and relational database figure.

|  | Graph_Graphic | Image | NO | NO |
|---|---|---|---|---|
|  | Graphic_Type | Char (15) | NO | NO |

| Relationships Relationship name | Type | Parent entity | Child entity | Card. |
|---|---|---|---|---|
| Relationship92 | Identifying | Events | Graph | 1:N |

User-defined variables
Name                                  Value
Owner
Non clustered primary key             No
Primary key fill factor
Data space for Table
Data space for Primary key
Text Filegroup for Table (TEXTIMAGE_ON)

Entity 'Historical'
General info
Entity type:                          dependent
Attributes

| Key | Attribute/role name | Data type | Not null | Unique |
|---|---|---|---|---|
| PK | Hist_ID | UniqueIdentifier | YES | YES |
|  | Hist_Name | VarChar (50) | NO | NO |
|  | Hist_Date | DateTime | NO | NO |
|  | Hist_Desc | Text | NO | NO |
|  | Hist_Evt_Type | Char (1) | NO | NO |
|  | Hist_CMDR | VarChar (50) | NO | NO |
|  | Hist_Doc | Char (1) | NO | NO |
| PFK | EVT_ID | UniqueIdentifier | YES | NO |

| Relationships Relationship name | Type | Parent entity | Child entity | Card. |
|---|---|---|---|---|
| Relationship35 | Identifying | Events | Historical | 1:N |

User-defined variables
Name                                  Value
Owner
Non clustered primary key             No
Primary key fill factor
Data space for Table
Data space for Primary key
Text Filegroup for Table (TEXTIMAGE_ON)

Entity 'JT accevt'
General info
Entity type:                          dependent
Attributes

| Key | Attribute/role name | Data type | Not null | Unique |
|---|---|---|---|---|
| PFK | EVT_ID | UniqueIdentifier | YES | NO |
| PFK | Access_ID | UniqueIdentifier | YES | NO |

| Relationships Relationship name | Type | Parent entity | Child entity | Card. |
|---|---|---|---|---|
| Relationship152 | Identifying | Events | JT accevt | 1:N |
| Relationship162 | Identifying | Access | JT accevt | 1:N |

User-defined variables
Name                                  Value
Owner
Non clustered primary key             No
Primary key fill factor
Data space for Table
Data space for Primary key
Text Filegroup for Table (TEXTIMAGE_ON)

Entity 'JT org_evt'
General info
Entity type:                          dependent
Attributes

| Key | Attribute/role name | Data type | Not null | Unique |
|---|---|---|---|---|
| PFK | Org_ID | UniqueIdentifier | YES | NO |
| PFK | EVT_ID | UniqueIdentifier | YES | NO |

Appendix-continued

Exemplary Relational Database information for use with exemplary security system and relational database figure.

| Relationships Relationship name | Type | Parent entity | Child entity | Card. |
|---|---|---|---|---|
| Relationship12 | Identifying | Organization | JT org_evt | 1:N |
| Relationship22 | Identifying | Events | JT org_evt | 1:N |
| User-defined variables | | | | |
| Name | Value | | | |
| Owner | | | | |
| Non clustered primary key | No | | | |
| Primary key fill factor | | | | |
| Data space for Table | | | | |
| Data space for Primary key | | | | |
| Text Filegroup for Table (TEXTIMAGE_ON) | | | | |

Entity 'JT pers_certs'
General info
Entity type: dependent
Attributes

| Key | Attribute/role name | Data type | Not null | Unique |
|---|---|---|---|---|
| PFK | Org_ID | UniqueIdentifier | YES | NO |
| PFK | Pers_ID | UniqueIdentifier | YES | NO |
| PFK | Cert_ID | UniqueIdentifier | YES | NO |

| Relationships Relationship name | Type | Parent entity | Child entity | Card. |
|---|---|---|---|---|
| Relationship272 | Identifying | Personnel | JT pers_certs | 1:N |
| Relationship282 | Identifying | Certs | JT pers_certs | 1:N |
| User-defined variables | | | | |
| Name | Value | | | |
| Owner | | | | |
| Non clustered primary key | No | | | |
| Primary key fill factor | | | | |
| Data space for Table | | | | |
| Data space for Primary key | | | | |
| Text Filegroup for Table (TEXTIMAGE_ON) | | | | |

Entity 'JT_Acct_Read'
General info
Entity type: dependent
Attributes

| Key | Attribute/role name | Data type | Not null | Unique |
|---|---|---|---|---|
| PFK | Acct_ID | UniqueIdentifier | YES | NO |
| PFK | Read_ID | UniqueIdentifier | YES | NO |

| Relationships Relationship name | Type | Parent entity | Child entity | Card. |
|---|---|---|---|---|
| Relationship38 | Identifying | Account | JT_Acct_Read | 1:N |
| Relationship39 | Identifying | Readers | JT_Acct_Read | 1:N |
| User-defined variables | | | | |
| Name | Value | | | |
| Owner | | | | |
| Non clustered primary key | No | | | |
| Primary key fill factor | | | | |
| Data space for Table | | | | |
| Data space for Primary key | | | | |
| Text Filegroup for Table (TEXTIMAGE_ON) | | | | |

Entity 'JT_Org_Tsk'
General info
Entity type: dependent
Attributes

| Key | Attribute/role name | Data type | Not null | Unique |
|---|---|---|---|---|
| PFK | Org_ID | UniqueIdentifier | YES | NO |
| PFK | Task_ID | UniqueIdentifier | YES | NO |
| PFK | Task_Name | VarChar (50) | YES | NO |

| Relationships Relationship name | Type | Parent entity | Child entity | Card. |
|---|---|---|---|---|
| Relationship29 | Identifying | Organization | JT_Org_Tsk | 1:N |
| Relationship30 | Identifying | Tasks | JT_Org_Tsk | 1:N |
| User-defined variables | | | | |
| Name | Value | | | |

Appendix-continued

Exemplary Relational Database information for use with exemplary security system and relational database figure.

Owner
Non clustered primary key  No
Primary key fill factor
Data space for Table
Data space for Primary key
Text Filegroup for Table (TEXTIMAGE_ON)

Entity 'Logs'
General info
Entity type: independent
Attributes

| Key | Attribute/role name | Data type | Not null | Unique |
|---|---|---|---|---|
| PK | Log_ID | UniqueIdentifier | YES | YES |
| | Log_Event | Char (25) | NO | NO |
| | Log_Evt_Type | Char (20) | NO | NO |
| | Log_Date | DateTime | NO | NO |
| | Log_Time | DateTime | NO | NO |
| | Log_Desc | Char (35) | NO | NO |
| | Log_Text | Text | NO | NO |
| | Log_User | VarBinary (50) | NO | NO |
| | Log_Sys | Char (20) | NO | NO |
| | Log_Priority | Char (20) | NO | NO |
| | Log_Alerts | Char (20) | NO | NO |

User-defined variables
Name   Value
Owner
Non clustered primary key  No
Primary key fill factor
Data space for Table
Data space for Primary key
Text Filegroup for Table (TEXTIMAGE_ON)

Entity 'Org_cht'
General info
Entity type: dependent
Attributes

| Key | Attribute/role name | Data type | Not null | Unique |
|---|---|---|---|---|
| PK | Cht_mast_ID | UniqueIdentifier | YES | YES |
| PFK | EVT_ID | UniqueIdentifier | YES | NO |
| | Cht_M_Name | VarChar (50) | NO | NO |
| | Cht_M_Desc | Text | NO | NO |
| | Cht_M_Data | Image | NO | NO |

Relationships

| Relationship name | Type | Parent entity | Child entity | Card. |
|---|---|---|---|---|
| Relationship23 | Identifying | Events | Org_cht | 1:N |

User-defined variables
Name   Value
Owner
Non clustered primary key  No
Primary key fill factor
Data space for Table
Data space for Primary key
Text Filegroup for Table (TEXTIMAGE_ON)

Entity 'Organization'
General info
Entity type: independent
Attributes

| Key | Attribute/role name | Data type | Not null | Unique |
|---|---|---|---|---|
| PK | Org_ID | UniqueIdentifier | YES | YES |
| | Org_Name | VarChar (50) | NO | NO |
| | Org_Address | VarChar (64) | NO | NO |
| | Org_city | VarChar (35) | NO | NO |
| | Org_State | Char (20) | NO | NO |
| | Org_Zip | SmallInt | NO | NO |
| | Org_POC | VarChar (50) | NO | NO |

Relationships

| Relationship name | Type | Parent entity | Child entity | Card. |
|---|---|---|---|---|
| Relationship12 | Identifying | Organization | JT org_evt | 1:N |
| Relationship27 | Identifying | Organization | Personnel | 1:N |
| Relationship28 | Identifying | Organization | Equipment | 1:N |

Appendix-continued

Exemplary Relational Database information for use with exemplary security system and relational database figure.

| | | | | |
|---|---|---|---|---|
| Relationship29 | Identifying | Organization | JT_Org_Tsk | 1:N |
| User-defined variables | | | | |
| Name | Value | | | |
| Owner | | | | |
| Non clustered primary key | No | | | |
| Primary key fill factor | | | | |
| Data space for Table | | | | |
| Data space for Primary key | | | | |
| Text Filegroup for Table (TEXTIMAGE_ON) | | | | |

Entity 'Package'
General info
Entity type: dependent
Attributes

| Key | Attribute/role name | Data type | Not null | Unique |
|---|---|---|---|---|
| PK | Package_ID | UniqueIdentifier | YES | YES |
| | Pkg_Name | VarChar (50) | NO | NO |
| | Pkg_type | Char (20) | NO | NO |
| | Pkg_def | Char (20) | NO | NO |
| | Pkg_Status | Char (20) | NO | NO |
| | Pkg_S_Date | DateTime | NO | NO |
| | Pkg_E_Date | DateTime | NO | NO |
| PFK | EVT_ID | UniqueIdentifier | YES | NO |

Relationships

| Relationship name | Type | Parent entity | Child entity | Card. |
|---|---|---|---|---|
| Relationship33 | Identifying | Events | Package | 1:N |
| User-defined variables | | | | |
| Name | Value | | | |
| Owner | | | | |
| Non clustered primary key | No | | | |
| Primary key fill factor | | | | |
| Data space for Table | | | | |
| Data space for Primary key | | | | |
| Text Filegroup for Table (TEXTIMAGE_ON) | | | | |

Entity 'Personnel'
General info
Entity type: dependent
Attributes

| Key | Attribute/role name | Data type | Not null | Unique |
|---|---|---|---|---|
| PFK | Org_ID | UniqueIdentifier | YES | NO |
| PK | Pers_ID | UniqueIdentifier | YES | YES |
| | Pers_FName | Char (20) | NO | NO |
| | Pers_LName | Char (20) | NO | NO |
| | Pers_Status | Char (15) | NO | NO |
| | Pers_Cost | Money | NO | NO |
| | Pers_DOB | DateTime | NO | NO |
| | Pers_Blood | Char (10) | NO | NO |
| | Pers_Clear | Char (15) | NO | NO |
| | Pers_Duty | VarChar (128) | NO | NO |

Relationships

| Relationship name | Type | Parent entity | Child entity | Card. |
|---|---|---|---|---|
| Relationship272 | Identifying | Personnel | JT pers_certs | 1:N |
| Relationship27 | Identifying | Organization | Personnel | 1:N |
| User-defined variables | | | | |
| Name | Value | | | |
| Owner | | | | |
| Non clustered primary key | No | | | |
| Primary key fill factor | | | | |
| Data space for Table | | | | |
| Data space for Primary key | | | | |
| Text Filegroup for Table (TEXTIMAGE_ON) | | | | |

Entity 'Readers'
General info
Entity type: independent
Attributes

| Key | Attribute/role name | Data type | Not null | Unique |
|---|---|---|---|---|
| PK | Read_ID | UniqueIdentifier | YES | YES |
| | Read_Name | VarChar (50) | NO | NO |
| | Read_Desc | Text | NO | NO |
| | Read_Grp | VarChar (50) | NO | NO |

Appendix-continued

Exemplary Relational Database information for use with exemplary security system and relational database figure.

|  |  | Read Active | Bit | NO | NO |
|---|---|---|---|---|---|
|  |  | Read_Lat | Char (25) | NO | NO |
|  |  | Read_long | Char (25) | NO | NO |

| Relationships |  |  |  |  |  |
|---|---|---|---|---|---|
| Relationship name |  | Type | Parent entity | Child entity | Card. |
| Relationship39 |  | Identifying | Readers | JT_Acct_Read | 1:N |

User-defined variables
Name                                   Value
Owner
Non clustered primary key              No
Primary key fill factor
Data space for Table
Data space for Primary key
Text Filegroup for Table (TEXTIMAGE_ON)

Entity 'Reps_agency'
General info
Entity type:                           dependent
Attributes

| Key | Attribute/role name | Data type | Not null | Unique |
|---|---|---|---|---|
| PK | ARep_ID | UniqueIdentifier | YES | YES |
|  | AR_FName | Char (20) | NO | NO |
|  | AR_LName | Char (20) | NO | NO |
|  | AR_Agency | VarChar (50) | NO | NO |
|  | AR_Start | DateTime | NO | NO |
|  | AR_End | DateTime | NO | NO |
|  | AR_Rem | Text | NO | NO |
| PFK | EVT_ID | UniqueIdentifier | YES | NO |

| Relationships |  |  |  |  |  |
|---|---|---|---|---|---|
| Relationship name |  | Type | Parent entity | Child entity | Card. |
| Relationship25 |  | Identifying | Events | Reps_agency | 1:N |

User-defined variables
Name                                   Value
Owner
Non clustered primary key              No
Primary key fill factor
Data space for Table
Data space for Primary key
Text Filegroup for Table (TEXTIMAGE_ON)

Entity 'Reps_Tech'
General info
Entity type:                           dependent
Attributes

| Key | Attribute/role name | Data type | Not null | Unique |
|---|---|---|---|---|
| PK | TR ID | UniqueIdentifier | YES | YES |
|  | TR_FName | Char (20) | NO | NO |
|  | TR_LName | Char (20) | NO | NO |
|  | TR_Agency | VarChar (50) | NO | NO |
|  | TR Start | DateTime | NO | NO |
|  | TR End | DateTime | NO | NO |
|  | TR_Rem | Text | NO | NO |
| PFK | EVT_ID | UniqueIdentifier | YES | NO |

| Relationships |  |  |  |  |  |
|---|---|---|---|---|---|
| Relationship name |  | Type | Parent entity | Child entity | Card. |
| Relationship26 |  | Identifying | Events | Reps_Tech | 1:N |

User-defined variables
Name                                   Value
Owner
Non clustered primary key              No
Primary key fill factor
Data space for Table
Data space for Primary key
Text Filegroup for Table (TEXTIMAGE_ON)

Entity 'Schedule'
General info

Appendix-continued

Exemplary Relational Database information for use with exemplary security system and relational database figure.

| Entity type: | dependent | | | |
|---|---|---|---|---|
| Attributes | | | | |
| Key | Attribute/role name | Data type | Not null | Unique |
| PK | Sched_ID | UniqueIdentifier | YES | YES |
| | Sched_Name | VarChar (50) | NO | NO |
| | Sched_Data | Binary (512) | NO | NO |
| PFK | EVT_ID | UniqueIdentifier | YES | NO |

| Relationships | | | | |
|---|---|---|---|---|
| Relationship name | Type | Parent entity | Child entity | Card. |
| Relationship43 | Identifying | Events | Schedule | 1:N |

User-defined variables
Name                               Value
Owner
Non clustered primary key          No
Primary key fill factor
Data space for Table
Data space for Primary key
Text Filegroup for Table (TEXTIMAGE_ON)

Entity 'Sens_Pts'
General info

| Entity type: | dependent | | | |
|---|---|---|---|---|
| Attributes | | | | |
| Key | Attribute/role name | Data type | Not null | Unique |
| PK | Pt_ID | UniqueIdentifier | YES | YES |
| | PT_Date | DateTime | NO | NO |
| | PT_Time | Char (1) | NO | NO |
| | PT_Value | Char (1) | NO | NO |
| PFK | EVT_ID | UniqueIdentifier | YES | NO |
| PFK | Sens_ID | UniqueIdentifier | YES | NO |

| Relationships | | | | |
|---|---|---|---|---|
| Relationship name | Type | Parent entity | Child entity | Card. |
| Relationship22 | Identifying | Sensor | Sens Pts | 1:N |

User-defined variables
Name                               Value
Owner
Non clustered primary key          No
Primary key fill factor
Data space for Table
Data space for Primary key
Text Filegroup for Table (TEXTIMAGE_ON)

Entity 'Sensor'
General info

| Entity type: | dependent | | | |
|---|---|---|---|---|
| Attributes | | | | |
| Key | Attribute/role name | Data type | Not null | Unique |
| PFK | EVT_ID | UniqueIdentifier | YES | NO |
| PK | Sens_ID | UniqueIdentifier | YES | YES |
| | Sens_Name | VarChar (50) | NO | NO |
| | Sens_Desc | Text | NO | NO |
| | Sens_Deploy_Date | DateTime | NO | NO |
| | Sens_Close_Date | Char (1) | NO | NO |
| | Sens_Deploy_Time | DateTime | NO | NO |
| | Sens_Close_Time | DateTime | NO | NO |
| | Sens_Long | Char (45) | NO | NO |
| | Sens_Lat | Char (45) | NO | NO |
| | Sens_Type | Char (1) | NO | NO |
| | Sens_Remarks | Text | NO | NO |

| Relationships | | | | |
|---|---|---|---|---|
| Relationship name | Type | Parent entity | Child entity | Card. |
| Relationship62 | Identifying | Events | Sensor | 1:N |
| Relationship22 | Identifying | Sensor | Sens Pts | 1:N |

User-defined variables
Name                               Value
Owner
Non clustered primary key          No
Primary key fill factor
Data space for Table

Appendix-continued

Exemplary Relational Database information for use with exemplary security system and relational database figure.

Data space for Primary key
Text Filegroup for Table (TEXTIMAGE_ON)

Entity 'SITREP'
General info
Entity type: dependent
Attributes

| Key | Attribute/role name | Data type | Not null | Unique |
|---|---|---|---|---|
| PK | Sit_ID | UniqueIdentifier | YES | YES |
| | Sit_Name | VarChar (50) | NO | NO |
| | Sit_Date | DateTime | NO | NO |
| | Sit_Time | Char (1) | NO | NO |
| | Sit_Agency | Char (1) | NO | NO |
| | Sit_Asset | Char (1) | NO | NO |
| | Sit_Situation | VarChar (64) | NO | NO |
| | Sit_Act | VarChar (64) | NO | NO |
| | Sit_Loc | VarChar (64) | NO | NO |
| | Sit_Elem | VarChar (64) | NO | NO |
| | Sit_Assets | VarChar (64) | NO | NO |
| | Sit_tht | VarChar (64) | NO | NO |
| | Sit_sev | VarChar (64) | NO | NO |
| | Sit_Imp | VarChar (64) | NO | NO |
| | Sit_rem | Text | NO | NO |
| PFK | EVT_ID | UniqueIdentifier | YES | NO |

Relationships

| Relationship name | Type | Parent entity | Child entity | Card. |
|---|---|---|---|---|
| Relationship24 | Identifying | Events | SITREP | 1:N |

User-defined variables

| Name | Value |
|---|---|
| Owner | |
| Non clustered primary key | No |
| Primary key fill factor | |
| Data space for Table | |
| Data space for Primary key | |
| Text Filegroup for Table (TEXTIMAGE_ON) | |

Entity 'Tasks'
General info
Entity type: independent
Attributes

| Key | Attribute/role name | Data type | Not null | Unique |
|---|---|---|---|---|
| PK | Task_ID | UniqueIdentifier | YES | YES |
| PK | Task_Name | VarChar (50) | YES | YES |
| | Task_Desc | Text | NO | NO |
| | Taskiss_Date | DateTime | NO | NO |
| | Task_Comp_Date | Char (1) | NO | NO |
| | Task_No_Later_Date | Char (1) | NO | NO |
| | Task_Agency | Char (1) | NO | NO |
| | Task_Rem | Char (1) | NO | NO |
| | Task_Ass_By | VarChar (1) | NO | NO |

Relationships

| Relationship name | Type | Parent entity | Child entity | Card. |
|---|---|---|---|---|
| Relationship30 | Identifying | Tasks | JT_Org_Tsk | 1:N |

User-defined variables

| Name | Value |
|---|---|
| Owner | |
| Non clustered primary key | No |
| Primary key fill factor | |
| Data space for Table | |
| Data space for Primary key | |
| Text Filegroup for Table (TEXTIMAGE_ON) | |

Entity 'VIdeo'
General info
Entity type: dependent
Attributes

| Key | Attribute/role name | Data type | Not null | Unique |
|---|---|---|---|---|
| PK | Vid_ID | UniqueIdentifier | YES | YES |
| | Vid_Name | VarChar (50) | NO | NO |
| | Vid_Date | DateTime | NO | NO |
| | Vid_Time | DateTime | NO | NO |
| | Vid_Data | Binary (512) | NO | NO |

Appendix-continued

Exemplary Relational Database information for use with exemplary security system and relational database figure.

|     | Vid_Desc | Text | NO | NO |
|-----|----------|------|----|----|
| PFK | EVT_ID | UniqueIdentifier | YES | NO |

Relationships

| Relationship name | Type | Parent entity | Child entity | Card. |
|---|---|---|---|---|
| Relationship44 | Identifying | Events | Video | 1:N |

User-defined variables
| Name | Value |
|---|---|
| Owner | |
| Non clustered primary key | No |
| Primary key fill factor | |
| Data space for Table | |
| Data space for Primary key | |
| Text Filegroup for Table (TEXTIMAGE_ON) | |

Entity 'VOIP'
General info
Entity type: dependent
Attributes

| Key | Attribute/role name | Data type | Not null | Unique |
|---|---|---|---|---|
| PK | VOIP_ID | UniqueIdentifier | YES | YES |
| | VOIP_Name | VarChar (50) | NO | NO |
| | VOIP_Date | DateTime | NO | NO |
| | VOIP_Time | DateTime | NO | NO |
| | VOIP_Sens | Char (15) | NO | NO |
| | VOIP_Data | Binary (512) | NO | NO |
| | VOIP_Rem | Text | NO | NO |
| PFK | EVT_ID | UniqueIdentifier | YES | NO |

Relationships

| Relationship name | Type | Parent entity | Child entity | Card. |
|---|---|---|---|---|
| Relationship42 | Identifying | Events | VOIP | 1:N |

User-defined variables
| Name | Value |
|---|---|
| Owner | |
| Non clustered primary key | No |
| Primary key fill factor | |
| Data space for Table | |
| Data space for Primary key | |
| Text Filegroup for Table (TEXTIMAGE_ON) | |

Acces.Acces_Date
General info
Entity name                Access
Data type                  DateTime
Not null                   YES
Unique                     YES
User-defined variables
Name                       Value Unique Fill factor
Identity                                               No
Identity Seed
Identity Increment
Default object
Rule object
RowGuidCol                                             No
Clustered unique                                       No
Not for replication (Identity)                         No
Not for replication (Check)                            No
Data space for Unique
Descending order (for Primary Key)                     No
Descending order (for Unique)                          No
Override Null/NotNull by User Type                     No
Generate Unique as unique Index                        No
Collation for the column
Maximum storage size for varying types is "max"        No
Disabled check constraint                              No Access.Access_FName
General info
Entity name                Access
Data type                  Char (20)

Appendix-continued

Exemplary Relational Database information for use with exemplary security system and relational database figure.

| | |
|---|---|
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Access.Access_ID | |
| General info | |
| Entity name | Access |
| Data type | UniqueIdentifier |
| Not null | YES |
| Unique | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | Yes |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Access.Access_LName | |
| General info | |
| Entity name | Access |
| Data type | Char (20) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Appendix-continued

Exemplary Relational Database information for use with exemplary security system and relational database figure.

Access.Access_Point
General info
| | |
|---|---|
| Entity name | Access |
| Data type | Char (20) |
| Not null | NO |

User-defined variables
| Name | Value |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Access.Access_Time
General info
| | |
|---|---|
| Entity name | Access |
| Data type | DateTime |
| Not null | NO |

User-defined variables
| Name | Value |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Access.Access_Type
General info
| | |
|---|---|
| Entity name | Access |
| Data type | Char (20) |
| Not null | NO |

User-defined variables
| Name | Value |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |

Appendix-continued

Exemplary Relational Database information for use with exemplary security system and relational database figure.

| | |
|---|---|
| Maximum storage size for varying types is "max" | No |
| Disabled check constraint | No |

Access.Identity
General info
| | |
|---|---|
| Entity name | Access |
| Data type | UniqueIdentifier |
| Not null | NO |

User-defined variables
| Name | Value |
|---|---|

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Account.Acct_Desc
General info
| | |
|---|---|
| Entity name | Account |
| Data type | Text |
| Not null | NO |

User-defined variables
| Name | Value |
|---|---|

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Account.Acct_Expires
General info
| | |
|---|---|
| Entity name | Account |
| Data type | Char (1) |
| Not null | NO |

User-defined variables
| Name | Value |
|---|---|

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |

Appendix-continued

Exemplary Relational Database information for use with exemplary security system and relational database figure.

| | |
|---|---|
| Override Null/NotNull by User Type | No |
| Generate Unique as unique Index | No |
| Collation for the column | |
| Maximum storage size for varying types is "max" | No |
| Disabled check constraint | No |

Account.Acct_FName
General info
| | |
|---|---|
| Entity name | Account |
| Data type | Char (20) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Account.Acct_ID
General info
| | |
|---|---|
| Entity name | Account |
| Data type | UniqueIdentifier |
| Not null | YES |
| Unique | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | Yes |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Account.Acct_Image
General info
| | |
|---|---|
| Entity name | Account |
| Data type | Image |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |

Appendix-continued

Exemplary Relational Database information for use with exemplary security system and relational database figure.

| | |
|---|---|
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Account.Acct_LName | |
| General info | |
| Entity name | Account |
| Data type | Char (20) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Account.Acct_NHours | |
| General info | |
| Entity name | Account |
| Data type | Char (25) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Account.Acct_PHours | |
| General info | |
| Entity name | Account |
| Data type | Char (25) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |

Appendix-continued

Exemplary Relational Database information for use with exemplary security system and relational database figure.

| | |
|---|---|
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Account.Acct_Purpose | |
| General info | |
| Entity name | Account |
| Data type | Char (20) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Account.Acct_Reason | |
| General info | |
| Entity name | Account |
| Data type | Char (30) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Account.Acct_Rem | |
| General info | |
| Entity name | Account |
| Data type | Text |
| Not null | NO |
| User-defined variables | |
| Name | Value |

| | |
|---|---|
| Unique Fill factor | |
| Identity | No |
| Identity Seed | |

Appendix-continued

Exemplary Relational Database information for use with exemplary security system and relational database figure.

| | |
|---|---|
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Account.Acct_Type | |
| General info | |
| Entity name | Account |
| Data type | Char (20) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Account.Acct_Zone | |
| General info | |
| Entity name | Account |
| Data type | Char (15) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Acct_Hours.Acct_ID | |
| General info | |
| Entity name | Acct Hours |
| Data type | UniqueIdentifier |
| Not null | YES |
| User-defined variables | |
| Name | Value |

Appendix-continued

Exemplary Relational Database information for use with exemplary security system and relational database figure.

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Acct_Hours.Hrs_ID | |
| General info | |
| Entity name | Acct Hours |
| Data type | UniqueIdentifier |
| Not null | YES |
| Unique | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Acct_Hours.Hrs_Value | |
| General info | |
| Entity name | Acct Hours |
| Data type | Char (1) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| AD.AcctID | |
| General info | |
| Entity name | AD |
| Data type | UniqueIdentifier |

Appendix-continued

Exemplary Relational Database information for use with exemplary security system and relational database figure.

| | |
|---|---|
| Not null | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Audio.Aud_Date | |
| General info | |
| Entity name | Audio |
| Data type | DateTime |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Audio.Aud_Desc | |
| General info | |
| Entity name | Audio |
| Data type | Char (1) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Appendix-continued

Exemplary Relational Database information for use with exemplary security system and relational database figure.

| | |
|---|---|
| Audio.Aud_ID | |
| General info | |
| Entity name | Audio |
| Data type | UniqueIdentifier |
| Not null | YES |
| Unique | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | Yes |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Audio.Aud_Name | |
| General info | |
| Entity name | Audio |
| Data type | VarChar (50) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Audio.Aud_Sens | |
| General info | |
| Entity name | Audio |
| Data type | Char (15) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |

Appendix-continued

Exemplary Relational Database information for use with exemplary security system and relational database figure.

| | |
|---|---|
| Collation for the column | |
| Maximum storage size for varying types is "max" | No |
| Disabled check constraint | No |

| Audio.Aud_Time | |
|---|---|
| General info | |
| Entity name | Audio |
| Data type | DateTime |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| Audio.EVT_ID | |
|---|---|
| General info | |
| Entity name | Audio |
| Data type | UniqueIdentifier |
| Not null | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| Certs.Cert_Auth | |
|---|---|
| General info | |
| Entity name | Certs |
| Data type | Char (15) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |

| Appendix-continued | |
|---|---|
| Exemplary Relational Database information for use with exemplary security system and relational database figure. | |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Certs.Cert_Cert | |
| General info | |
| Entity name | Certs |
| Data type | VarChar (50) |
| Not null | NO |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Certs.Cert_Date | |
| General info | |
| Entity name | Certs |
| Data type | DateTime |
| Not null | NO |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Certs.Cert_Expire | |
| General info | |
| Entity name | Certs |
| Data type | DateTime |
| Not null | NO |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |

Appendix-continued

Exemplary Relational Database information for use with exemplary security system and relational database figure.

| | |
|---|---|
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Certs.Cert_ID | |
| General info | |
| Entity name | Certs |
| Data type | UniqueIdentifier |
| Not null | YES |
| Unique | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Certs.Cert_Type | |
| General info | |
| Entity name | Certs |
| Data type | Char (20) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Doc_Auth.Auth_ID | |
| General info | |
| Entity name | Doc_Auth |
| Data type | UniqueIdentifier |
| Not null | YES |
| Unique | YES |
| User-defined variables | |
| Name | Value |

| | |
|---|---|
| Unique Fill factor | |
| Identity | No |
| Identity Seed | |
| Identity Increment | |

Appendix-continued

Exemplary Relational Database information for use with exemplary security system and relational database figure.

| | |
|---|---|
| Default object | |
| Rule object | |
| RowGuidCol | Yes |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Doc_Auth.Auth_Start_Date | |
| General info | |
| Entity name | Doc_Auth |
| Data type | DateTime |
| Not null | NO |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Doc_Auth.Auth_Type | |
| General info | |
| Entity name | Doc_Auth |
| Data type | Char (20) |
| Not null | NO |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Doc_Auth.Auth_User | |
| General info | |
| Entity name | Doc_Auth |
| Data type | UniqueIdentifier |
| Not null | NO |
| User-defined variables | |
| Name | Value |

Appendix-continued

Exemplary Relational Database information for use with exemplary security system and relational database figure.

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Doc_Auth.Doc_ID | |
| General info | |
| Entity name | Doc_Auth |
| Data type | UniqueIdentifier |
| Not null | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Doc_Auth. End_Auth_Date | |
| General info | |
| Entity name | Doc_Auth |
| Data type | DateTime |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Doc_Auth.EVT_ID | |
| General info | |
| Entity name | Doc_Auth |
| Data type | UniqueIdentifier |
| Not null | YES |

Appendix-continued

Exemplary Relational Database information for use with exemplary security system and relational database figure.

User-defined variables
| Name | Value |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Docs.Dec_Sens
General info
| | |
|---|---|
| Entity name | Docs |
| Data type | Char (15) |
| Not null | NO |

User-defined variables
| Name | Value |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Docs.Doc_Author
General info
| | |
|---|---|
| Entity name | Docs |
| Data type | VarChar (50) |
| Not null | NO |

User-defined variables
| Name | Value |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Docs.Doc_Date
General info

Appendix-continued

Exemplary Relational Database information for use with exemplary security system and relational database figure.

| | |
|---|---|
| Entity name | Docs |
| Data type | DateTime |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Docs.Doc_Doc
General info

| | |
|---|---|
| Entity name | Docs |
| Data type | VarBinary (512) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Docs.Doc_ID
General info

| | |
|---|---|
| Entity name | Docs |
| Data type | UniqueIdentifier |
| Not null | YES |
| Unique | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |

Appendix-continued

Exemplary Relational Database information for use with exemplary security system and relational database figure.

| | |
|---|---|
| Collation for the column | |
| Maximum storage size for varying types is "max" | No |
| Disabled check constraint | No |

| | |
|---|---|
| Docs.Doc_Img | |
| General info | |
| Entity name | Docs |
| Data type | Image |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Docs.Doc_Name | |
| General info | |
| Entity name | Docs |
| Data type | VarChar (50) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Docs.Doc_Rem | |
| General info | |
| Entity name | Docs |
| Data type | Text |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |

Appendix-continued

Exemplary Relational Database information for use with exemplary security system and relational database figure.

| | |
|---|---|
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Docs.Doc_Time | |
| General info | |
| Entity name | Docs |
| Data type | DateTime |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Docs.Doc_Type | |
| General info | |
| Entity name | Docs |
| Data type | Char (20) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Docs.EVT_ID | |
| General info | |
| Entity name | Docs |
| Data type | UniqueIdentifier |
| Not null | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |

Appendix-continued

Exemplary Relational Database information for use with exemplary security system and relational database figure.

| | |
|---|---|
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Equipment.Equip_Desc | |
| General info | |
| Entity name | Equipment |
| Data type | Text |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Equipment.Equip_ID | |
| General info | |
| Entity name | Equipment |
| Data type | UniqueIdentifier |
| Not null | YES |
| Unique | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | Yes |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Equipment.Equip_Model | |
| General info | |
| Entity name | Equipment |
| Data type | Char (20) |
| Not null | NO |
| User-defined variables | |
| Name | Value |

| | |
|---|---|
| Unique Fill factor | |
| Identity | No |
| Identity Seed | |
| Identity Increment | |
| Default object | |

Appendix-continued

Exemplary Relational Database information for use with exemplary security system and relational database figure.

| | |
|---|---|
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Equipment.Equip_Name | |
| General info | |
| Entity name | Equipment |
| Data type | VarChar (50) |
| Not null | NO |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Equipment.Equip_Rem | |
| General info | |
| Entity name | Equipment |
| Data type | Text |
| Not null | NO |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Equipment.Equip_Serial | |
| General info | |
| Entity name | Equipment |
| Data type | Char (20) |
| Not null | NO |
| User-defined variables | |
| Name | Value |
| | |
| Unique Fill factor | |
| Identity | No |

Appendix-continued

Exemplary Relational Database information for use with exemplary security system and relational database figure.

| | |
|---|---|
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Equipment.Equip_Task | |
| General info | |
| Entity name | Equipment |
| Data type | VarChar (1) |
| Not null | NO |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Equipment.Org_ID | |
| General info | |
| Entity name | Equipment |
| Data type | UniqueIdentifier |
| Not null | YES |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Equipment.Special_Req | |
| General info | |
| Entity name | Equipment |
| Data type | Text |

Appendix-continued

Exemplary Relational Database information for use with exemplary security system and relational database figure.

| | |
|---|---|
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Events.Evt_close_Date | |
| General info | |
| Entity name | Events |
| Data type | DateTime |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Events.EVT_Close_Time | |
| General info | |
| Entity name | Events |
| Data type | DateTime |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Appendix-continued

Exemplary Relational Database information for use with exemplary security system and relational database figure.

Events.Evt_CMDR
General info
Entity name                                          Events
Data type                                            VarChar (50)
Not null                                             NO
User-defined variables
Name                                                 Value Unique Fill factor
Identity                                             No
Identity Seed
Identity Increment
Default object
Rule object
RowGuidCol                                           No
Clustered unique                                     No
Not for replication (Identity)                       No
Not for replication (Check)                          No
Data space for Unique
Descending order (for Primary Key)                   No
Descending order (for Unique)                        No
Override Null/NotNull by User Type                   No
Generate Unique as unique Index                      No
Collation for the column
Maximum storage size for varying types is "max"      No
Disabled check constraint                            No Events.Evt_Criticality
General info
Entity name                                          Events
Data type                                            Char (15)
Not null                                             NO
User-defined variables
Name                                                 Value Unique Fill factor
Identity                                             No
Identity Seed
Identity Increment
Default object
Rule object
RowGuidCol                                           No
Clustered unique                                     No
Not for replication (Identity)                       No
Not for replication (Check)                          No
Data space for Unique
Descending order (for Primary Key)                   No
Descending order (for Unique)                        No
Override Null/NotNull by User Type                   No
Generate Unique as unique Index                      No
Collation for the column
Maximum storage size for varying types is "max"      No
Disabled check constraint                            No Events.EVT_General_Loc
General info
Entity name                                          Events
Data type                                            Text
Not null                                             NO
User-defined variables
Name                                                 Value Unique Fill factor
Identity                                             No
Identity Seed
Identity Increment
Default object
Rule object
RowGuidCol                                           No
Clustered unique                                     No
Not for replication (Identity)                       No
Not for replication (Check)                          No
Data space for Unique
Descending order (for Primary Key)                   No
Descending order (for Unique)                        No
Override Null/NotNull by User Type                   No
Generate Unique as unique Index                      No
Collation for the column

Appendix-continued

Exemplary Relational Database information for use with exemplary security system and relational database figure.

| | |
|---|---|
| Maximum storage size for varying types is "max" | No |
| Disabled check constraint | No |

| | |
|---|---|
| Events.EVT_ID | |
| General info | |
| Entity name | Events |
| Data type | UniqueIdentifier |
| Not null | YES |
| Unique | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | Yes |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Events.Evt_Inter_Loc | |
| General info | |
| Entity name | Events |
| Data type | Text |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Events.Evt_Loc | |
| General info | |
| Entity name | Events |
| Data type | VarChar (50) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |

Appendix-continued

Exemplary Relational Database information for use with exemplary security system and relational database figure.

| | |
|---|---|
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Events.Evt_name | |
| General info | |
| Entity name | Events |
| Data type | VarChar (50) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Events.Evt_Open_Date | |
| General info | |
| Entity name | Events |
| Data type | DateTime |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Events.EVT_Open_Time | |
| General info | |
| Entity name | Events |
| Data type | DateTime |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |

Appendix-continued

Exemplary Relational Database information for use with exemplary security system and relational database figure.

| | |
|---|---|
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Events.Evt_Pinpoint_Loc | |
| General info | |
| Entity name | Events |
| Data type | Text |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Events.Evt_Sensitivity | |
| General info | |
| Entity name | Events |
| Data type | Char (15) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Evt_Log.EVT_ID | |
| General info | |
| Entity name | Evt_Log |
| Data type | UniqueIdentifier |
| Not null | YES |
| User-defined variables | |
| Name | Value |

| | |
|---|---|
| Unique Fill factor | |
| Identity | No |
| Identity Seed | |
| Identity Increment | |
| Default object | |
| Rule object | |

Appendix-continued

Exemplary Relational Database information for use with exemplary security system and relational database figure.

| | |
|---|---|
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Evt_Log.Lg_Agency | |
| General info | |
| Entity name | Evt_Log |
| Data type | VarChar (50) |
| Not null | NO |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Evt_Log.Lg_Crit | |
| General info | |
| Entity name | Evt_Log |
| Data type | Char (20) |
| Not null | NO |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Evt_Log.Lg_Date | |
| General info | |
| Entity name | Evt_Log |
| Data type | DateTime |
| Not null | NO |
| User-defined variables | |
| Name | Value |
| | |
| Unique Fill factor | |
| Identity | No |
| Identity Seed | |

| Appendix-continued |  |
|---|---|
| Exemplary Relational Database information for use with exemplary security system and relational database figure. | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Evt_Log.Lg_Entry | |
| General info | |
| Entity name | Evt_Log |
| Data type | VarChar (50) |
| Not null | NO |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Evt_Log.Lg_Sens | |
| General info | |
| Entity name | Evt_Log |
| Data type | Char (20) |
| Not null | NO |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Evt_Log.Lg_Time | |
| General info | |
| Entity name | Evt_Log |
| Data type | Char (1) |
| Not null | NO |
| User-defined variables | |
| Name | Value |

| Appendix-continued | |
|---|---|
| Exemplary Relational Database information for use with exemplary security system and relational database figure. | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Evt_Log.Lg_Txt | |
| General info | |
| Entity name | Evt_Log |
| Data type | Char (1) |
| Not null | NO |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Evt_Log.Log_ID | |
| General info | |
| Entity name | Evt_Log |
| Data type | UniqueIdentifier |
| Not null | YES |
| Unique | YES |
| User-defined variables | |
| Name | Value |
| | |
| Unique Fill factor | |
| Identity | No |
| Identity Seed | |
| Identity Increment | |
| Default object | |
| Rule object | |
| RowGuidCol | Yes |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Graph.EVT_ID | |
| General info | |
| Entity name | Graph |
| Data type | UniqueIdentifier |

Appendix-continued

Exemplary Relational Database information for use with exemplary security system and relational database figure.

| | |
|---|---|
| Not null | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Graph.Graph_Date_Time | |
| General info | |
| Entity name | Graph |
| Data type | DateTime |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Graph.Graph_Desc | |
| General info | |
| Entity name | Graph |
| Data type | Text |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Appendix-continued

Exemplary Relational Database information for use with exemplary security system and relational database figure.

Graph.Graph_Graphic
General info
| | |
|---|---|
| Entity name | Graph |
| Data type | Image |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Graph.Graph_ID
General info
| | |
|---|---|
| Entity name | Graph |
| Data type | UniqueIdentifier |
| Not null | YES |
| Unique | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Graph.Graph_Name
General info
| | |
|---|---|
| Entity name | Graph |
| Data type | VarChar (50) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |

| Appendix-continued | |
|---|---|
| Exemplary Relational Database information for use with exemplary security system and relational database figure. | |
| Collation for the column | |
| Maximum storage size for varying types is "max" | No |
| Disabled check constraint | No |
| Graph.Graph_Sensitivity | |
| General info | |
| Entity name | Graph |
| Data type | Char (15) |
| Not null | NO |
| User-defined variables | |
| Name | Value |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| Graph.Graphic_Type | |
| General info | |
| Entity name | Graph |
| Data type | Char (15) |
| Not null | NO |
| User-defined variables | |
| Name | Value |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| Historical.EVT_ID | |
| General info | |
| Entity name | Historical |
| Data type | UniqueIdentifier |
| Not null | YES |
| User-defined variables | |
| Name | Value |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |

Appendix-continued

Exemplary Relational Database information for use with exemplary security system and relational database figure.

| | |
|---|---|
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Historical.Hist_CMDR | |
| General info | |
| Entity name | Historical |
| Data type | VarChar (50) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Historical.Hist_Date | |
| General info | |
| Entity name | Historical |
| Data type | DateTime |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Historical.Hist_Desc | |
| General info | |
| Entity name | Historical |
| Data type | Text |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |

Appendix-continued

Exemplary Relational Database information for use with exemplary security system and relational database figure.

| | |
|---|---|
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Historical.Hist_Doc | |
| General info | |
| Entity name | Historical |
| Data type | Char (1) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Historical.Hist_Evt_Type | |
| General info | |
| Entity name | Historical |
| Data type | Char (1) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Historical.Hist_ID | |
| General info | |
| Entity name | Historical |
| Data type | UniqueIdentifier |
| Not null | YES |
| Unique | YES |
| User-defined variables | |
| Name | Value |

| | |
|---|---|
| Unique Fill factor | |
| Identity | No |
| Identity Seed | |
| Identity Increment | |
| Default object | |

Appendix-continued

Exemplary Relational Database information for use with exemplary security system and relational database figure.

| | |
|---|---|
| Rule object | |
| RowGuidCol | Yes |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Historical.Hist_Name | |
| General info | |
| Entity name | Historical |
| Data type | VarChar (50) |
| Not null | NO |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| JT accevt.Access_ID | |
| General info | |
| Entity name | JT accevt |
| Data type | UniqueIdentifier |
| Not null | YES |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| JT accevt.EVT_ID | |
| General info | |
| Entity name | JT accevt |
| Data type | UniqueIdentifier |
| Not null | YES |
| User-defined variables | |
| Name | Value |
| | |
| Unique Fill factor | |
| Identity | No |

Appendix-continued

Exemplary Relational Database information for use with exemplary security system and relational database figure.

| | |
|---|---|
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| JT org_evt.EVT_ID | |
| General info | |
| Entity name | JT org_evt |
| Data type | UniqueIdentifier |
| Not null | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| JT org_evt.Org_ID | |
| General info | |
| Entity name | JT org_evt |
| Data type | UniqueIdentifier |
| Not null | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| JT pers_certs.Cert_ID | |
| General info | |
| Entity name | JT pers_certs |
| Data type | UniqueIdentifier |

Appendix-continued

Exemplary Relational Database information for use with exemplary security system and relational database figure.

| | |
|---|---|
| Not null | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| JT pers_certs.Org_ID | |
| General info | |
| Entity name | JT pers_certs |
| Data type | UniqueIdentifier |
| Not null | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| JT pers_certs.Pers_ID | |
| General info | |
| Entity name | JT pers_certs |
| Data type | UniqueIdentifier |
| Not null | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Appendix-continued

Exemplary Relational Database information for use with exemplary security system and relational database figure.

JT_Acct_Read.Acct_ID
General info
Entity name — JT Acct Read
Data type — UniqueIdentifier
Not null — YES
User-defined variables
Name — Value Unique Fill factor
Identity — No
Identity Seed
Identity Increment
Default object
Rule object
RowGuidCol — No
Clustered unique — No
Not for replication (Identity) — No
Not for replication (Check) — No
Data space for Unique
Descending order (for Primary Key) — No
Descending order (for Unique) — No
Override Null/NotNull by User Type — No
Generate Unique as unique Index — No
Collation for the column
Maximum storage size for varying types is "max" — No
Disabled check constraint — No JT_Acct_Read.Read_ID
General info
Entity name — JT Acct Read
Data type — UniqueIdentifier
Not null — YES
User-defined variables
Name — Value Unique Fill factor
Identity — No
Identity Seed
Identity Increment
Default object
Rule object
RowGuidCol — No
Clustered unique — No
Not for replication (Identity) — No
Not for replication (Check) — No
Data space for Unique
Descending order (for Primary Key) — No
Descending order (for Unique) — No
Override Null/NotNull by User Type — No
Generate Unique as unique Index — No
Collation for the column
Maximum storage size for varying types is "max" — No
Disabled check constraint — No JT_Org_Tsk.Org_ID
General info
Entity name — JT_Org_Tsk
Data type — UniqueIdentifier
Not null — YES
User-defined variables
Name — Value Unique Fill factor
Identity — No
Identity Seed
Identity Increment
Default object
Rule object
RowGuidCol — No
Clustered unique — No
Not for replication (Identity) — No
Not for replication (Check) — No
Data space for Unique
Descending order (for Primary Key) — No
Descending order (for Unique) — No
Override Null/NotNull by User Type — No
Generate Unique as unique Index — No
Collation for the column Appendix-continued Exemplary Relational Database information for use with exemplary security system and relational database figure.

| | |
|---|---|
| Maximum storage size for varying types is "max" | No |
| Disabled check constraint | No |

JT_Org_Tsk.Task_ID
General info

| | |
|---|---|
| Entity name | JT_Org_Tsk |
| Data type | UniqueIdentifier |
| Not null | YES |

User-defined variables

| Name | Value |
|---|---|

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

JT_Org_Tsk.Task_Name
General info

| | |
|---|---|
| Entity name | JT_Org_Tsk |
| Data type | VarChar (50) |
| Not null | YES |

User-defined variables

| Name | Value |
|---|---|

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Logs.Log_Alerts
General info

| | |
|---|---|
| Entity name | Logs |
| Data type | Char (20) |
| Not null | NO |

User-defined variables

| Name | Value |
|---|---|

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |

Appendix-continued

Exemplary Relational Database information for use with exemplary security system and relational database figure.

| | |
|---|---|
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Logs.Log_Date | |
| General info | |
| Entity name | Logs |
| Data type | DateTime |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Logs.Log_Desc | |
| General info | |
| Entity name | Logs |
| Data type | Char (35) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Logs.Log_Event | |
| General info | |
| Entity name | Logs |
| Data type | Char (25) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |

Appendix-continued

Exemplary Relational Database information for use with exemplary security system and relational database figure.

| | |
|---|---|
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Logs.Log_Evt_Type | |
| General info | |
| Entity name | Logs |
| Data type | Char (20) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Logs.Log_ID | |
| General info | |
| Entity name | Logs |
| Data type | UniqueIdentifier |
| Not null | YES |
| Unique | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | Yes |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Logs.Log_Priority | |
| General info | |
| Entity name | Logs |
| Data type | Char (20) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |

Appendix-continued

Exemplary Relational Database information for use with exemplary security system and relational database figure.

| | |
|---|---|
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Logs.Log_Sys | |
| General info | |
| Entity name | Logs |
| Data type | Char (20) |
| Not null | NO |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Logs.Log_Text | |
| General info | |
| Entity name | Logs |
| Data type | Text |
| Not null | NO |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Logs.Log_Time | |
| General info | |
| Entity name | Logs |
| Data type | DateTime |
| Not null | NO |
| User-defined variables | |
| Name | Value |
| | |
| Unique Fill factor | |
| Identity | No |
| Identity Seed | |

Appendix-continued

Exemplary Relational Database information for use with exemplary security system and relational database figure.

| | |
|---|---|
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Logs.Log_User | |
| General info | |
| Entity name | Logs |
| Data type | VarBinary (50) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Org_cht.Cht_M_Data | |
| General info | |
| Entity name | Org_cht |
| Data type | Image |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Org_cht.Cht_M_Desc | |
| General info | |
| Entity name | Org_cht |
| Data type | Text |
| Not null | NO |
| User-defined variables | |
| Name | Value |

| | |
|---|---|
| Exemplary Relational Database information for use with exemplary security system and relational database figure. | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Org_cht.Cht_M_Name | |
| General info | |
| Entity name | Org_cht |
| Data type | VarChar (50) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Org_cht.Cht_mast_ID | |
| General info | |
| Entity name | Org_cht |
| Data type | UniqueIdentifier |
| Not null | YES |
| Unique | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | Yes |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Org_cht.EVT_ID | |
| General info | |
| Entity name | Org_cht |
| Data type | UniqueIdentifier |

Appendix-continued

Exemplary Relational Database information for use with exemplary security system and relational database figure.

| | |
|---|---|
| Not null | YES |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Organization.Org_Address | |
| General info | |
| Entity name | Organization |
| Data type | VarChar (64) |
| Not null | NO |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Organization.Org_city | |
| General info | |
| Entity name | Organization |
| Data type | VarChar (35) |
| Not null | NO |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Appendix-continued

Exemplary Relational Database information for use with exemplary security system and relational database figure.

Organization.Org_ID
General info
| | |
|---|---|
| Entity name | Organization |
| Data type | UniqueIdentifier |
| Not null | YES |
| Unique | YES |

User-defined variables
| Name | Value |
|---|---|
| Unique Fill factor | |
| Identity | No |
| Identity Seed | |
| Identity Increment | |
| Default object | |
| Rule object | |
| RowGuidCol | Yes |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Organization.Org_Name
General info
| | |
|---|---|
| Entity name | Organization |
| Data type | VarChar (50) |
| Not null | NO |

User-defined variables
| Name | Value |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Organization.Org_POC
General info
| | |
|---|---|
| Entity name | Organization |
| Data type | VarChar (50) |
| Not null | NO |

User-defined variables
| Name | Value |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |

Appendix-continued

Exemplary Relational Database information for use with exemplary security system and relational database figure.

| | |
|---|---|
| Collation for the column | |
| Maximum storage size for varying types is "max" | No |
| Disabled check constraint | No |

| | |
|---|---|
| Organization.Org_State | |
| General info | |
| Entity name | Organization |
| Data type | Char (20) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Organization.Org_Zip | |
| General info | |
| Entity name | Organization |
| Data type | SmallInt |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Package.EVT_ID | |
| General info | |
| Entity name | Package |
| Data type | UniqueIdentifier |
| Not null | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |

Appendix-continued

Exemplary Relational Database information for use with exemplary security system and relational database figure.

| | |
|---|---|
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Package.Package_ID | |
| General info | |
| Entity name | Package |
| Data type | UniqueIdentifier |
| Not null | YES |
| Unique | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | Yes |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Package.Pkg_def | |
| General info | |
| Entity name | Package |
| Data type | Char (20) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Package.Pkg_E_Date | |
| General info | |
| Entity name | Package |
| Data type | DateTime |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |

Appendix-continued

Exemplary Relational Database information for use with exemplary security system and relational database figure.

| | |
|---|---|
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Package.Pkg_Name | |
| General info | |
| Entity name | Package |
| Data type | VarChar (50) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Package.Pkg_S_Date | |
| General info | |
| Entity name | Package |
| Data type | DateTime |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Package.Pkg_Status | |
| General info | |
| Entity name | Package |
| Data type | Char (20) |
| Not null | NO |
| User-defined variables | |
| Name | Value |

| | |
|---|---|
| Unique Fill factor | |
| Identity | No |
| Identity Seed | |
| Identity Increment | |
| Default object | |

Appendix-continued

Exemplary Relational Database information for use with exemplary security system and relational database figure.

| | |
|---|---|
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Package.Pkg_type | |
| General info | |
| Entity name | Package |
| Data type | Char (20) |
| Not null | NO |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Personnel.Org_ID | |
| General info | |
| Entity name | Personnel |
| Data type | UniqueIdentifier |
| Not null | YES |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Personnel.Pers_Blood | |
| General info | |
| Entity name | Personnel |
| Data type | Char (10) |
| Not null | NO |
| User-defined variables | |
| Name | Value |
| | |
| Unique Fill factor | |
| Identity | No |

Appendix-continued

Exemplary Relational Database information for use with exemplary security system and relational database figure.

| | |
|---|---|
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Personnel.Pers_Clear | |
| General info | |
| Entity name | Personnel |
| Data type | Char (15) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Personnel.Pers_Cost | |
| General info | |
| Entity name | Personnel |
| Data type | Money |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Personnel.Pers_DOB | |
| General info | |
| Entity name | Personnel |
| Data type | DateTime |

Appendix-continued

Exemplary Relational Database information for use with exemplary security system and relational database figure.

| | |
|---|---|
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Personnel.Pers_Duty | |
| General info | |
| Entity name | Personnel |
| Data type | VarChar (128) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Personnel.Pers_FName | |
| General info | |
| Entity name | Personnel |
| Data type | Char (20) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Appendix-continued

Exemplary Relational Database information for use with exemplary security system and relational database figure.

Personnel.Pers_ID
General info
Entity name                                              Personnel
Data type                                                UniqueIdentifier
Not null                                                 YES
Unique                                                   YES
User-defined variables
Name                                                     Value Unique Fill factor
Identity                                                 No
Identity Seed
Identity Increment
Default object
Rule object
RowGuidCol                                               No
Clustered unique                                         No
Not for replication (Identity)                           No
Not for replication (Check)                              No
Data space for Unique
Descending order (for Primary Key)                       No
Descending order (for Unique)                            No
Override Null/NotNull by User Type                       No
Generate Unique as unique Index                          No
Collation for the column
Maximum storage size for varying types is "max"          No
Disabled check constraint                                No Personnel.Pers_LName
General info
Entity name                                              Personnel
Data type                                                Char (20)
Not null                                                 NO
User-defined variables
Name                                                     Value Unique Fill factor
Identity                                                 No
Identity Seed
Identity Increment
Default object
Rule object
RowGuidCol                                               No
Clustered unique                                         No
Not for replication (Identity)                           No
Not for replication (Check)                              No
Data space for Unique
Descending order (for Primary Key)                       No
Descending order (for Unique)                            No
Override Null/NotNull by User Type                       No
Generate Unique as unique Index                          No
Collation for the column
Maximum storage size for varying types is "max"          No
Disabled check constraint                                No Personnel.Pers_Status
General info
Entity name                                              Personnel
Data type                                                Char (15)
Not null                                                 NO
User-defined variables
Name                                                     Value Unique Fill factor
Identity                                                 No
Identity Seed
Identity Increment
Default object
Rule object
RowGuidCol                                               No
Clustered unique                                         No
Not for replication (Identity)                           No
Not for replication (Check)                              No
Data space for Unique
Descending order (for Primary Key)                       No
Descending order (for Unique)                            No
Override Null/NotNull by User Type                       No
Generate Unique as unique Index                          No

Appendix-continued

Exemplary Relational Database information for use with exemplary security system and relational database figure.

| | |
|---|---|
| Collation for the column | |
| Maximum storage size for varying types is "max" | No |
| Disabled check constraint | No |

| Readers.Read_Active | |
|---|---|
| General info | |
| Entity name | Readers |
| Data type | Bit |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| Readers.Read_Desc | |
|---|---|
| General info | |
| Entity name | Readers |
| Data type | Text |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| Readers.Read_Grp | |
|---|---|
| General info | |
| Entity name | Readers |
| Data type | VarChar (50) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |

Appendix-continued

Exemplary Relational Database information for use with exemplary security system and relational database figure.

| | |
|---|---|
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Readers.Read_ID | |
| General info | |
| Entity name | Readers |
| Data type | UniqueIdentifier |
| Not null | YES |
| Unique | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | Yes |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Readers.Read_Lat | |
| General info | |
| Entity name | Readers |
| Data type | Char (25) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Readers.Read_long | |
| General info | |
| Entity name | Readers |
| Data type | Char (25) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |

Appendix-continued

Exemplary Relational Database information for use with exemplary security system and relational database figure.

| | |
|---|---|
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Readers.Read_Name | |
| General info | |
| Entity name | Readers |
| Data type | VarChar (50) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Reps_agency.AR_Agency | |
| General info | |
| Entity name | Reps_agency |
| Data type | VarChar (50) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Reps_agency.AR_End | |
| General info | |
| Entity name | Reps_agency |
| Data type | DateTime |
| Not null | NO |
| User-defined variables | |
| Name | Value |

| | |
|---|---|
| Unique Fill factor | |
| Identity | No |
| Identity Seed | |
| Identity Increment | |
| Default object | |

Appendix-continued

Exemplary Relational Database information for use with exemplary security system and relational database figure.

| | |
|---|---|
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Reps_agency.AR_FName | |
| General info | |
| Entity name | Reps_agency |
| Data type | Char (20) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Reps_agency.AR_LName | |
| General info | |
| Entity name | Reps_agency |
| Data type | Char (20) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Reps_agency.AR_Rem | |
| General info | |
| Entity name | Reps_agency |
| Data type | Text |
| Not null | NO |
| User-defined variables | |
| Name | Value |

| | |
|---|---|
| Unique Fill factor | |
| Identity | No |

Appendix-continued

Exemplary Relational Database information for use with exemplary security system and relational database figure.

| | |
|---|---|
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Reps_agency.AR_Start | |
| General info | |
| Entity name | Reps_agency |
| Data type | DateTime |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Reps_agency.ARep_ID | |
| General info | |
| Entity name | Reps_agency |
| Data type | UniqueIdentifier |
| Not null | YES |
| Unique | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | Yes |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Reps_agency.EVT_ID | |
| General info | |
| Entity name | Reps_agency |
| Data type | UniqueIdentifier |
| Not null | YES |
| User-defined variables | |

Appendix-continued

Exemplary Relational Database information for use with exemplary security system and relational database figure.

| Name | Value |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| Name | Value |
|---|---|
| Reps_Tech.EVT_ID | |
| General info | |
| Entity name | Reps_Tech |
| Data type | UniqueIdentifier |
| Not null | YES |
| User-defined variables | |
| Name | Value |

| Name | Value |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| Name | Value |
|---|---|
| Reps_Tech.TR_Agency | |
| General info | |
| Entity name | Reps_Tech |
| Data type | VarChar (50) |
| Not null | NO |
| User-defined variables | |
| Name | Value |

| Name | Value |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| Name | Value |
|---|---|
| Reps_Tech.TR_End | |
| General info | |
| Entity name | Reps_Tech |

Appendix-continued

Exemplary Relational Database information for use with exemplary security system and relational database figure.

| | |
|---|---|
| Data type | DateTime |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Reps_Tech.TR_FName | |
| General info | |
| Entity name | Reps_Tech |
| Data type | Char (20) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Reps_Tech.TR_ID | |
| General info | |
| Entity name | Reps_Tech |
| Data type | UniqueIdentifier |
| Not null | YES |
| Unique | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | Yes |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |

Appendix-continued

Exemplary Relational Database information for use with exemplary security system and relational database figure.

| | |
|---|---|
| Collation for the column | |
| Maximum storage size for varying types is "max" | No |
| Disabled check constraint | No |

| | |
|---|---|
| Reps_Tech.TR_LName | |
| General info | |
| Entity name | Reps_Tech |
| Data type | Char (20) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Reps_Tech.TR_Rem | |
| General info | |
| Entity name | Reps_Tech |
| Data type | Text |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Reps_Tech.TR_Start | |
| General info | |
| Entity name | Reps_Tech |
| Data type | DateTime |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |

| Appendix-continued | |
|---|---|
| Exemplary Relational Database information for use with exemplary security system and relational database figure. | |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Schedule.EVT_ID | |
| General info | |
| Entity name | Schedule |
| Data type | UniqueIdentifier |
| Not null | YES |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Schedule.Sched_Data | |
| General info | |
| Entity name | Schedule |
| Data type | Binary (512) |
| Not null | NO |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Schedule.Sched_ID | |
| General info | |
| Entity name | Schedule |
| Data type | UniqueIdentifier |
| Not null | YES |
| Unique | YES |
| User-defined variables | |
| Name | Value |
| | |
| Unique Fill factor | |
| Identity | No |
| Identity Seed | |
| Identity Increment | |
| Default object | |
| Rule object | |
| RowGuidCol | Yes |
| Clustered unique | No |

Appendix-continued

Exemplary Relational Database information for use with exemplary security system and relational database figure.

| | |
|---|---|
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Schedule.Sched_Name | |
| General info | |
| Entity name | Schedule |
| Data type | VarChar (50) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Sens_Pts.EVT_ID | |
| General info | |
| Entity name | Sens Pts |
| Data type | UniqueIdentifier |
| Not null | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Sens_Pts.PT_Date | |
| General info | |
| Entity name | Sens Pts |
| Data type | DateTime |
| Not null | NO |
| User-defined variables | |
| Name | Value |

| | |
|---|---|
| Unique Fill factor | |
| Identity | No |
| Identity Seed | |
| Identity Increment | |
| Default object | |

Appendix-continued

Exemplary Relational Database information for use with exemplary security system and relational database figure.

| | |
|---|---|
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Sens_Pts.Pt_ID | |
| General info | |
| Entity name | Sens Pts |
| Data type | UniqueIdentifier |
| Not null | YES |
| Unique | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Sens_Pts.PT_Time | |
| General info | |
| Entity name | Sens Pts |
| Data type | Char (1) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Sens_Pts.PT_Value | |
| General info | |
| Entity name | Sens Pts |
| Data type | Char (1) |
| Not null | NO |
| User-defined variables | |
| Name | Value |

| Appendix-continued |
|---|
| Exemplary Relational Database information for use with exemplary security system and relational database figure. |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Sens_Pts.Sens_ID | |
| General info | |
| Entity name | Sens Pts |
| Data type | UniqueIdentifier |
| Not null | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Sensor.EVT_ID | |
| General info | |
| Entity name | Sensor |
| Data type | UniqueIdentifier |
| Not null | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Sensor.Sens_Close_Date | |
| General info | |
| Entity name | Sensor |
| Data type | Char (1) |
| Not null | NO |

| Appendix-continued |
|---|
| Exemplary Relational Database information for use with exemplary security system and relational database figure. |

| User-defined variables | |
|---|---|
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Sensor.Sens_Close_Time | |
| General info | |
| Entity name | Sensor |
| Data type | DateTime |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Sensor.Sens_Deploy_Date | |
| General info | |
| Entity name | Sensor |
| Data type | DateTime |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Sensor.Sens_Deploy_Time
General info

Appendix-continued

Exemplary Relational Database information for use with exemplary security system and relational database figure.

| | |
|---|---|
| Entity name | Sensor |
| Data type | DateTime |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Sensor.Sens_Desc | |
| General info | |
| Entity name | Sensor |
| Data type | Text |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Sensor.Sens_ID | |
| General info | |
| Entity name | Sensor |
| Data type | UniqueIdentifier |
| Not null | YES |
| Unique | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |

Appendix-continued

Exemplary Relational Database information for use with exemplary security system and relational database figure.

| | |
|---|---|
| Generate Unique as unique Index | No |
| Collation for the column | |
| Maximum storage size for varying types is "max" | No |
| Disabled check constraint | No |

| | |
|---|---|
| Sensor.Sens_Lat | |
| General info | |
| Entity name | Sensor |
| Data type | Char (45) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Sensor.Sens_Long | |
| General info | |
| Entity name | Sensor |
| Data type | Char (45) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Sensor.Sens_Name | |
| General info | |
| Entity name | Sensor |
| Data type | VarChar (50) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |

| Appendix-continued | |
|---|---|
| Exemplary Relational Database information for use with exemplary security system and relational database figure. | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| Sensor.Sens_Remarks | |
| General info | |
| Entity name | Sensor |
| Data type | Text |
| Not null | NO |
| User-defined variables | |
| Name | Value |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| Sensor.Sens_Type | |
| General info | |
| Entity name | Sensor |
| Data type | Char (1) |
| Not null | NO |
| User-defined variables | |
| Name | Value |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| SITREP.EVT_ID | |
| General info | |
| Entity name | SITREP |
| Data type | UniqueIdentifier |
| Not null | YES |
| User-defined variables | |
| Name | Value |
| Unique Fill factor | |
| Identity | No |
| Identity Seed | |
| Identity Increment | |
| Default object | |
| Rule object | |
| RowGuidCol | No |
| Clustered unique | No |

Appendix-continued

Exemplary Relational Database information for use with exemplary security system and relational database figure.

| | |
|---|---|
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| SITREP.Sit_Act | |
| General info | |
| Entity name | SITREP |
| Data type | VarChar (64) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| SITREP.SitAgency | |
| General info | |
| Entity name | SITREP |
| Data type | Char (1) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| SITREP.Sit_Asset | |
| General info | |
| Entity name | SITREP |
| Data type | Char (1) |
| Not null | NO |
| User-defined variables | |
| Name | Value |

| | |
|---|---|
| Unique Fill factor | |
| Identity | No |
| Identity Seed | |
| Identity Increment | |
| Default object | |

Appendix-continued

Exemplary Relational Database information for use with exemplary security system and relational database figure.

| | |
|---|---|
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| SITREP.SitAssets | |
| General info | |
| Entity name | SITREP |
| Data type | VarChar (64) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| SITREP.Sit_Date | |
| General info | |
| Entity name | SITREP |
| Data type | DateTime |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| SITREP.Sit_Elem | |
| General info | |
| Entity name | SITREP |
| Data type | VarChar (64) |
| Not null | NO |
| User-defined variables | |
| Name | Value |

| | |
|---|---|
| Unique Fill factor | |
| Identity | No |

Appendix-continued

Exemplary Relational Database information for use with exemplary security system and relational database figure.

| | |
|---|---|
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| SITREP.Sit_ID | |
| General info | |
| Entity name | SITREP |
| Data type | UniqueIdentifier |
| Not null | YES |
| Unique | YES |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| SITREP.Sit_Imp | |
| General info | |
| Entity name | SITREP |
| Data type | VarChar (64) |
| Not null | NO |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| SITREP.Sit_Loc | |
| General info | |
| Entity name | SITREP |
| Data type | VarChar (64) |
| Not null | NO |
| User-defined variables | |

Appendix-continued

Exemplary Relational Database information for use with exemplary security system and relational database figure.

| Name | Value |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| SITREP.SitName | |
|---|---|
| General info | |
| Entity name | SITREP |
| Data type | VarChar (50) |
| Not null | NO |
| User-defined variables | |
| Name | Value |

| Unique Fill factor | |
|---|---|
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| SITREP.Sit_rem | |
|---|---|
| General info | |
| Entity name | SITREP |
| Data type | Text |
| Not null | NO |
| User-defined variables | |
| Name | Value |

| Unique Fill factor | |
|---|---|
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| SITREP.Sit_sev | |
|---|---|
| General info | |
| Entity name | SITREP |

Appendix-continued

Exemplary Relational Database information for use with exemplary security system and relational database figure.

| | |
|---|---|
| Data type | VarChar (64) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| SITREP.Sit_Situation | |
| General info | |
| Entity name | SITREP |
| Data type | VarChar (64) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| SITREP.Sit_tht | |
| General info | |
| Entity name | SITREP |
| Data type | VarChar (64) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Appendix-continued

Exemplary Relational Database information for use with exemplary security system and relational database figure.

| | |
|---|---|
| SITREP.Sit_Time | |
| General info | |
| Entity name | SITREP |
| Data type | Char (1) |
| Not null | NO |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Tasks.Task_Agency | |
| General info | |
| Entity name | Tasks |
| Data type | Char (1) |
| Not null | NO |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |
| | |
| Tasks.Task_Ass_By | |
| General info | |
| Entity name | Tasks |
| Data type | VarChar (1) |
| Not null | NO |
| User-defined variables | |
| Name | Value |
| | |
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |

Appendix-continued

Exemplary Relational Database information for use with exemplary security system and relational database figure.

| | |
|---|---|
| Maximum storage size for varying types is "max" | No |
| Disabled check constraint | No |

Tasks.Task_Comp_Date
General info
| | |
|---|---|
| Entity name | Tasks |
| Data type | Char (1) |
| Not null | NO |

User-defined variables
| Name | Value |
|---|---|

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Tasks.Task_Desc
General info
| | |
|---|---|
| Entity name | Tasks |
| Data type | Text |
| Not null | NO |

User-defined variables
| Name | Value |
|---|---|

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Tasks.Task_ID
General info
| | |
|---|---|
| Entity name | Tasks |
| Data type | UniqueIdentifier |
| Not null | YES |
| Unique | YES |

User-defined variables
| Name | Value |
|---|---|

| | |
|---|---|
| Unique Fill factor | |
| Identity | No |
| Identity Seed | |
| Identity Increment | |
| Default object | |
| Rule object | |
| RowGuidCol | Yes |
| Clustered unique | No |
| Not for replication (Identity) | No |
| Not for replication (Check) | No |
| Data space for Unique | |
| Descending order (for Primary Key) | No |

Appendix-continued

Exemplary Relational Database information for use with exemplary security system and relational database figure.

| | |
|---|---|
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Tasks.Task_Iss_Date
General info
| | |
|---|---|
| Entity name | Tasks |
| Data type | DateTime |
| Not null | NO |

User-defined variables
| Name | Value |
|---|---|

Unique Fill factor
| | |
|---|---|
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Tasks.Task_Name
General info
| | |
|---|---|
| Entity name | Tasks |
| Data type | VarChar (50) |
| Not null | YES |
| Unique | YES |

User-defined variables
| Name | Value |
|---|---|

Unique Fill factor
| | |
|---|---|
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Tasks.Task_No_Later_Date
General info
| | |
|---|---|
| Entity name | Tasks |
| Data type | Char (1) |
| Not null | NO |

User-defined variables
| Name | Value |
|---|---|

Unique Fill factor
| | |
|---|---|
| Identity | No |
| Identity Seed | |
| Identity Increment | |
| Default object | |
| Rule object | |
| RowGuidCol | No |
| Clustered unique | No |

Appendix-continued

Exemplary Relational Database information for use with exemplary security system and relational database figure.

| | |
|---|---|
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| Tasks.Task_Rem | |
| General info | |
| Entity name | Tasks |
| Data type | Char (1) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| VIdeo.EVT_ID | |
| General info | |
| Entity name | Video |
| Data type | UniqueIdentifier |
| Not null | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| VIdeo.Vid_Data | |
| General info | |
| Entity name | Video |
| Data type | Binary (512) |
| Not null | NO |
| User-defined variables | |
| Name | Value |

| | |
|---|---|
| Unique Fill factor | |
| Identity | No |
| Identity Seed | |
| Identity Increment | |
| Default object | |

Appendix-continued

Exemplary Relational Database information for use with exemplary security system and relational database figure.

| | |
|---|---|
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| VIdeo.Vid_Date | |
| General info | |
| Entity name | Video |
| Data type | DateTime |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| VIdeo.Vid_Desc | |
| General info | |
| Entity name | Video |
| Data type | Text |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| VIdeo.Vid_ID | |
| General info | |
| Entity name | Video |
| Data type | UniqueIdentifier |
| Not null | YES |
| Unique | YES |
| User-defined variables | |
| Name | Value |

Appendix-continued

Exemplary Relational Database information for use with exemplary security system and relational database figure.

| | |
|---|---|
| Unique Fill factor | |
| Identity | No |
| Identity Seed | |
| Identity Increment | |
| Default object | |
| Rule object | |
| RowGuidCol | Yes |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| VIdeo.Vid_Name | |
| General info | |
| Entity name | Video |
| Data type | VarChar (50) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| VIdeo.Vid_Time | |
| General info | |
| Entity name | Video |
| Data type | DateTime |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| VOIP.EVT_ID | |
| General info | |
| Entity name | VOIP |
| Data type | UniqueIdentifier |

Appendix-continued

Exemplary Relational Database information for use with exemplary security system and relational database figure.

| | |
|---|---|
| Not null | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| VOIP.VOIP Time | |
| General info | |
| Entity name | VOIP |
| Data type | DateTime |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| VOIP.VOIP_Data | |
| General info | |
| Entity name | VOIP |
| Data type | Binary (512) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Appendix-continued

Exemplary Relational Database information for use with exemplary security system and relational database figure.

| | |
|---|---|
| VOIP.VOIP_Date | |
| General info | |
| Entity name | VOIP |
| Data type | DateTime |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| VOIP.VOIP_ID | |
| General info | |
| Entity name | VOIP |
| Data type | UniqueIdentifier |
| Not null | YES |
| Unique | YES |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | Yes |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| VOIP.VOIP_Name | |
| General info | |
| Entity name | VOIP |
| Data type | VarChar (50) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |

Appendix-continued

Exemplary Relational Database information for use with exemplary security system and relational database figure.

| | |
|---|---|
| Collation for the column | |
| Maximum storage size for varying types is "max" | No |
| Disabled check constraint | No |

| | |
|---|---|
| VOIP.VOIP_Rem | |
| General info | |
| Entity name | VOIP |
| Data type | Text |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

| | |
|---|---|
| VOIP.VOIP_Sens | |
| General info | |
| Entity name | VOIP |
| Data type | Char (15) |
| Not null | NO |
| User-defined variables | |
| Name | Value |

| | |
|---|---|
| Unique Fill factor | |
| Identity | No |
| Identity Seed | |
| Identity Increment | |
| Default object | |
| Rule object | |
| RowGuidCol | No |
| Clustered unique | No |
| Not for replication (Identity) | No |
| Not for replication (Check) | No |
| Data space for Unique | |
| Descending order (for Primary Key) | No |
| Descending order (for Unique) | No |
| Override Null/NotNull by User Type | No |
| Generate Unique as unique Index | No |
| Collation for the column | |
| Maximum storage size for varying types is "max" | No |
| Disabled check constraint | No |

Relationship list

| Relationship name | Relationship type | Parent entity | Child entity | Card. |
|---|---|---|---|---|
| Relationship12 | Identifying | Organization | JT org_evt | 1:N |
| Relationship122 | Identifying | Events | Audio | 1:N |
| Relationship152 | Identifying | Events | JT accevt | 1:N |
| Relationship162 | Identifying | Access | JT accevt | 1:N |
| Relationship22 | Identifying | Sensor | Sens_Pts | 1:N |
| Relationship22 | Identifying | Events | JT org_evt | 1:N |
| Relationship23 | Identifying | Events | Org_cht | 1:N |
| Relationship24 | Identifying | Events | SITREP | 1:N |
| Relationship25 | Identifying | Events | Reps_agency | 1:N |
| Relationship26 | Identifying | Events | Reps_Tech | 1:N |
| Relationship27 | Identifying | Organization | Personnel | 1:N |
| Relationship272 | Identifying | Personnel | JT pers_certs | 1:N |
| Relationship28 | Identifying | Organization | Equipment | 1:N |
| Relationship282 | Identifying | Certs | JT pers_certs | 1:N |
| Relationship29 | Identifying | Organization | JT_Org_Tsk | 1:N |
| Relationship30 | Identifying | Tasks | JT_Org_Tsk | 1:N |

Appendix-continued

Exemplary Relational Database information for use with exemplary security system and relational database figure.

| | | | | |
|---|---|---|---|---|
| Relationship33 | Identifying | Events | Package | 1:N |
| Relationship34 | Identifying | Events | Evt_Log | 1:N |
| Relationship35 | Identifying | Events | Historical | 1:N |
| Relationship36 | Identifying | Events | Docs | 1:N |
| Relationship37 | Identifying | Docs | Doc_Auth | 1:N |
| Relationship38 | Identifying | Account | JT_Acct_Read | 1:N |
| Relationship39 | Identifying | Readers | JT_Acct_Read | 1:N |
| Relationship40 | Identifying | Account | AD | 1:N |
| Relationship41 | Identifying | Account | Acct Hours | 1:N |
| Relationship42 | Identifying | Events | VOIP | 1:N |
| Relationship43 | Identifying | Events | Schedule | 1:N |
| Relationship44 | Identifying | Events | Video | 1:N |
| Relationship62 | Identifying | Events | Sensor | 1:N |
| Relationship92 | Identifying | Events | Graph | 1:N |

Relationship 'Relationship12'
General info
Relationship type identifying Cardinality 1:N
Parent entity Organization
Child entity JT org_evt
Partiality
Parent mandatory
Child mandatory
Referential integrity
                   Insert         Update        Delete
Parent     —        RESTRICT    RESTRICT
Child     NONE    NONE    —
Keys
Parent key Child key
Org_ID Org_ID
User-defined variables
Name Value
Not for replication No
Disabled foreign key constraint No Relationship 'Relationship122'
General info
Relationship type identifying Cardinality 1:N
Parent entity Events
Child entity Audio
Partiality
Parent mandatory
Child mandatory
Referential integrity
                   Insert         Update        Delete
Parent     —        RESTRICT    RESTRICT
Child     NONE    NONE    —
Keys
Parent key Child key
EVT_ID EVT_ID
User-defined variables
Name Value
Not for replication No
Disabled foreign key constraint No Relationship 'Relationship152'
General info
Relationship typeidentifying Cardinality 1:N
Parent entity Events
Child entity JT accevt
Partiality
Parent mandatory
Child mandatory
Referential integrity
Insert    Update    Delete
Parent     —        RESTRICT    RESTRICT
Child     NONE    NONE    —
Keys
Parent key Child key
EVT_ID EVT_ID
User-defined variables
Name Value
Not for replication No
Disabled foreign key constraint No Relationship 'Relationship162'
General info
Relationship type identifying Cardinality 1:N Appendix-continued Exemplary Relational Database information for use with exemplary security system and relational database figure.

| | | | | |
|---|---|---|---|---|
| Parent entity | Access | | | |
| Child entity | JT accevt | | | |
| Partiality | | | | |
| Parent | mandatory | | | |
| Child | mandatory | | | |
| Referential integrity | | | | |
| | Insert | Update | Delete | |
| Parent | — | RESTRICT | RESTRICT | |
| Child | NONE | NONE | — | |
| Keys | | | | |
| Parent key | | Child key | | |
| Access_ID | | Access_ID | | |
| User-defined variables | | | | |
| Name | | Value | | |
| Not for replication | | No | | |
| Disabled foreign key constraint | | No | | |
| | | | | |
| Relationship 'Relationship22' | | | | |
| General info | | | | |
| Relationship type | identifying | | Cardinality | 1:N |
| Parent entity | Sensor | | | |
| Child entity | Sens_Pts | | | |
| Partiality | | | | |
| Parent | mandatory | | | |
| Child | mandatory | | | |
| Referential integrity | | | | |
| | Insert | Update | Delete | |
| Parent | — | RESTRICT | RESTRICT | |
| Child | NONE | NONE | — | |
| Keys | | | | |
| Parent key | | Child key | | |
| EVT_ID | | EVT_ID | | |
| Sens_ID | | Sens_ID | | |
| User-defined variables | | | | |
| Name | | Value | | |
| Not for replication | | No | | |
| Disabled foreign key constraint | | No | | |
| | | | | |
| Relationship 'Relationship22' | | | | |
| General info | | | | |
| Relationship type | identifying | | Cardinality | 1:N |
| Parent entity | Events | | | |
| Child entity | JT org_evt | | | |
| Partiality | | | | |
| Parent | mandatory | | | |
| Child | mandatory | | | |
| Referential integrity | | | | |
| | Insert | Update | Delete | |
| Parent | — | RESTRICT | RESTRICT | |
| Child | NONE | NONE | — | |
| Keys | | | | |
| Parent key | | Child key | | |
| EVT_ID | | EVT_ID | | |
| User-defined variables | | | | |
| Name | | Value | | |
| Not for replication | | No | | |
| Disabled foreign key constraint | | No | | |
| | | | | |
| Relationship 'Relationship23' | | | | |
| General info | | | | |
| Relationship type | identifying | | Cardinality | 1:N |
| Parent entity | Events | | | |
| Child entity | Org_cht | | | |
| Partiality | | | | |
| Parent | mandatory | | | |
| Child | mandatory | | | |
| Referential integrity | | | | |
| | Insert | Update | Delete | |
| Parent | — | RESTRICT | RESTRICT | |
| Child | NONE | NONE | — | |
| Keys | | | | |
| Parent key | | Child key | | |
| EVT_ID | | EVT_ID | | |
| User-defined variables | | | | |
| Name | | Value | | |
| Not for replication | | No | | |
| Disabled foreign key constraint | | No | | |

| Appendix-continued | | | | | |
|---|---|---|---|---|---|
| Exemplary Relational Database information for use with exemplary security system and relational database figure. | | | | | |

Relationship 'Relationship24'
General info
| Relationship type | identifying | | Cardinality | 1:N |
|---|---|---|---|---|
| Parent entity | Events | | | |
| Child entity | SITREP | | | |

Partiality
Parent mandatory
Child mandatory
Referential integrity

| | Insert | Update | Delete |
|---|---|---|---|
| Parent | | RESTRICT | RESTRICT |
| Child | NONE | NONE | |

Keys
| Parent key | | Child key | |
|---|---|---|---|
| EVT_ID | | EVT_ID | |

User-defined variables
| Name | | Value | |
|---|---|---|---|
| Not for replication | | No | |
| Disabled foreign key constraint | | No | |

Relationship 'Relationship25'
General info
| Relationship type | identifying | | Cardinality | 1:N |
|---|---|---|---|---|
| Parent entity | Events | | | |
| Child entity | Reps_agency | | | |

Partiality
Parent mandatory
Child mandatory
Referential integrity

| | Insert | Update | Delete |
|---|---|---|---|
| Parent | | RESTRICT | RESTRICT |
| Child | NONE | NONE | |

Keys
| Parent key | | Child key | |
|---|---|---|---|
| EVT_ID | | EVT_ID | |

User-defined variables
| Name | | Value | |
|---|---|---|---|
| Not for replication | | No | |
| Disabled foreign key constraint | | No | |

Relationship 'Relationship26'
General info
| Relationship type | identifying | | Cardinality | 1:N |
|---|---|---|---|---|
| Parent entity | Events | | | |
| Child entity | Reps_Tech | | | |

Partiality
Parent mandatory
Child mandatory
Referential integrity

| | Insert | Update | Delete |
|---|---|---|---|
| Parent | | RESTRICT | RESTRICT |
| Child | NONE | NONE | |

Keys
| Parent key | | Child key | |
|---|---|---|---|
| EVT_ID | | EVT_ID | |

User-defined variables
| Name | | Value | |
|---|---|---|---|
| Not for replication | | No | |
| Disabled foreign key constraint | | No | |

Relationship 'Relationship27'
General info
| Relationship type | identifying | | Cardinality | 1:N |
|---|---|---|---|---|
| Parent entity | Organization | | | |
| Child entity | Personnel | | | |

Partiality
Parent mandatory
Child mandatory
Referential integrity

| | Insert | Update | Delete |
|---|---|---|---|
| Parent | | RESTRICT | RESTRICT |
| Child | NONE | NONE | |

Keys
| Parent key | | Child key | |
|---|---|---|---|
| Org_ID | | Org_ID | |

User-defined variables
| Name | | Value |
|---|---|---|

Appendix-continued

Exemplary Relational Database information for use with exemplary security system and relational database figure.

| | | | | |
|---|---|---|---|---|
| Not for replication | | No | | |
| Disabled foreign key constraint | | No | | |

Relationship 'Relationship272'
General info
| | | | | |
|---|---|---|---|---|
| Relationship type | identifying | | Cardinality | 1:N |
| Parent entity | Personnel | | | |
| Child entity | JT pers_certs | | | |

Partiality
| | | |
|---|---|---|
| Parent | mandatory | |
| Child | mandatory | |

Referential integrity
| | Insert | Update | Delete |
|---|---|---|---|
| Parent | | RESTRICT | RESTRICT |
| Child | NONE | NONE | |

Keys
| Parent key | Child key |
|---|---|
| Org_ID | Org_ID |
| Pers_ID | Pers_ID |

User-defined variables
| Name | Value |
|---|---|
| Not for replication | No |
| Disabled foreign key constraint | No |

Relationship 'Relationship28'
General info
| | | | | |
|---|---|---|---|---|
| Relationship type | identifying | | Cardinality | 1:N |
| Parent entity | Organization | | | |
| Child entity | Equipment | | | |

Partiality
| | |
|---|---|
| Parent | mandatory |
| Child | mandatory |

Referential integrity
| | Insert | Update | Delete |
|---|---|---|---|
| Parent | | RESTRICT | RESTRICT |
| Child | NONE | NONE | |

Keys
| Parent key | Child key |
|---|---|
| Org_ID | Org_ID |

User-defined variables
| Name | Value |
|---|---|
| Not for replication | No |
| Disabled foreign key constraint | No |

Relationship ''Relationship282''
General info
| | | | | |
|---|---|---|---|---|
| Relationship type | identifying | | Cardinality | 1:N |
| Parent entity | Certs | | | |
| Child entity | JT pers_certs | | | |

Partiality
| | |
|---|---|
| Parent | mandatory |
| Child | mandatory |

Referential integrity
| | Insert | Update | Delete |
|---|---|---|---|
| Parent | | RESTRICT | RESTRICT |
| Child | NONE | NONE | |

Keys
| Parent key | Child key |
|---|---|
| Cert_ID | Cert_ID |

User-defined variables
| Name | Value |
|---|---|
| Not for replication | No |
| Disabled foreign key constraint | No |

Relationship 'Relationship29'
General info
| | | | | |
|---|---|---|---|---|
| Relationship type | identifying | | Cardinality | 1:N |
| Parent entity | Organization | | | |
| Child entity | JT_Org_Tsk | | | |

Partiality
| | |
|---|---|
| Parent | mandatory |
| Child | mandatory |

Referential integrity
| | Insert | Update | Delete |
|---|---|---|---|
| Parent | | RESTRICT | RESTRICT |
| Child | NONE | NONE | |

Keys
| Parent key | Child key |
|---|---|
| Org_ID | Org_ID |

Appendix-continued

Exemplary Relational Database information for use with exemplary security system and relational database figure.

| User-defined variables | | | |
|---|---|---|---|
| Name | Value | | |
| Not for replication | No | | |
| Disabled foreign key constraint | No | | |

| Relationship 'Relationship30' | | | |
|---|---|---|---|
| General info | | | |
| Relationship type | identifying | Cardinality | 1:N |
| Parent entity | Tasks | | |
| Child entity | JT_Org_Tsk | | |
| Partiality | | | |
| Parent | mandatory | | |
| Child | mandatory | | |
| Referential integrity | | | |
| | Insert | Update | Delete |
| Parent | | RESTRICT | RESTRICT |
| Child | NONE | NONE | |
| Keys | | | |
| Parent key | | Child key | |
| Task_ID | | Task_ID | |
| Task_Name | | Task Name | |
| User-defined variables | | | |
| Name | | Value | |
| Not for replication | | No | |
| Disabled foreign key constraint | | No | |

| Relationship 'Relationship33' | | | |
|---|---|---|---|
| General info | | | |
| Relationship type | identifying | Cardinality | 1:N |
| Parent entity | Events | | |
| Child entity | Package | | |
| Partiality | | | |
| Parent | mandatory | | |
| Child | mandatory | | |
| Referential integrity | | | |
| | Insert | Update | Delete |
| Parent | | RESTRICT | RESTRICT |
| Child | NONE | NONE | |
| Keys | | | |
| Parent key | | Child key | |
| EVT_ID | | EVT_ID | |
| User-defined variables | | | |
| Name | | Value | |
| Not for replication | | No | |
| Disabled foreign key constraint | | No | |

| Relationship 'Relationship34' | | | |
|---|---|---|---|
| General info | | | |
| Relationship type | identifying | Cardinality | 1:N |
| Parent entity | Events | | |
| Child entity | Evt_Log | | |
| Partiality | | | |
| Parent | mandatory | | |
| Child | mandatory | | |
| Referential integrity | | | |
| | Insert | Update | Delete |
| Parent | | RESTRICT | RESTRICT |
| Child | NONE | NONE | |
| Keys | | | |
| Parent key | | Child key | |
| EVT_ID | | EVT_ID | |
| User-defined variables | | | |
| Name | | Value | |
| Not for replication | | No | |
| Disabled foreign key constraint | | No | |

| Relationship 'Relationship35' | | | |
|---|---|---|---|
| General info | | | |
| Relationship type | identifying | Cardinality | 1:N |
| Parent entity | Events | | |
| Child entity | Historical | | |
| Partiality | | | |
| Parent | mandatory | | |
| Child | mandatory | | |
| Referential integrity | | | |
| | Insert | Update | Delete |
| Parent | | RESTRICT | RESTRICT |
| Child | NONE | NONE | |

Appendix-continued

Exemplary Relational Database information for use with exemplary security system and relational database figure.

| | | | | | |
|---|---|---|---|---|---|
| Keys | | | | | |
| Parent key | | Child key | | | |
| EVT_ID | | EVT_ID | | | |
| User-defined variables | | | | | |
| Name | | Value | | | |
| Not for replication | | No | | | |
| Disabled foreign key constraint | | No | | | |

| | | | | | |
|---|---|---|---|---|---|
| Relationship 'Relationship36' | | | | | |
| General info | | | | | |
| Relationship type | identifying | | Cardinality | 1:N |
| Parent entity | Events | | | |
| Child entity | Docs | | | |
| Partiality | | | | |
| Parent | mandatory | | | |
| Child | mandatory | | | |
| Referential integrity | | | | |
| | Insert | Update | Delete | |
| Parent | | CASCADE | CASCADE | |
| Child | NONE | NONE | | |
| Keys | | | | |
| Parent key | | Child key | | |
| EVT_ID | | EVT_ID | | |
| User-defined variables | | | | |
| Name | | Value | | |
| Not for replication | | No | | |
| Disabled foreign key constraint | | No | | |

| | | | | | |
|---|---|---|---|---|---|
| Relationship 'Relationship37' | | | | | |
| General info | | | | | |
| Relationship type | identifying | | Cardinality | 1:N |
| Parent entity | Docs | | | |
| Child entity | Doc_Auth | | | |
| Partiality | | | | |
| Parent | mandatory | | | |
| Child | mandatory | | | |
| Referential integrity | | | | |
| | Insert | Update | Delete | |
| Parent | | CASCADE | CASCADE | |
| Child | NONE | NONE | | |
| Keys | | | | |
| Parent key | | Child key | | |
| Doc_ID | | Doc_ID | | |
| EVT_ID | | EVT_ID | | |
| User-defined variables | | | | |
| Name | | Value | | |
| Not for replication | | No | | |
| Disabled foreign key constraint | | No | | |

| | | | | | |
|---|---|---|---|---|---|
| Relationship 'Relationship38' | | | | | |
| General info | | | | | |
| Relationship type | identifying | | Cardinality | 1:N |
| Parent entity | Account | | | |
| Child entity | JT_Acct_Read | | | |
| Partiality | | | | |
| Parent | mandatory | | | |
| Child | mandatory | | | |
| Referential integrity | | | | |
| | Insert | Update | Delete | |
| Parent | | CASCADE | CASCADE | |
| Child | NONE | NONE | | |
| Keys | | | | |
| Parent key | | Child key | | |
| Acct_ID | | Acct_ID | | |
| User-defined variables | | | | |
| Name | | Value | | |
| Not for replication | | No | | |
| Disabled foreign key constraint | | No | | |

| | | | | | |
|---|---|---|---|---|---|
| Relationship 'Relationship39' | | | | | |
| General info | | | | | |
| Relationship type | identifying | | Cardinality | 1:N |
| Parent entity | Readers | | | |
| Child entity | JT_Acct_Read | | | |
| Partiality | | | | |
| Parent | mandatory | | | |
| Child | mandatory | | | |

Appendix-continued

Exemplary Relational Database information for use with exemplary security system and relational database figure.

Referential integrity

| | Insert | Update | Delete |
|---|---|---|---|
| Parent | | CASCADE | CASCADE |
| Child | NONE | NONE | |

Keys

| | | Child key |
|---|---|---|
| Parent key | | Read_ID |
| Read_ID | | |

User-defined variables

| Name | Value |
|---|---|
| Not for replication | No |
| Disabled foreign key constraint | No |

---

Relationship 'Relationship40'
General info

| Relationship type | identifying | Cardinality | 1:N |
|---|---|---|---|
| Parent entity | Account | | |
| Child entity | AD | | |

Partiality

| Parent | mandatory |
|---|---|
| Child | mandatory |

Referential integrity

| | Insert | Update | Delete |
|---|---|---|---|
| Parent | | CASCADE | CASCADE |
| Child | NONE | NONE | |

Keys

| Parent key | Child key |
|---|---|
| Acct_ID | Acct_ID |

User-defined variables

| Name | Value |
|---|---|
| Not for replication | No |
| Disabled foreign key constraint | No |

---

Relationship 'Relationship41'
General info

| Relationship type | identifying | Cardinality | 1:N |
|---|---|---|---|
| Parent entity | Account | | |
| Child entity | Acct Hours | | |

Partiality

| Parent | mandatory |
|---|---|
| Child | mandatory |

Referential integrity

| | Insert | Update | Delete |
|---|---|---|---|
| Parent | | CASCADE | CASCADE |
| Child | NONE | NONE | |

Keys

| Parent key | Child key |
|---|---|
| Acct_ID | Acct_ID |

User-defined variables

| Name | Value |
|---|---|
| Not for replication | No |
| Disabled foreign key constraint | No |

---

Relationship 'Relationship42'
General info

| Relationship type | identifying | Cardinality | 1:N |
|---|---|---|---|
| Parent entity | Events | | |
| Child entity | VOIP | | |

Partiality

| Parent | mandatory |
|---|---|
| Child | mandatory |

Referential integrity

| | Insert | Update | Delete |
|---|---|---|---|
| Parent | | CASCADE | CASCADE |
| Child | NONE | NONE | |

Keys

| Parent key | Child key |
|---|---|
| EVT_ID | EVT_ID |

User-defined variables

| Name | Value |
|---|---|
| Not for replication | No |
| Disabled foreign key constraint | No |

---

Relationship 'Relationship43'
General info

| Relationship type | identifying | Cardinality | 1:N |
|---|---|---|---|
| Parent entity | Events | | |
| Child entity | Schedule | | |

Partiality

| | | | | | |
|---|---|---|---|---|---|
| Exemplary Relational Database information for use with exemplary security system and relational database figure. | | | | | |
| Parent | mandatory | | | | |
| Child | mandatory | | | | |
| Referential integrity | | | | | |
| | Insert | Update | | Delete | |
| Parent | | CASCADE | | CASCADE | |
| Child | NONE | NONE | | | |
| Keys | | | | | |
| Parent key | | Child key | | | |
| EVT_ID | | EVT_ID | | | |
| User-defined variables | | | | | |
| Name | | Value | | | |
| Not for replication | | No | | | |
| Disabled foreign key constraint | | No | | | |
| Relationship 'Relationship44' | | | | | |
| General info | | | | | |
| Relationship type | identifying | | Cardinality | | 1:N |
| Parent entity | Events | | | | |
| Child entity | Video | | | | |
| Partiality | | | | | |
| Parent | mandatory | | | | |
| Child | mandatory | | | | |
| Referential integrity | | | | | |
| | Insert | Update | | Delete | |
| Parent | | CASCADE | | CASCADE | |
| Child | NONE | NONE | | | |
| Keys | | | | | |
| Parent key | | Child key | | | |
| EVT_ID | | EVT_ID | | | |
| User-defined variables | | | | | |
| Name | | Value | | | |
| Not for replication | | No | | | |
| Disabled foreign key constraint | | No | | | |
| Relationship 'Relationship62' | | | | | |
| General info | | | | | |
| Relationship type | identifying | | Cardinality | | 1:N |
| Parent entity | Events | | | | |
| Child entity | Sensor | | | | |
| Partiality | | | | | |
| Parent | mandatory | | | | |
| Child | mandatory | | | | |
| Referential integrity | | | | | |
| | Insert | Update | | Delete | |
| Parent | | RESTRICT | | RESTRICT | |
| Child | NONE | NONE | | | |
| Keys | | | | | |
| Parent key | | Child key | | | |
| EVT_ID | | EVT_ID | | | |
| User-defined variables | | | | | |
| Name | | Value | | | |
| Not for replication | | No | | | |
| Disabled foreign key constraint | | No | | | |
| Relationship 'Relationship92' | | | | | |
| General info | | | | | |
| Relationship type | identifying | | Cardinality | | 1:N |
| Parent entity | Events | | | | |
| Child entity | Graph | | | | |
| Partiality | | | | | |
| Parent | mandatory | | | | |
| Child | mandatory | | | | |
| Referential integrity | | | | | |
| | Insert | Update | | Delete | |
| Parent | | RESTRICT | | RESTRICT | |
| Child | NONE | NONE | | | |
| Keys | | | | | |
| Parent key | | Child key | | | |
| EVT_ID | | EVT_ID | | | |
| User-defined variables | | | | | |
| Name | | Value | | | |
| Not for replication | | No | | | |
| Disabled foreign key constraint | | No | | | |

The invention claimed is:

1. A converged physical and logical security management system comprising:
   a unique identifier having associated therewith information usable for authentication and authorization to control access decisions for a physical area and logical access to one or more of a computer system, computer network or network resource, the information including at least two configuration options; and
   a security management computer including at least one microprocessor, a data store and connectivity modules, the security management computer scalable via one or more connections to one or more additional security management computers, the security management computer determining the access decisions for the physical area and the logical access to the one or more of the computer system, the computer network or the network resource, the security management computer connected to one or more access control readers and capable of communicating with the one or more access control readers in the access control readers' standard protocol,
   wherein the security management computer also includes a directory service that is used with the data store and the configuration options to make the access decisions, wherein:
   for an access request to the physical area, a first authentication and authorization utilize a first of the at least two configuration options within the data store of the security management computer for a physical access decision, and
   for logical access, a second, separate, authentication and authorization utilize a second of the at least two configuration options within the directory service of the security management computer for a logical access decision.

2. The system of claim 1, further comprising a credential issuance system that can associate additional information with the unique identifier.

3. The system of claim 2, wherein the additional information pertains to one or more of personnel and equipment.

4. The system of claim 3, wherein additional information about the personnel comprises one or more of fingerprint information, name, credentials, certifications, biometric information, access information, a picture, background information and medical information.

5. The system of claim 1, wherein the unique identifier is associated with one or more of a contact or contactless chip, a bar code, printed data, a proximity chip, a magnetic stripe, a token and computer readable information.

6. The system of claim 1, wherein the configuration options include one or more of a card ID, card certificate, username and AccessID, and an incident management perimeter access control and tracking system manages one or more of personnel, tasks, equipment and access for a secure area.

7. The system of claim 1, wherein a credential issuance system interfaces with one or more of a fingerprint capture system, a camera, a PIN capture system, a signature capture system, a document scanner, a card reader/writer, a card printer and a report printer.

8. The system of claim 1, wherein the unique identifier is stored on a smart card, smart chip, embedded chip, mobile device or implanted chip.

9. The system of claim 1, wherein the information associated with the unique identifier is verified through a government entity.

10. The system of claim 9, wherein status information related to the verification of the information is maintained by the security management computer.

11. The system of claim 1, wherein the security management computer can receive information from one or more external data sources.

12. The system of claim 11, wherein the external data sources include one or more of map information, terrorist activity information, incident information, global positioning system information, audio information, video information, perimeter breach information, alarms, enterprise security system status information, local emergency response information, local, state, federal or international governmental information and information obtained from one or more other security management systems.

13. The system of claim 1, further comprising a rules toolkit, the toolkit allowing a user to construct one or more rules including metrics that govern the handling and action to be taken based on received information.

14. The system of claim 1, further comprising an interface module configured to communicate with the one or more of an existing enterprise physical security system and an existing enterprise computer system.

15. The system of claim 1, wherein the system includes one or more of satellite communications capabilities, VOIP capabilities, networking capabilities, switch-based network communication capabilities and packet-based network capabilities.

16. The system of claim 1, wherein the system can be booted into a plurality of modes.

17. The system of claim 16, wherein the modes are one or more of an EMS mode, a national disaster mode, an incident mode, a local disaster mode, a state disaster mode, a terrorist activity mode and a international disaster mode.

18. The system of claim 17, wherein additional modes can be dynamically added in real-time.

19. The system of claim 17, wherein each mode has an associated set of templates related to management of information associated with the security management system.

20. The system of claim 1, further comprising a data filtering module that filters data based on one or more of a sensitivity rating, permissions, incident information and government information.

21. The system of claim 1, further comprising a prediction module utilizing artificial intelligence to analyze information received by the security management system.

22. The system of claim 1, wherein the system provides security for one or more of chemical, drinking water and wastewater treatment systems, energy facilities, dams, commercial nuclear reactors, water sectors, process manufacturing, emergency services, public health and healthcare, continuity of government, government facilities, defense facilities, defense industrial base, information technology, telecommunications, converged facilities, national monuments and icons, postal and shipping, banking and finance, commercial facilities, materials and waste facilities, transportation systems, port security, aviation security, cargo, cruise ships, trains, mass transit, Intermodal, food and agriculture facilities, military facilities, first responders, police, fire control access to a machine and OSHA Compliance.

23. The system of claim 1, wherein the unique identifier is stored on a media in a RFID (Radio Frequency Identification) shielded pouch.

24. The system of claim 1, wherein the first of the at least two configuration options is one or more of a Card ID, a card certificate, a username and an AccessID.

25. The system of claim 1, wherein the second of the at least two configuration options is one or more of a Card ID, a card certificate, a username and an AccessID.

26. The system of claim 1, wherein the first and the second configuration options are the same.

27. A method for operating a converged physical and logical security management system comprising:
providing a unique identifier having associated therewith information usable for authentication and authorization to control access decisions for a physical area and logical access to one or more of a computer system, computer network or network resource, the information including at least two configuration options; and
operating a security management computer that includes at least one microprocessor, a data store and connectivity modules, the security management computer scalable via one or more connections to one or more additional security management computers, the security management computer determining the access decisions for the physical area and the logical access to the one or more of the computer system, the computer network or the network resource, the security management computer connected to one or more access control readers and capable of communicating with the one or more access control readers in the access control readers' standard protocol, wherein the security management computer also includes a directory service that is used with the data store and the configuration options to make the access decisions, wherein:
for an access request to the physical area, a first authentication and authorization utilize a first of the at least two configuration options within the data store of the security management computer for a physical access decision, and
for logical access, a second, separate, authentication and authorization utilize a second of the at least two configuration options within the directory service of the security management computer for a logical access decision.

28. The method of claim 27, wherein the information pertains to one or more of personnel, equipment, corporation, government entity, international entity or facility.

29. The method of claim 28, wherein information about the personnel comprises one or more of fingerprint information, name, credentials, certifications, biometric information, access information, a picture, a unique identifier, background information and medical information.

30. The method of claim 27, wherein the unique identifier is associated with one or more of a contact or contactless chip, a smart card, a smart chip, an embedded chip, an implanted chip, a bar code, printed data, a proximity chip, a magnetic stripe and computer readable information.

31. The method of claim 27, wherein the configuration options include one or more of a card ID, card certificate, username and AccessID.

32. The method of claim 27, wherein a credential issuance system interfaces with one or more of a fingerprint capture system, a camera, a PIN capture system, a signature capture system, a document scanner, a card reader/writer, a card printer and a report printer.

33. The method of claim 27, wherein the unique identifier is stored on a smart card, implanted chip, mobile device or embedded chip.

34. The method of claim 27, wherein the information associated with the unique identifier is verified through one or more of a government entity, certificate authority, corporate entity, state authority and local authority.

35. The method of claim 34, wherein status information related to the verification of the information is maintained by the security management computer.

36. The method of claim 27, wherein the security management computer can receive information from one or more external data sources.

37. The method of claim 36, wherein the external data sources include one or more of map information, GIS information, terra server information, terrorist activity information, incident information, global positioning system information, audio information, video information, perimeter breach information, alarms, enterprise security system status information, local emergency response information, local, state, federal or international governmental information, sensor information and information obtained from one or more other security management systems.

38. The method of claim 27, further comprising communicating via one or more of satellite communications capabilities, VOIP capabilities, networking capabilities, switch-based network communication capabilities and packet-based network capabilities.

39. The method of claim 27, further comprising booting the system into one of a plurality of modes.

40. The method of claim 39, wherein the modes are one or more of an EMS mode, a national disaster mode, an incident mode, a local disaster mode, a state disaster mode, a terrorist activity mode and a international disaster mode.

41. The method of claim 40, wherein additional modes can be dynamically added in real-time.

42. The method of claim 41, wherein each mode has an associated set of templates related to management of information associated with the security management system.

43. The method of claim 27, wherein the system provides security for one or more of chemical, drinking water and wastewater treatment systems, energy facilities, dams, commercial nuclear reactors, water sectors, process manufacturing, emergency services, public health and healthcare, continuity of government, government facilities, defense facilities, defense industrial base, information technology, telecommunications, converged facilities, national monuments and icons, postal and shipping, banking and finance, commercial facilities, materials and waste facilities, transportation systems, port security, aviation security, cargo, cruise ships, trains, mass transit, Intermodal, food and agriculture facilities, military facilities, first responders, police, fire and OSHA Compliance.

44. The method of claim 27, wherein a combination of SQL and active directory are used to converge physical and logical access.

45. The method of claim 27, wherein authentication is at least based on location based in time.

46. The method of claim 45, wherein artificial intelligence compares location and time information to determine authentication.

47. The method of claim 27, wherein the first of the at least two configuration options is one or more of a Card ID, a card certificate, a username and an AccessID.

48. The method of claim 27, wherein the second of the at least two configuration options is one or more of a Card ID, a card certificate, a username and an AccessID.

49. The method of claim 27, wherein the first and the second configuration options are the same.

50. The method of claim 27, further comprising, querying a user as to a type of deployment, incident or environment and, based on the user's selection, generating one or more of specific graphical user interfaces, templates and prompts for connections to various types of data feeds; and one or more of invoking one or more various pre-defined rule sets and creating one or more custom rules that allow actions to be triggered based on satisfaction of one or more rules.

51. A non-transitory computer-readable information storage media having stored thereon instructions, that if executed by a processor, perform the method of claim 27.

52. A converged physical and logical security management system comprising:
circuitry for providing a unique identifier having associated therewith information usable for authentication and authorization to control access decisions for a physical area and logical access to one or more of a computer system, computer network or network resource, the information including at least two configuration options; and
means for operating a security management system run on a computer managing a security management computer that includes at least one microprocessor, a data store and connectivity modules, the security management computer scalable via one or more connections to one or more additional security management computers, the security management computer determining the access decisions for the physical area and the logical access to the one or more of the computer system, the computer network or the network resource, the security management computer connected to one or more access control readers and capable of communicating with the one or more access control readers in the access control readers' standard protocol,
wherein the security management computer also includes a directory service that is used with the data store and the configuration options to make the access decisions, wherein:
for an access request to the physical area, a first authentication and authorization utilize a first of the at least two configuration options within the data store of the security management computer for a physical access decision, and
for logical access, a second, separate, authentication and authorization utilize a second of the at least two configuration options within the directory service of the security management computer for a logical access decision.

* * * * *

UNITED STATES PATENT AND TRADEMARK OFFICE
CERTIFICATE OF CORRECTION

PATENT NO. : 8,108,914 B2  Page 1 of 1
APPLICATION NO. : 11/740063
DATED : January 31, 2012
INVENTOR(S) : Melani S. Hernoud et al.

It is certified that error appears in the above-identified patent and that said Letters Patent is hereby corrected as shown below:

At Column 3, line 7, delete "Additionally, a GUM" and insert --Additionally, a GUID--

Signed and Sealed this
Twenty-fifth Day of December, 2012

David J. Kappos
*Director of the United States Patent and Trademark Office*